US012320965B2

(12) United States Patent
Ueda et al.

(10) Patent No.: US 12,320,965 B2
(45) Date of Patent: Jun. 3, 2025

(54) MICROSCOPE SYSTEM, IMAGING METHOD, AND IMAGING APPARATUS

(71) Applicant: SONY GROUP CORPORATION, Tokyo (JP)

(72) Inventors: Mitsunori Ueda, Tokyo (JP); Seiji Wada, Tokyo (JP); Takeshi Matsui, Tokyo (JP); Hirokazu Tatsuta, Tokyo (JP); Tetsuro Kuwayama, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 379 days.

(21) Appl. No.: 17/760,454

(22) PCT Filed: Feb. 19, 2021

(86) PCT No.: PCT/JP2021/006259
§ 371 (c)(1),
(2) Date: Aug. 10, 2022

(87) PCT Pub. No.: WO2021/167044
PCT Pub. Date: Aug. 26, 2021

(65) Prior Publication Data
US 2023/0152563 A1  May 18, 2023

(30) Foreign Application Priority Data

Feb. 20, 2020 (JP) ................................ 2020-027437
Feb. 12, 2021 (JP) ................................ 2021-020519

(51) Int. Cl.
*G02B 21/00* (2006.01)
*G01N 21/64* (2006.01)
*G02B 21/26* (2006.01)

(52) U.S. Cl.
CPC ..... *G02B 21/0076* (2013.01); *G01N 21/6458* (2013.01); *G02B 21/26* (2013.01)

(58) Field of Classification Search
CPC ...... G02B 21/0076; G02B 21/26; G02B 7/28; G02B 7/285; G02B 7/34; G02B 7/36;
(Continued)

(56) References Cited

U.S. PATENT DOCUMENTS 6,124,924 A  9/2000 Feldman
2011/0157349 A1* 6/2011 Yamamoto ........... G02B 21/006
348/373

FOREIGN PATENT DOCUMENTS

JP  2006-126540 A  5/2006
JP  2011090222 A  *  5/2011  ............. G02B 21/14
(Continued)

OTHER PUBLICATIONS

International Search Report and Written Opinion of PCT Application No. PCT/JP2021/006259, issued on May 18, 2021, 11 pages of ISRWO.

*Primary Examiner* — Arnel C Lavarias
(74) *Attorney, Agent, or Firm* — CHIP LAW GROUP

(57) ABSTRACT

High-speed and high-accuracy focus adjustment is achieved. A microscope system (1) includes: an irradiation unit (18) that emits line illumination parallel to a first direction; a stage (26) that supports a specimen and is movable in a second direction perpendicular to the first direction; a phase difference acquisition unit (60I) that acquires phase difference information regarding an image of light emitted from the specimen by being irradiated with the line illumination; an objective lens (22) that focuses the line illumination on the specimen; a derivation unit (60E) that derives relative position information between the objective lens and the specimen based on the phase difference information; and a movement control unit (60F) that causes at least one of the objective lens and the stage to move in a third direction
(Continued)

vertical to each of the first direction and the second direction based on the relative position information.

28 Claims, 29 Drawing Sheets

(58) Field of Classification Search
CPC .. G02B 21/00; G02B 21/0004; G02B 21/002; G02B 21/0024; G02B 21/0032; G02B 21/0036; G02B 21/0052; G02B 21/006; G02B 21/008; G02B 21/24; G02B 21/36; G02B 21/361; G02B 21/365; G02B 21/367; G01N 21/6458; G01N 21/6456; G01N 2021/6463; G01N 21/6486
USPC ............... 359/391, 362, 363, 368, 369, 392; 250/201.1, 201.2, 201.3, 201.7, 201.8
See application file for complete search history.

(56) References Cited

FOREIGN PATENT DOCUMENTS

| | | | | |
|---|---|---|---|---|
| JP | 2011-164586 | A | | 8/2011 |
| JP | 2011150277 | A * | 8/2011 | ........... G02B 21/006 |
| JP | 2011-209573 | A | | 10/2011 |
| JP | 2013-167816 | A | | 8/2013 |
| JP | 2014-123141 | A | | 7/2014 |
| JP | 2014-178474 | A | | 9/2014 |
| JP | 2016-161610 | A | | 9/2016 |
| WO | 2019/230878 | A1 | | 12/2019 |

\* cited by examiner

FIG.9
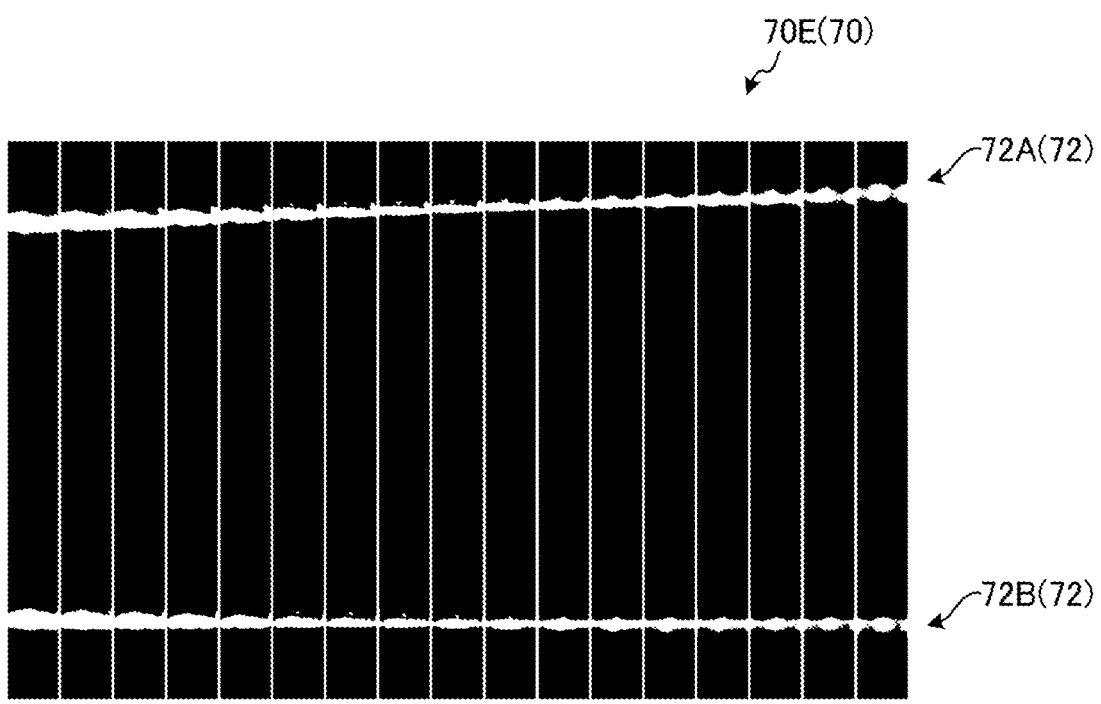
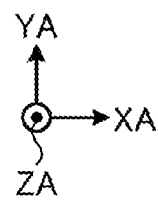

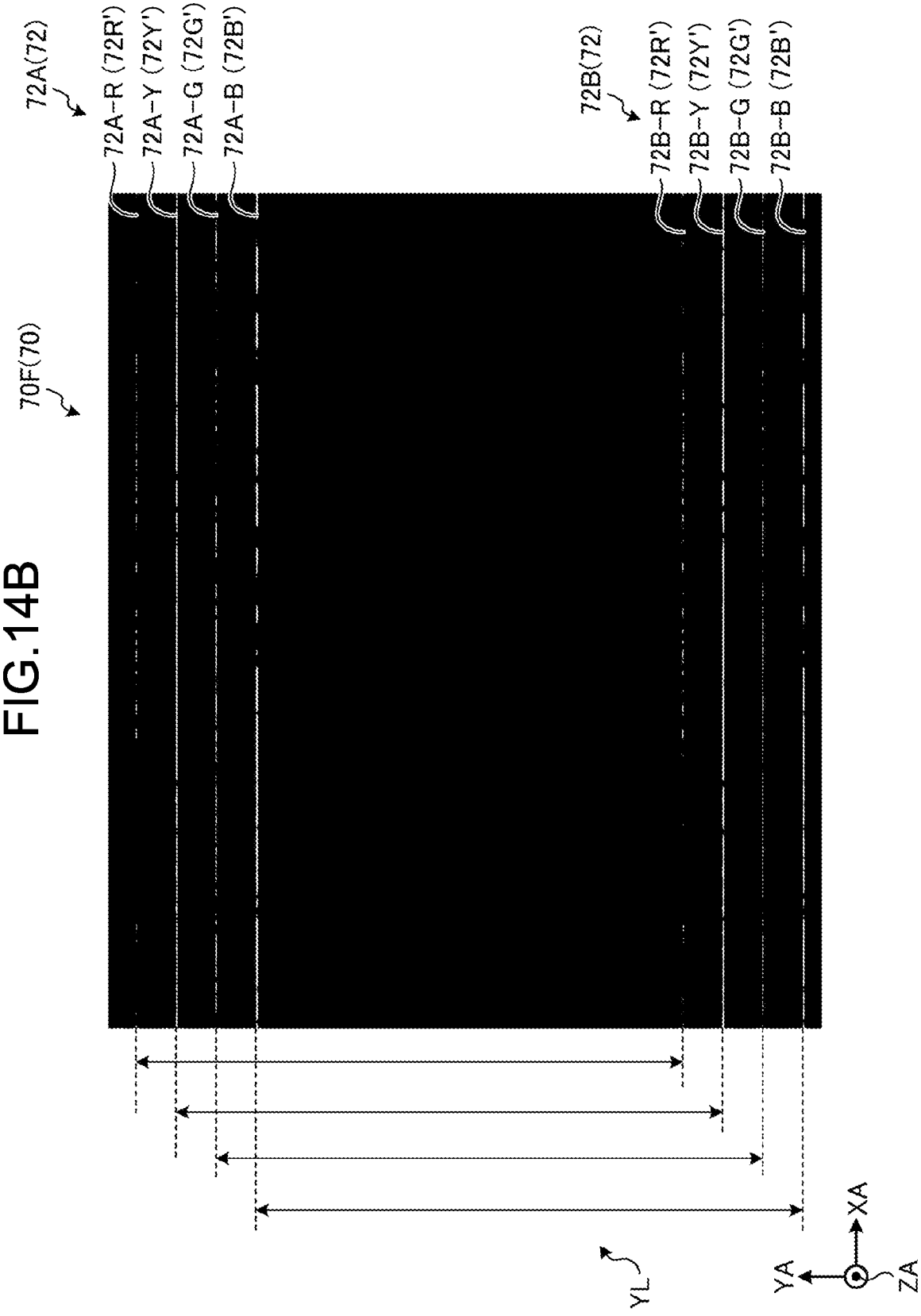

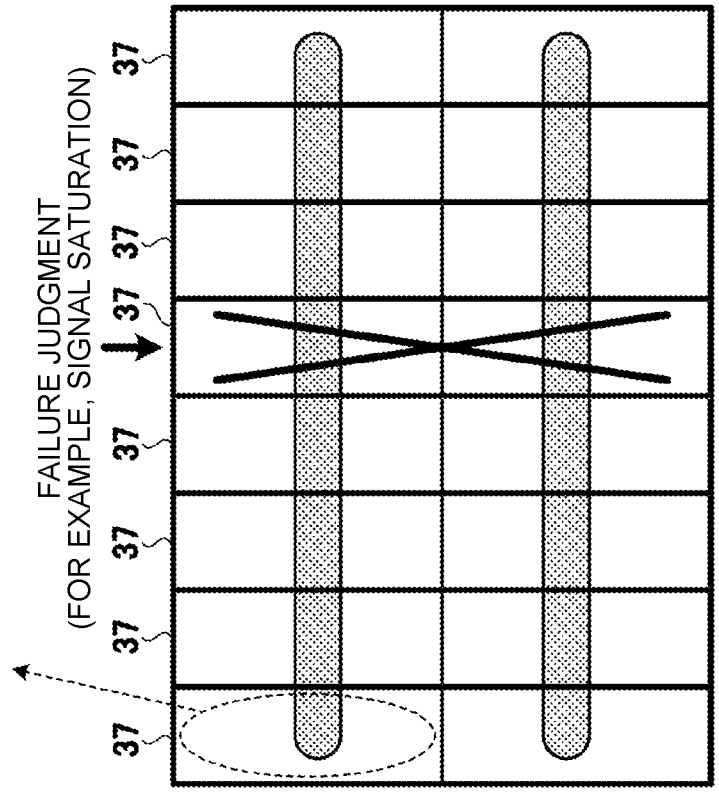
FIG. 21A
FIG. 21B
FIG. 21C

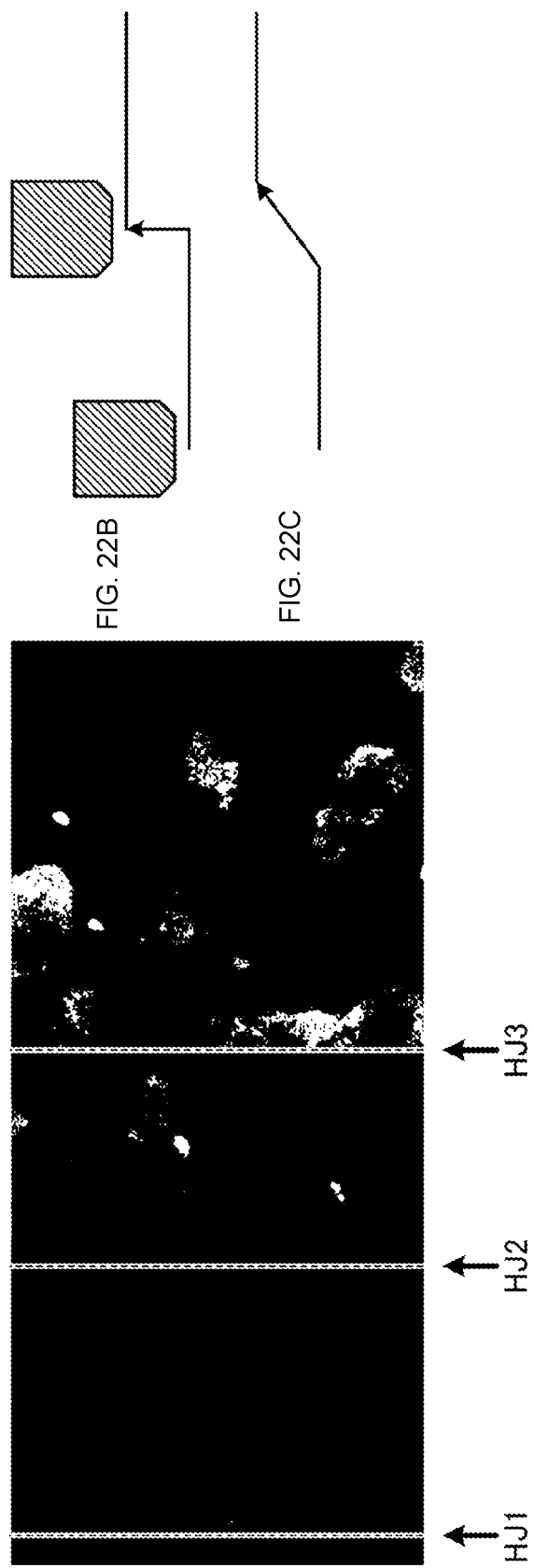

MICROSCOPE SYSTEM, IMAGING METHOD, AND IMAGING APPARATUS

CROSS REFERENCE TO RELATED APPLICATIONS

This application is a U.S. National Phase of International Patent Application No. PCT/JP2021/006259 filed on Feb. 19, 2021, which claims priority benefit of Japanese Patent Application No. JP 2021-020519 filed in the Japan Patent Office on Feb. 12, 2021 and Japanese Patent Application No. JP 2020-027437 filed in the Japan Patent Office on Feb. 20, 2020. Each of the above-referenced applications is hereby incorporated herein by reference in its entirety.

FIELD

The present disclosure relates to a microscope system, an imaging method, and an imaging apparatus.

BACKGROUND

There is disclosed a technique of obtaining a captured image of a specimen by irradiating the specimen with light and receiving light emitted from the specimen. For example, there is disclosed a technique of obtaining a captured image having focus adjusted on a specimen by a contrast method of changing focus so as to maximize a contrast ratio of a captured image of the specimen. In addition, there is disclosed a technique of adjusting focus on a specimen using a phase difference obtained from a subject image on which a set of feature points included in a pupil-split image of an entire region including the specimen is extracted.

CITATION LIST

Patent Literature

Patent Literature 1: JP 2014-123141 A
Patent Literature 2: JP 2014-178474 A

SUMMARY

Technical Problem

The conventional technique, however, has difficulty in achieving high-speed and high-accuracy focus adjustment.

In view of this, the present disclosure proposes a microscope system, an imaging method, and an imaging apparatus capable of achieving high-speed and high-accuracy focus adjustment.

Solution to Problem

In order to solve the above problem, a microscope system according to an aspect of the present disclosure includes: an irradiation unit that emits line illumination parallel to a first direction; a stage that supports a specimen and is movable in a second direction perpendicular to the first direction; a phase difference acquisition unit that acquires phase difference information regarding an image of light emitted from the specimen by being irradiated with the line illumination; an objective lens that focuses the line illumination on the specimen; a derivation unit that derives relative position information between the objective lens and the specimen based on the phase difference information; and a movement control unit that causes at least one of the objective lens and the stage to move in a third direction vertical to each of the first direction and the second direction based on the relative position information.

BRIEF DESCRIPTION OF DRAWINGS

FIG. 9 is an explanatory diagram of a light intensity change due to a change in a Z direction of the pupil-split picture according to the embodiment of the present disclosure.

FIG. 14B is a schematic diagram illustrating an example of a pupil-split picture according to the modification of the present disclosure.

FIGS. 21A, 21B, and 21C are diagrams illustrating an example of luminance information of the sensor region according to the modification of the present disclosure.

FIGS. 22A, 22B, and 22C are explanatory diagrams for describing a moving speed of an objective lens at the time of phase difference AF.

DESCRIPTION OF EMBODIMENTS

Embodiments of the present disclosure will be described below in detail with reference to the drawings. Note that in the following embodiments, the same parts are denoted by the same reference symbols, and a repetitive description thereof will be omitted.

Figure 1:
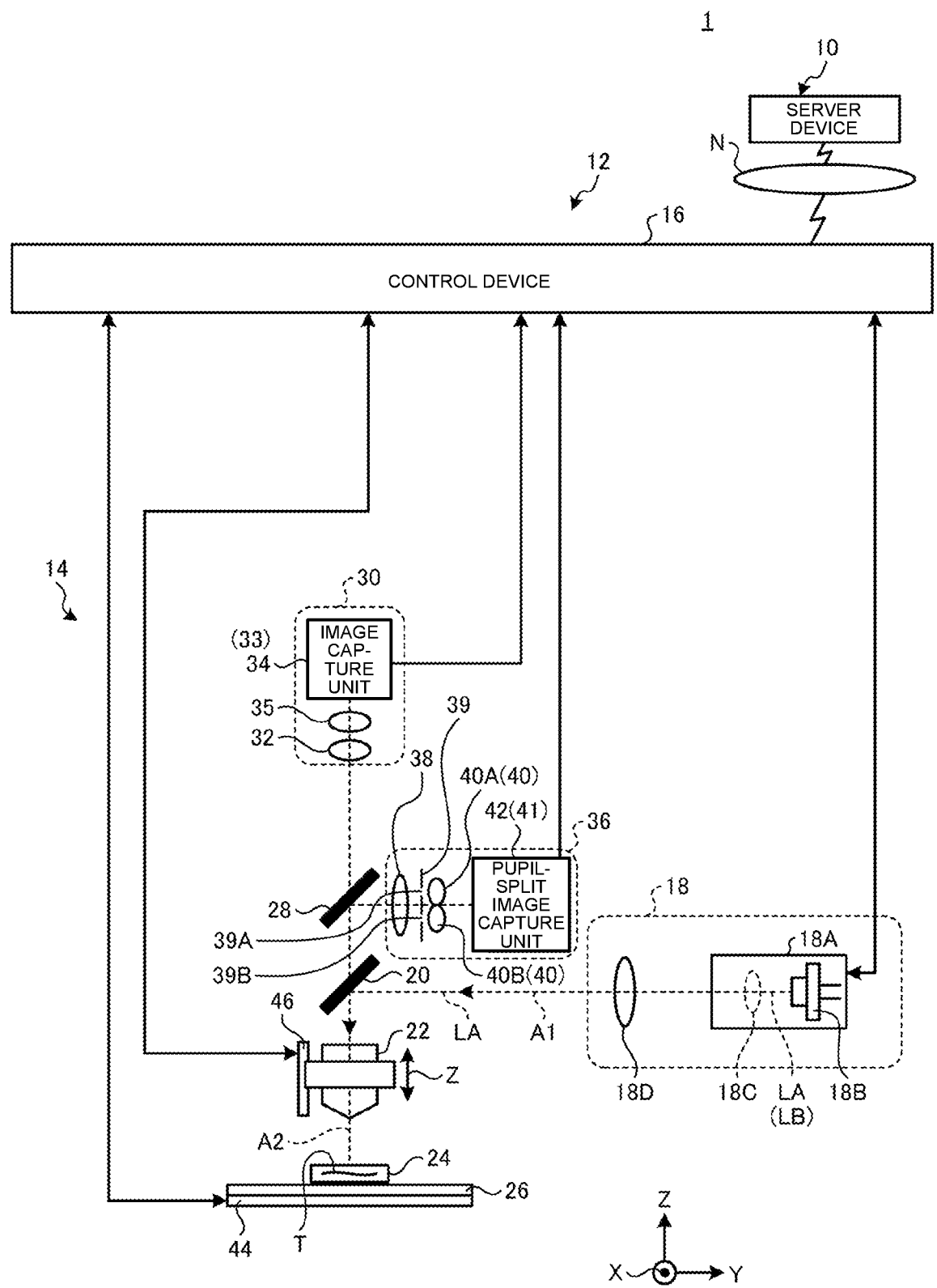
FIG. 1 is a schematic diagram illustrating an example of a microscope system according to an embodiment of the present disclosure.

FIG. 1 is a schematic diagram illustrating an example of a microscope system 1 according to the present embodiment.

The microscope system 1 is a system that irradiates a specimen T with line illumination LA and receives light emitted from the specimen T. Details of the line illumination LA and the specimen T will be described below.

The microscope system 1 includes an imaging apparatus 12. The imaging apparatus 12 is communicably connected to a server device 10 via, for example, a wireless communication network or a wired communication network such as a network N. The server device 10 may be a computer.

In the present embodiment, the description will be given referring to a direction along a direction in which an objective lens 22 and the specimen T, which will be described below, approach each other and a direction in which the objective lens 22 and the specimen T separates from each other, as a Z-axis direction. In addition, the description will be given assuming that the Z-axis direction matches the thickness direction of the specimen T. In addition, in the present embodiment, the description will be given assuming that the Z-axis direction and an optical axis A2 of the objective lens 22 are parallel to each other. In addition, a stage 26 to be described below is a two-dimensional plane represented by two axes (an X-axis direction and a Y-axis direction) orthogonal to the Z-axis direction. A plane parallel to the two-dimensional plane of the stage 26 will sometimes be referred to as an XY plane. Details of these units will be described below.

The imaging apparatus 12 includes a measurement unit 14 and a control device 16. The measurement unit 14 and the control device 16 are connected so as to be able to exchange data or signals.

The measurement unit 14 has an optical mechanism that measures light emitted from the specimen T included in a measurement target region 24. The measurement unit 14 is applied to an optical microscope, for example.

The measurement unit 14 includes an irradiation unit 18, a split mirror 20, an objective lens 22, a stage 26, a half mirror 28, an imaging optical unit 30, a phase difference detection optical unit 36, a first drive unit 44, and a second drive unit 46. The split mirror 20 selects a half mirror or a dichroic mirror according to a measurement method.

The irradiation unit 18 emits the line illumination LA and the area illumination LB. The irradiation unit 18 selectively performs irradiation by switching between the line illumination LA and the area illumination LB.

The line illumination LA is a light beam like a line long in a first direction. Specifically, the line illumination LA is a light beam in which a length of a light flux in the first direction in a two-dimensional plane orthogonal to an optical axis is several times or more a length in a direction orthogonal to the first direction. In the present embodiment, a case where the first direction being a longitudinal direction of the line illumination LA matches the X-axis direction in FIG. 1 will be described as an example. Details of the X-axis direction will be described below.

The area illumination LB is light emitted at the time of imaging the specimen T to be described below. Specifically, the area illumination LB is a light beam applied to a region broader than in the Y-axis direction compared to the line illumination LA.

The irradiation unit 18 includes a light source unit 18A and an imaging optical system 18D. The light source unit 18A includes a light source 18B and an illumination optical system 18C. The light source 18B is a light source that selectively switches between the line illumination LA and the area illumination LB to emit light. Switching to the line illumination LA and the area illumination LB is performed under the control of the control device 16.

For example, the light source 18B has a configuration including a plurality of laser diodes being two-dimensionally arranged along a two-dimensional plane formed with the X-axis direction and the Y-axis direction orthogonal to the X-axis direction. For example, the light source 18B emits light from each of the laser diodes arranged one-dimensionally in the X-axis direction to achieve emission of the line illumination LA. Furthermore, for example, the light source 18B emits light from each of the laser diodes two-dimensionally arranged in the X-axis direction and the Y-axis direction to emit the area illumination LB. Furthermore, for example, the light source 18B may irradiate the specimen T with the line illumination LA by emitting light through a slit long in the X-axis direction.

Here, in a magnifying device such as a microscope, when an image of the line illumination LA is formed at a point conjugate with the specimen T, a reduced image is projected at a reciprocal of the magnification. For example, when using a 20× objective lens 22 combined with a 1× condenser lens, magnification will be ¹/₂₀×. Therefore, for example, in order to achieve line illumination LA of 1 mm×5 um on the measurement target region 24, a slit of 20 mm×0.1 mm long in the X-axis direction may be provided at a position conjugate with the specimen T in the optical path of the area illumination LB. In addition, when there is a need to prepare further higher luminance illumination, one possible way is to form a line of light at a point conjugate with the specimen T by using a cylinder lens or a Powell lens from collimated light beams. For example, the line illumination LA can be formed by using a one-dimensional cylinder lens array. In addition, the light source 18B can be implemented by using a mercury lamp or a halogen lamp having a broad spectral band or a laser light source having a narrow band.

A case where the line illumination LA is emitted from the light source 18B will be described as an example. Note that the optical path is similar to the case of the line illumination LA also when the area illumination LB is emitted from the light source 18B. The line illumination LA emitted from the light source 18B is substantially collimated by the illumination optical system 18C, and then reaches the split mirror 20 via the imaging optical system 18D.

The line of light indicates the shape of the illumination light with which the line illumination LA emitted from the light source 18B irradiates the specimen T.

The light source 18B may be a light source 18B that selectively emits light in a wavelength region where the specimen T emits fluorescence. In addition, the irradiation unit 18 may be provided with a filter that selectively transmits light in the wavelength region. The present embodiment will describe, as an example, a mode in which the light source 18B performs irradiation with the line illumination LA and the area illumination LB in a wavelength region corresponding to fluorescence emitted from the specimen T. In addition, the present embodiment allows the line illumination LA and the area illumination LB to be light of mutually different wavelength regions or the same wavelength region in a wavelength region corresponding to the fluorescence emitted from the specimen T.

The split mirror 20 reflects the line illumination LA and transmits light in a wavelength region other than the line illumination LA. In the present embodiment, the split mirror 20 transmits light emitted from the specimen T. The line illumination LA is reflected by the split mirror 20 and reaches the objective lens 22.

The objective lens 22 also functions as a focus lens that condenses the line illumination LA on the specimen T.

The objective lens 22 includes the second drive unit 46. The second drive unit 46 causes the objective lens 22 to move in the Z-axis direction in a direction toward or away from the specimen T. By adjusting an interval between the objective lens 22 and the specimen T, focus adjustment of the objective lens 22 is performed.

In addition, the first drive unit 44 causes the stage 26 to move at least in the Y-axis direction. With the movement of the stage 26, the specimen T placed on the stage 26 moves relative to the objective lens 22 in the Y-axis direction. The Y-axis direction and the X-axis direction are directions orthogonal to the Z-axis direction. The Y-axis direction and the X-axis direction are directions orthogonal to each other.

The specimen T is an example of a measurement target in the microscope system 1, and is placed in the measurement target region 24. That is, the specimen T may be an object from which a captured image is obtained by the microscope system 1. The present embodiment will describe, as an example, a mode in which the specimen T emits fluorescence by irradiation with the line illumination LA. The specimen T may contain a biological-origin sample. Examples of the biological-origin sample include microorganisms, cells, liposomes, red blood cells, white blood cells, and platelets in blood, vascular endothelial cells, minute cell pieces of epithelial tissue, and pathological tissue sections of various organs.

The specimen T may be, for example, a pair of glass members with a biological-origin sample placed between the pair of glass members. Furthermore, the specimen T may be a biological-origin sample placed on the glass member. An example of the glass member is a slide. The glass member may be referred to as a cover slip. The glass member may be any member on which a biological-origin sample can be placed, and is not limited to a member formed of glass. The glass member may be any member that transmits light emitted from the line illumination LA, the area illumination LB, and the specimen T.

In the specimen T, for example, a biological-origin sample in a state of being encapsulated with an encapsulant may be placed. The encapsulant may be formed with a known material that transmits each of the line illumination LA, the area illumination LB, and the light emitted from the specimen T incident on the measurement target region 24. The encapsulant may be either liquid or solid.

The biological-origin sample that can be contained in the specimen T may be subjected to treatment such as staining or labeling. The treatment may be staining for demonstrating the form of the biological component or demonstrating a substance (such as a surface antigen) of the biological component, and examples thereof include Hematoxylin-Eosin (HE) staining and Immunohistochemistry staining. The biological-origin sample may be subjected to the treatment with one or more reagents, and the reagent may be a fluorescent dye, a coloring reagent, a fluorescent protein, or a fluorescently labeled antibody.

The specimen T may be prepared for the purpose of pathological diagnosis, clinical examination, or the like from a specimen or a tissue sample collected from a human body. In addition, the specimen T is not limited to a human body, and may be originated from an animal, a plant, or other materials. The specimen T has different properties depending on the type of tissue (for example, organ or cell) used, the type of target disease, the attribute of the subject (e.g., age, sex, blood type, race, etc.), the lifestyle of the subject (for example, dietary habits, exercise habits, and smoking habits), and the like. The sample may be managed with identification information (bar code information, QR code (registered trademark) information, or the like) by which each sample can be identified.

The light emitted from the specimen T may be, for example, fluorescence emitted from a fluorescent dye in the biological-origin sample by irradiation with the line illumination LA. Furthermore, the light emitted from the specimen T may be light emitted in a wavelength region other than fluorescence by irradiation with the line illumination LA, or may be specifically light produced as a result of scattering and reflection of the illumination light. Hereinafter, the fluorescence emitted from the specimen T by the irradiation of the line illumination LA may be simply referred to as light or a light beam.

The light emitted from the specimen T by the irradiation of the line illumination LA passes through the objective lens 22 and the split mirror 20, which is represented by a dichroic mirror in the present embodiment, and reaches the half mirror 28. The light emitted from the specimen T is fluorescence emitted by the specimen T by irradiation with the line illumination LA or the area illumination LB. The fluorescence includes scattered fluorescence components.

The half mirror 28 distributes a part of the light emitted from the specimen T to the imaging optical unit 30 and distributes the rest to the phase difference detection optical unit 36. The distribution ratio of light to the imaging optical unit 30 and the phase difference detection optical unit 36 by the half mirror 28 may be the equal distribution ratio (for example, 50%-50%) or may be non-equal ratio. Therefore, a dichroic mirror or a polarizing mirror may be used instead of the half mirror 28.

The light transmitted through the half mirror 28 reaches the imaging optical unit 30. The light reflected by the half mirror 28 reaches the phase difference detection optical unit 36.

Note that the line illumination LA formed by the irradiation unit 18 and the measurement target region 24 are assumed to have an optically conjugate relationship. In addition, it is assumed that the line illumination LA, the measurement target region 24, an image capture unit 34 of the imaging optical unit 30, and a pupil-split image capture unit 42 of the phase difference detection optical unit 36 are supposed to be in an optically conjugate relationship.

The imaging optical unit 30 includes a condenser lens 32, a magnifying lens 35, and the image capture unit 34. The light transmitted through the half mirror 28 is condensed on the magnifying lens 35 by the condenser lens 32, magnified by the magnifying lens 35, and reaches the image capture unit 34. The image capture unit 34 receives light emitted from the specimen T and obtains a captured image. That is, the image capture unit 34 obtains a captured image obtained by magnifying the imaging region of the specimen T to a predetermined magnification. The image capture unit 34 outputs a captured image of the received light to the control device 16. The captured image is used for analysis of the type of the specimen T and the like.

The image capture unit 34 includes a plurality of light receiving units 33. The light receiving unit 33 is an element that converts received light into a charge. The light receiving unit 33 is a photodiode, for example. For example, the image capture unit 34 has a configuration in which the plurality of light receiving units 33 is two-dimensionally arranged along a light receiving surface. For example, the image capture unit 34 has a configuration in which the plurality of light receiving units 33 is one-dimensionally arranged along the light receiving surface. In the present embodiment, the description will be given assuming that the light receiving unit 33 has a configuration in which the light receiving units 33 are two-dimensionally arranged along the light receiving surface. The light receiving surface of the light receiving unit 33 is a two-dimensional plane orthogonal to an optical axis of light incident on the image capture unit 34 via the condenser lens 32.

The image capture unit 34 includes one or a plurality of imaging elements including a plurality of pixels arranged one-dimensionally or two-dimensionally, for example, a complementary metal-oxide semiconductor (CMOS) or a charge coupled device (CCD). The image capture unit 34 may include a low-resolution image acquisition imaging element and a high-resolution image acquisition imaging element, or may include a sensing imaging element for AF or the like and an image output imaging element for observation or the like. The imaging element may be a signal processing sensor including, in addition to the plurality of pixels, a signal processing unit (one, two, or three of a CPU, a DSP, and a memory device) that performs signal processing using a pixel signal from each pixel, and an output control unit that controls output of image data generated from the pixel signal and processing data generated by the signal processing unit. Furthermore, the imaging element may include an asynchronous event detection sensor that detects, as an event, that a luminance change of a pixel that photoelectrically converts incident light exceeds a predetermined threshold. The imaging element including the plurality of pixels, the signal processing unit, and the output control unit can be preferably configured as a one-chip semiconductor device.

On the other hand, the phase difference detection optical unit 36 is an optical unit for obtaining a pupil-split image of light emitted from the specimen T irradiated with the line illumination LA. In the present embodiment, a case where the phase difference detection optical unit 36 is an optical unit for obtaining a pupil-split image using two separator lenses will be described as an example.

The phase difference detection optical unit 36 includes a field lens 38, an aperture mask 39, separator lenses 40 including a separator lens 40A and a separator lens 40B, and a pupil-split image capture unit 42. The separator lenses 40 includes the separator lens 40A and the separator lens 40B.

The light emitted from the specimen T by the irradiation of the line illumination LA reaches the aperture mask 39 via the field lens 38. The aperture mask 39 has a pair of apertures 39A and 39B at a target position with the optical axis of the field lens 38 as a boundary. The sizes of the pair of apertures 39A and 39B are adjusted such that the subject depths of the separator lens 40A and the separator lens 40B are wider than the subject depth of the objective lens 22.

The aperture mask 39 divides light incident from the field lens 38 into two light fluxes by the pair of apertures 39A and 39B. The separator lens 40A and the separator lens 40B collect the light fluxes transmitted through the apertures 39A and 39B of the aperture mask 39 to the pupil-split image capture unit 42. Therefore, the pupil-split image capture unit 42 receives the two light fluxes that have been split.

Note that the phase difference detection optical unit 36 may be a configuration not including the aperture mask 39. In this case, the light that has reached the separator lens 40 via the field lens 38 is split into two light fluxes by the separator lens 40A and the separator lens 40B, and is collected to the pupil-split image capture unit 42.

Figure 2:
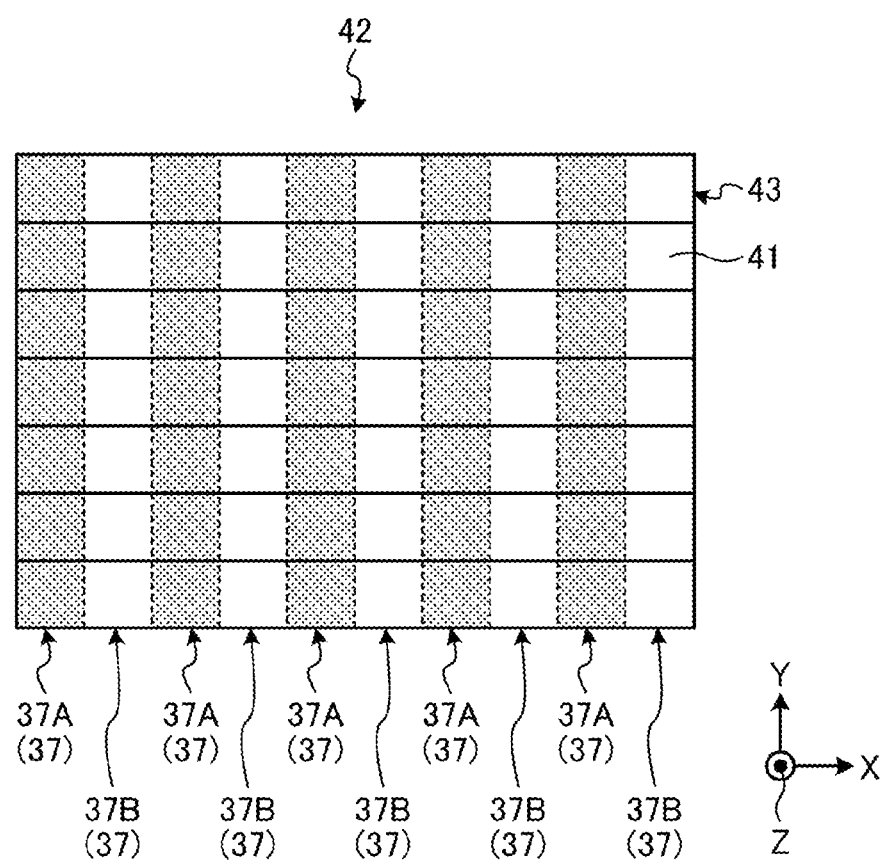
FIG. 2 is a schematic diagram illustrating an example of a plurality of two-dimensionally arranged light receiving units included in a pupil-split image capture unit according to the embodiment of the present disclosure.

FIG. 2 is a schematic diagram illustrating an example of a plurality of two-dimensionally arranged light receiving units 41 included in the pupil-split image capture unit 42. The pupil-split image capture unit 42 includes a plurality of light receiving units 41. The light receiving unit 41 is an element that converts received light into a charge. The light receiving unit 41 is, for example, a photodiode. FIG. 2 illustrates, as an example, the pupil-split image capture unit 42 in which the plurality of light receiving units 41 is two-dimensionally arranged along a light receiving surface 43 that receives light.

The light receiving surface 43 is a two-dimensional plane orthogonal to an optical axis of light incident on the pupil-split image capture unit 42 via the field lens 38, the aperture mask 39, and the separator lens 40. The pupil-split image capture unit 42 includes one or a plurality of imaging elements including a plurality of pixels arranged one-dimensionally or two-dimensionally, for example, a CMOS or a CCD. The pupil-split image capture unit 42 may include a low-resolution image acquisition imaging element and a high-resolution image acquisition imaging element, or may include a sensing imaging element for AF or the like and an image output imaging element for observation or the like. The imaging element may be a signal processing sensor including, in addition to the plurality of pixels, a signal processing unit (one, two, or three of a CPU, a DSP, and a memory device) that performs signal processing using a pixel signal from each pixel, and an output control unit that controls output of image data generated from the pixel signal and processing data generated by the signal processing unit. Furthermore, the imaging element may include an asynchronous event detection sensor that detects, as an event, that a luminance change of a pixel that photoelectrically converts incident light exceeds a predetermined threshold. The imaging element including the plurality of pixels, the signal processing unit, and the output control unit can be preferably configured as a one-chip semiconductor device.

In the present embodiment, a case where the pupil-split image capture unit 42 has a configuration in which a plurality types of unit regions 37 is arranged in plurality along the light receiving surface 43 will be described as an example. Each of the plurality of types of unit regions 37 includes one or a plurality of light receiving units 41. The plurality of types of unit regions 37 have mutually different exposure setting values of the light receiving unit 41 included in individual regions.

The exposure setting value can be controlled by at least one of a gain and an exposure time. The gain indicates at least one of an analog-to-digital conversion gain and an amplification gain. The exposure time indicates a charge accumulation time per output of a fluorescence signal in a case where the pupil-split image capture unit 42 is a charge accumulation type such as CMOS or CCD.

That is, the plurality of unit regions 37 is regions in which at least one of the gain and the exposure time of the included light receiving unit 41 is different from each other. Note that the exposure setting values of the plurality of light receiving units 41 included in one unit region 37 are assumed to be the same value.

Each of the plurality of light receiving units 41 is to have a predetermined light sensitivity that has been set for each type of the unit region 37 to which the light receiving unit 41 belongs. Therefore, the light receiving unit 41 is to be implemented by using the light receiving unit 41 that can set the light sensitivity to any value.

FIG. 2 illustrates, as an example, a mode in which the pupil-split image capture unit 42 has a configuration in which a unit region 37A and a unit region 37B are alternately arranged as the two types of unit regions 37. The unit region 37A and the unit region 37B are the unit regions 37 having mutually different exposure setting values. For example, high light sensitivity is preset in the light receiving unit 41 included in the unit region 37A. The high exposure setting value can be set by changing at least one of the gain and the exposure time. In addition, low light sensitivity is preset in the light receiving unit 41 included in the unit region 37B. The low exposure setting value can be set by changing at least one of the gain and the exposure time. The gain and the exposure charge accumulation time may be preset.

Note that the pupil-split image capture unit 42 may have a configuration arranging three or more types of unit regions 37 having mutually different exposure setting values, and is not limited to the two types of unit regions 37. Furthermore, in the pupil-split image capture unit 42, the exposure setting values of all the included light receiving units 41 may be the same.

In the present embodiment, a mode in which the pupil-split image capture unit 42 has a configuration in which two types of unit regions 37 are arranged in plurality along the light receiving surface 43 will be described as an example.

Return to FIG. 1, and description will continue. As described above, the pupil-split image capture unit 42 receives two light fluxes split by two pupils (separator lens 40A and separator lens 40B). By receiving two light fluxes, the pupil-split image capture unit 42 can capture an image including an image of a set of light fluxes. Here, the pupil-split image capture unit 42 acquires split two light fluxes as a pupil-split image. The pupil-split image may include a light intensity distribution corresponding to each of the two split light fluxes. This makes it possible to calculate the phase difference in a subsequent deriving step in the derivation unit described below.

Figure 3:
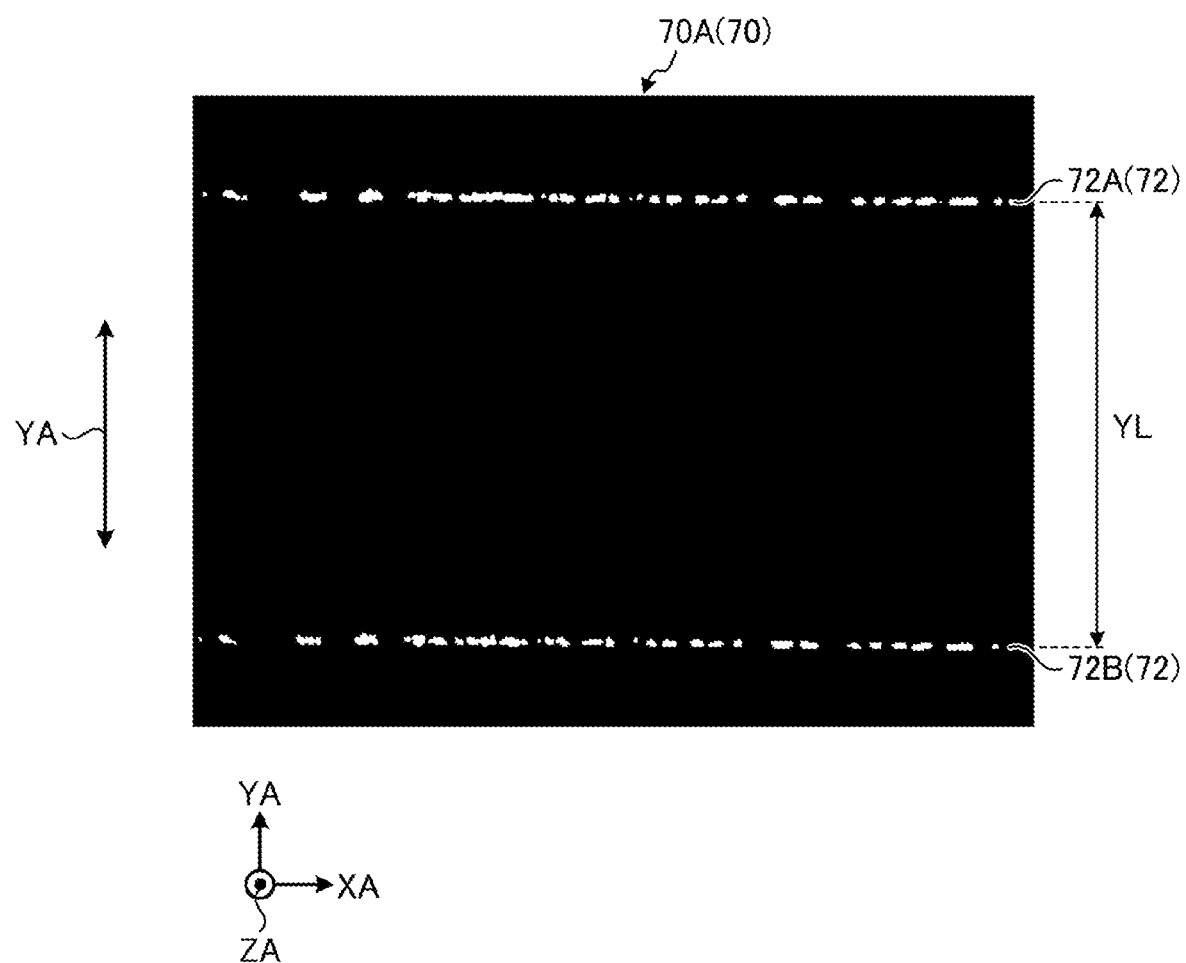
FIG. 3 is a schematic diagram illustrating an example of a pupil-split picture according to the embodiment of the present disclosure.

FIG. 3 is a schematic diagram illustrating an example of a pupil-split picture 70 acquired by the pupil-split image capture unit 42. The pupil-split picture 70 includes a pupil-split image 72 that is a set of an image 72A and an image 72B.

The pupil-split picture 70 is an image corresponding to the position and brightness of light received by each of the plurality of light receiving units 41 provided in the pupil-split image capture unit 42, and includes a light intensity distribution. Hereinafter, the brightness of the light received by the light receiving unit 41 may be referred to as a light intensity value.

Hereinafter, description will be given with reference to FIGS. 2 and 3. In this case, the pupil-split picture 70 is a picture in which the light intensity value is defined for each pixel corresponding to each of the unit regions 37 having a plurality of mutually different exposure setting values. In this case, the light intensity value is represented by the gradation of the pixel, although the relationship between the gradation and the light intensity is different in each of the unit regions 37.

The image 72A and the image 72B included in the pupil-split picture 70 are light receiving regions, and are regions having a larger light intensity value than other regions. As described above, the irradiation unit 18 irradiates the specimen T with the line illumination LA. Therefore, the light emitted from the specimen T irradiated with the line illumination LA becomes a line of light. Therefore, the image 72A and the image 72B constituting the pupil-split image 72 are images of lines each long in a predetermined direction. This predetermined direction is a direction optically corresponding to the X-axis direction which is the longitudinal direction of the line illumination LA.

Specifically, the vertical axis direction (YA-axis direction) of the pupil-split picture 70 illustrated in FIG. 3 optically corresponds to the Y-axis direction in the measurement target region 24 of the pupil-split image 72 included in the pupil-split picture 70. Furthermore, the horizontal axis direction (XA-axis direction) of the pupil-split picture 70 illustrated in FIG. 3 optically corresponds to the X-axis direction in the measurement target region 24. As described above, the X-axis direction is the longitudinal direction of the line illumination LA.

Note that the phase difference detection optical unit 36 only needs to be an optical unit for obtaining a change in the pupil-split image 72 (set of image 72A and image 72B), and the pupil-split image 72 (set of image 72A and image 72B) is not limited to the twin-lens pupil-split image. The phase difference detection optical unit 36 may be, for example, an optical unit that obtains a pupil-split image of triple lenses or more by receiving three or more light fluxes obtained by splitting light emitted from the specimen T.

Return to FIG. 1, and description will continue. In the present embodiment, the measurement unit 14 causes the first drive unit 44 to drive the stage 26 on which the specimen T is placed, and irradiates the specimen T with the line illumination LA while performing relative movement of the measurement target region 24 with respect to the line illumination LA in the Y-axis direction. That is, in the present embodiment, the Y-axis direction is a scanning direction of the measurement target region 24. A scanning method of the line illumination LA is not limited. Examples of the scanning method include a method of scanning in a direction (Y-axis direction) orthogonal to the longitudinal direction (X-axis direction) of the line illumination LA, and a method of moving at least a part of the configuration other than the measurement target region 24 in the measurement unit 14 in the Y-axis direction with respect to the measurement target region 24. In addition, a deflection mirror may be disposed between the split mirror 20 and the objective lens 22, and the line illumination LA may be scanned in the Y-axis direction by the deflection mirror.

By executing imaging by the image capture unit 34 while scanning the measurement target region 24 in the Y-axis direction leads to acquisition of a captured image of the specimen T.

Figure 4:
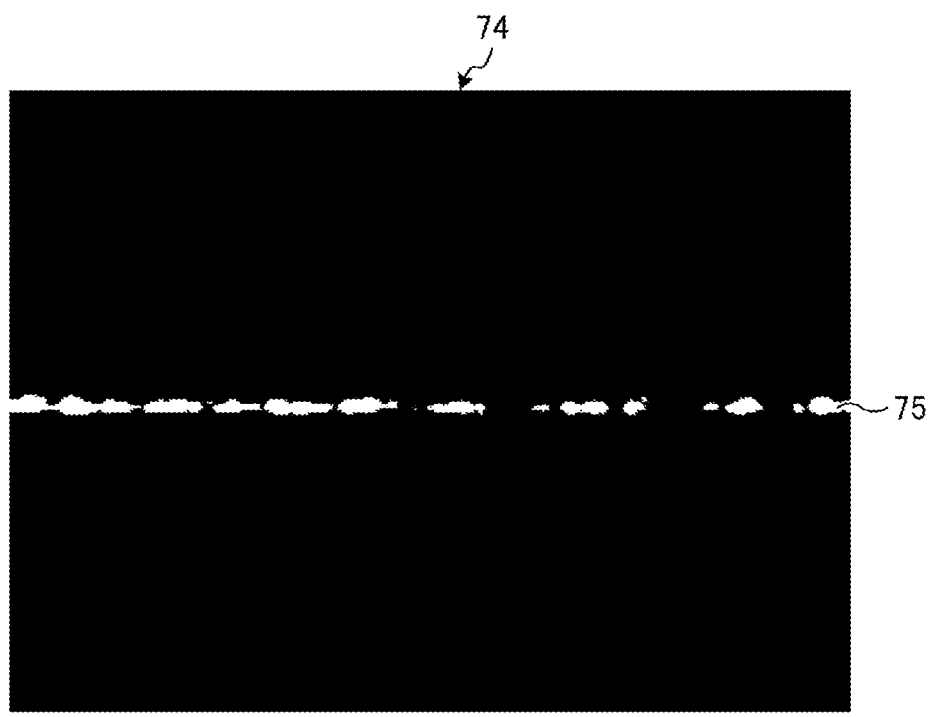
FIG. 4 is a schematic diagram illustrating an example of a second captured image according to the embodiment of the present disclosure.

FIG. 4 is a schematic diagram illustrating an example of a second captured image 74 acquired by the image capture unit 34. The second captured image 74 is a captured image obtained by the image capture unit 34 when the measurement target region 24 is irradiated with the line illumination LA. In other words, the second captured image 74 is a captured image obtained by capturing, by the image capture unit 34, the light emitted from the specimen T irradiated with the line illumination LA. The second captured image 74 includes a subject image 75 like a line.

The subject image 75 included in the second captured image 74 is a light receiving region, and is a region having a larger light intensity value than other regions.

Specifically, the vertical axis direction (YB-axis direction) of the second captured image 74 illustrated in FIG. 4 optically corresponds to the Y-axis direction in the measurement target region 24. The horizontal axis direction (XB-axis direction) of the second captured image 74 in FIG. 4 optically corresponds to the X-axis direction in the measurement target region 24. As described above, the X-axis direction is the longitudinal direction of the line illumination LA. The depth direction (ZA-axis direction) of the second captured image 74 illustrated in FIG. 4 optically corresponds to a Z-axis direction which is a thickness direction of the measurement target region 24.

Note that the image capture unit 34 similarly obtains a captured image when the specimen T is irradiated with the area illumination LB. Hereinafter, a captured image obtained by the image capture unit 34 when the measurement target region 24 is irradiated with the area illumination LB will be described as a first captured image. When the first captured image and the second captured image 74 are collectively described, they are simply referred to as captured images.

Return to FIG. 1, and description will continue. Next, the control device 16 will be described.

The control device 16 is a type of information processing device. The control device 16 is connected to each of the light source 18B, the image capture unit 34, the phase difference detection optical unit 36, the first drive unit 44, and the second drive unit 46 so as to be able to exchange data or signals.

The control device 16 acquires, from the pupil-split image capture unit 42, the pupil-split picture 70 of light emitted from the specimen T irradiated with the line illumination LA, and executes focus adjustment on the picture base on light intensity distributions of the image 72A and the image 72B which are the pupil-split images 72 included in the pupil-split picture 70.

Figure 5:
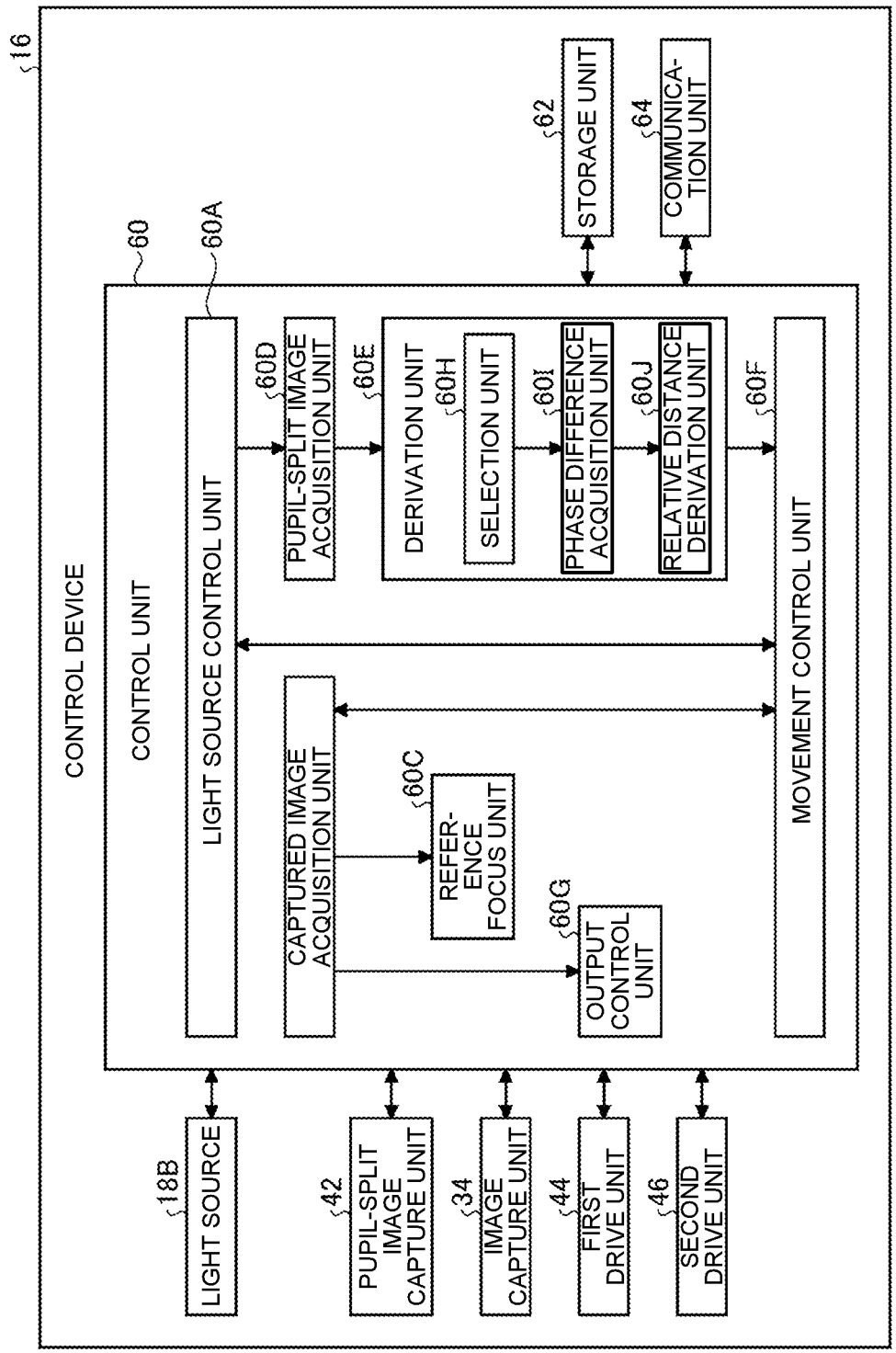
FIG. 5 is a diagram illustrating an example of a functional configuration of a control device according to the embodiment of the present disclosure.

FIG. 5 is a diagram illustrating an example of a functional configuration of the control device 16. Note that, in FIG. 5, the light source 18B, the pupil-split image capture unit 42, the image capture unit 34, the first drive unit 44, and the second drive unit 46 are also illustrated for the sake of explanation.

The control device 16 includes a control unit 60, a storage unit 62, and a communication unit 64. The control unit 60 is connected to the storage unit 62 and the communication unit 64 so as to be able to exchange data and signals. The storage unit 62 is a storage medium that stores various types of data. The storage unit 62 is, for example, a hard disk drive, an external memory device, or the like. The communication unit 64 communicates with an external device such as the server device 10 via the network N or the like.

The control unit 60 includes a light source control unit 60A, a captured image acquisition unit 60B, a reference focus unit 60C, a pupil-split image acquisition unit 60D, a derivation unit 60E, and a movement control unit 60F. The derivation unit 60E includes a selection unit 60H, a phase difference acquisition unit 60I, and a relative distance derivation unit 60J.

Some or all of the light source control unit 60A, the captured image acquisition unit 60B, the reference focus unit 60C, the pupil-split image acquisition unit 60D, the derivation unit 60E, the movement control unit 60F, an output control unit 60G, the selection unit 60H, the phase difference acquisition unit 60I, and the relative distance derivation unit 60J may be implemented by execution of a program by a processing device such as a central processing unit (CPU) that is, by software, may be implemented by hardware such as an integrated circuit (IC), or may be implemented by using software and hardware in combination.

The light source control unit 60A controls the light source 18B to selectively emit the line illumination LA or the area illumination LB. Under the control of the light source control unit 60A, the line illumination LA or the area illumination LB is selectively emitted from the light source 18B.

The captured image acquisition unit 60B acquires, from the image capture unit 34, a captured image of light emitted from the specimen T irradiated with the line illumination LA or the area illumination LB. That is, the captured image acquisition unit 60B acquires the second captured image 74 or the first captured image.

Here, the twin-lens phase difference method is not a method of performing image evaluation such as the maximum contrast ratio or the minimum spot size which are performed in the contrast method or the operation concentric circle method. Therefore, in the twin-lens phase difference method, when the products of the refractive index and the distance, which is referred to an optical distance, are the same, it is determined that the focusing amounts are the same. For example, the optical distance between the objective lens 22 and the specimen T is greatly different between a case where the specimen T is disposed in a medium having a high refractive index and a case where the specimen T is exposed on the air surface, even with the same physical distance. This causes a difference in optical aberration and chromatic aberration. In order to correct the difference, the reference focus is measured.

Here is an assumable case where that the specimen T has a thickness of several um and the cover slip has a thickness of several hundred um like a microscope slide. In this case, even with the same optical distance between the objective lens 22 and the specimen T, the physical distance to the optimum focus position with respect to the specimen T varies depending on the thickness of the cover slip corresponding to the measurement target region 24.

Therefore, the reference focus unit 60C adjusts the initial relative position between the objective lens 22 and the specimen T. As described above, the specimen T is included in the measurement target region 24, and the measurement target region 24 is placed on the stage 26. Therefore, by adjusting the relative position between the objective lens 22 and the stage 26, the relative position between the objective lens 22 and the specimen T is adjusted.

The relative position is a relative position of one of the objective lens 22 and the specimen T with respect to the other. The relative position is determined by the distance between the objective lens 22 and the specimen T in the Z-axis direction, for example. For example, the relative position is represented by the movement direction and the movement amount of at least one of the objective lens 22 and the specimen T with respect to the current position of each of the objective lens 22 and the specimen T.

The initial relative position indicates a relative position for pre-adjustment before obtaining a captured image for use in analysis of the specimen T or the like in the microscope system 1. That is, the reference focus unit 60C executes reference focus processing for pre-adjustment.

For example, the reference focus unit 60C calculates a contrast ratio of the light intensity values between the included adjacent pixels using the first captured image acquired by the captured image acquisition unit 60B. That is, the reference focus unit 60C calculates the contrast ratio using the first captured image which is a captured image of the light emitted from the specimen T irradiated with the area illumination LB. Subsequently, by repeating the control of the movement control unit 60F and the calculation of the contrast ratio, the reference focus unit 60C adjusts the initial relative position to a position where the contrast ratio is maximized. Actually, the reference focus may be determined by a method other than the contrast ratio. Although the reference focus may be determined by any method, this example is a case where the contrast method is used.

The movement control unit 60F controls the movement of the first drive unit 44 and the second drive unit 46. Under the control of the movement control unit 60F, at least one of the objective lens 22 and the stage 26 is driven such that the objective lens 22 and the specimen T are moved in a direction of approaching or separating from each other in the Z-axis direction. That is, the relative position of the objective lens 22 and the specimen T in the Z-axis direction changes. In addition, the movement control unit 60F causes the stage 26 to move in the Y-axis direction which is the scanning direction of the area illumination LB. With the movement of the stage 26, the specimen T placed on the stage 26 is moved in the Y-axis direction, allowing the irradiation region of the line illumination LA to be scanned in the scanning direction (Y-axis direction) of the specimen T.

Every time the distance between the objective lens 22 and the specimen T in the Z-axis direction is changed by the movement control unit 60F, the reference focus unit 60C repeats the calculation of the contrast ratio using the first captured image. By repeating calculation of the contrast ratio while performing stepwise reduction of the movement amount of the objective lens 22 in the Z-axis direction via the movement control unit 60F, the reference focus unit 60C specifies the relative position at which the contrast ratio is maximized within the imaging range of the image capture unit 34 as the initial relative position. The reference focus unit 60C then ends the control by the movement control unit 60F at the specified initial relative position. Through these steps of processing, the reference focus unit 60C executes the reference focus processing by the contrast method to adjust the initial relative position.

The reference focus unit 60C adjusts the initial relative position using the contrast method, leading to achievement of the initial focus adjustment with high accuracy on the specimen T in the measurement target region 24. However, depending on the situation of the specimen T and the observation purpose, the reference focus may be determined using the design value of the pupil-split image 72 without performing the reference focus detection.

From the viewpoint of reducing the processing time, the reference focus unit 60C may adjust the initial relative position by a contrast method using the second captured image 74 (refer to FIG. 4) being a captured image of light emitted from the specimen T irradiated with the line illumination LA. In this case, the light receiving region is smaller than that in the case of using the first captured image, the adjustment time of the initial relative position can be reduced.

Furthermore, the reference focus unit 60C may adjust the initial relative position by a contrast method using the image 72A or the image 72B included in the pupil-split picture 70 acquired by the pupil-split image acquisition unit 60D described below.

Furthermore, the reference focus unit 60C may adjust the initial relative position using a group of a plurality of Z-stack images obtained by stacking the imaging region of the measurement target region 24 in the Z-axis direction. In this case, for example, the reference focus unit 60C may adjust the initial relative position by using the algorithm described in Journal of Biomedical Optics 17(3), 036008 (March 2012), a combination thereof, or the like.

Next, the pupil-split image acquisition unit 60D will be described. The pupil-split image acquisition unit 60D acquires the pupil-split picture 70 of the light emitted from the specimen T irradiated with the line illumination LA. The pupil-split image acquisition unit 60D acquires the pupil-split picture 70 from the pupil-split image capture unit 42, thereby acquiring the image 72A and the image 72B, which are the pupil-split image 72 included in the pupil-split picture 70.

The derivation unit 60E derives relative position information between the objective lens 22 and the specimen T based on the light intensity distributions of the image 72A and the image 72B. In other words, using the light intensity distributions of the image 72A and the image 72B, the derivation unit 60E derives the relative position information regarding the relative position at which the objective lens 22 is focused on the specimen T, that is, the relative position at which the focus is adjusted to the specimen T.

As described with reference to FIG. 3, the pupil-split picture 70 includes the set of images 72A and 72B. In the present embodiment, the derivation unit 60E derives the relative position information between the objective lens 22 and the specimen T based on an interval YL representing the phase difference between the image 72A and the image 72B.

Return to FIG. 5, and description will continue. The derivation unit 60E will be described in detail. The derivation unit 60E includes a selection unit 60H, a phase difference acquisition unit 60I, and a relative distance derivation unit 60J.

As described above, the pupil-split image capture unit 42 of the present embodiment has a configuration in which the plurality of types of unit regions 37 having different exposure setting values for the included light receiving unit 41 are arranged along the light receiving surface 43. Therefore, it is preferable that the derivation unit 60E derive the relative position information based on the light intensity distribution of the pupil-split image 72 received by the light receiving unit 41 included in the unit region 37 having a specific exposure setting value.

Therefore, the selection unit 60H selects the unit region 37 including the light receiving unit 41 to which a specific light sensitivity is set from among the plurality of types of unit regions 37.

Figure 6A:
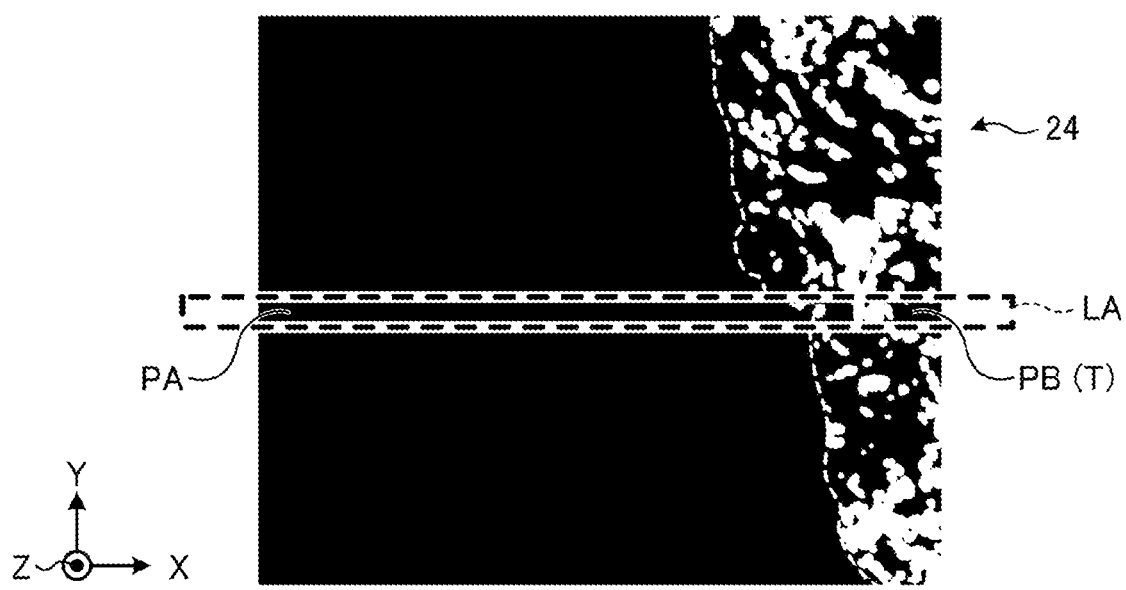
FIG. 6A is a conceptual diagram of a measurement target region according to the embodiment of the present disclosure.

FIG. 6A is a conceptual diagram of the measurement target region 24 including the specimen T. The measurement target region 24 is irradiated with the irradiation light LA as a line of light. The description will be given assuming a case where the specimen T included in the measurement target region 24 is an object such as a cell labeled with a fluorescent dye that fluoresces by irradiation with the line illumination LA. In this case, in the irradiation region of the line illumination LA in the measurement target region 24, the intensity of the light emitted from a region PB where the specimen T exists is higher than the intensity of the light emitted from the region PA where the specimen T does not exist.

Figure 6B:
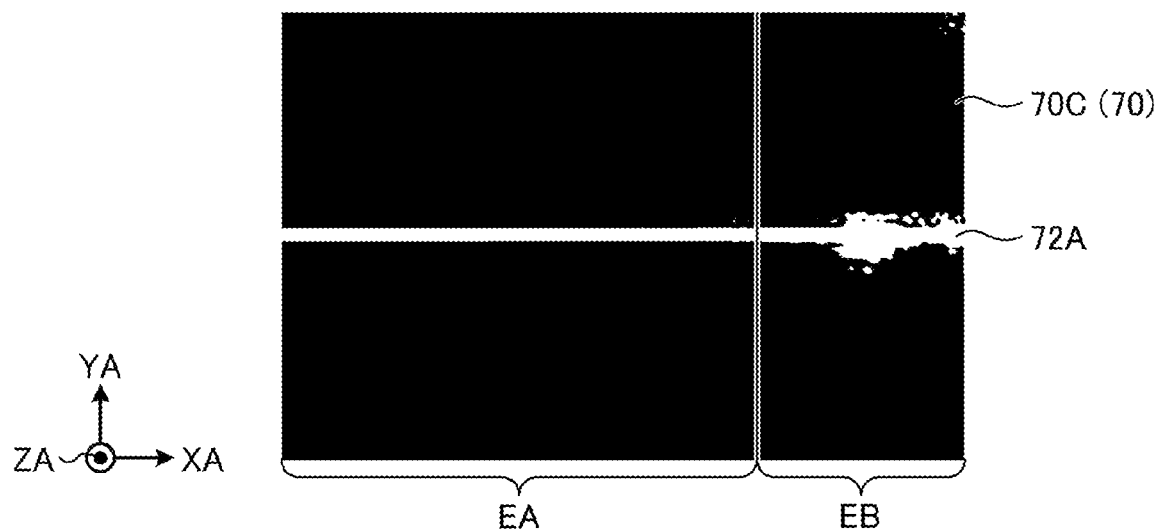
FIG. 6B is a schematic diagram illustrating an example of the pupil-split picture according to the embodiment of the present disclosure.

FIG. 6B is a schematic view illustrating only one side of a pupil-split picture 70C. This figure is a schematic diagram illustrating an example. The pupil-split picture 70C is an example of the pupil-split picture 70. FIG. 6B illustrates only the light intensity distribution of the image 72A on one side in the pupil-split picture 70C. The similar applies to the light intensity distribution of the image 72B.

In the pupil-split picture 70C, a region EA corresponding to the region PA where the specimen T does not exist has a lower intensity value of the light received by the light receiving unit 41 compared to a region EB corresponding to the region PB where the specimen T exists. Therefore, it is preferable to perform, for a region EA, information processing using the intensity value of light received by the light receiving unit 41 having a high exposure setting value. Moreover, it is preferable to perform, for a region EB, information processing using the intensity value of fluorescence received by the light receiving unit 41 having a low exposure setting value.

Therefore, from among a plurality of types of unit regions 37 included in the pupil-split image capture unit 42, the selection unit 60H selects the unit region 37 including the light receiving unit 41 to which a specific light sensitivity has been set. The selection unit 60H selects the unit region 37 using the pupil-split picture 70 acquired by the pupil-split image acquisition unit 60D. Specifically, the selection unit 60H selects the unit region 37 including the light receiving unit 41 having a light intensity value within a predetermined range. For example, it is assumed that the light intensity value is represented by a gradation value of 0 to 255. In this case, the selection unit 60H specifies a region in the pupil-split picture 70, in which the gradation value representing the light intensity value is within a predetermined range. Subsequently, the selection unit 60H selects the unit region 37 including the light receiving unit 41 corresponding to the specified region. For example, the selection unit 60H selects, as the predetermined range, the unit region 37 including the light receiving unit 41 that has output the light intensity value in the range in which the gradation value is 10 or more and 250 or less.

Figure 6C:
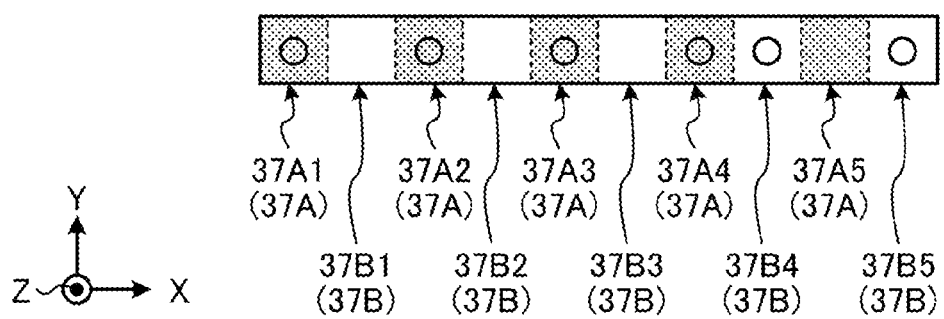
FIG. 6C is an explanatory diagram of selection of a unit region according to the embodiment of the present disclosure.

FIG. 6C is an explanatory diagram of selection of the unit region 37. Through the selection processing, the selection unit 60H selects, within the pupil-split picture 70, the unit region 37A (unit regions 37A1, 37A2, 37A3, and 37A4) in which high light sensitivity is set in the included light receiving unit 41 for the region EA corresponding to the region PA where the specimen T does not exist. Furthermore, the selection unit 60H selects, within the pupil-split picture 70, the unit region 37B (unit regions 37B4 and 37B5) in which low light sensitivity is set in the included light receiving unit 41 for the region EB corresponding to the region PB where the specimen T exists.

Subsequently, within the pupil-split picture 70 acquired by the pupil-split image acquisition unit 60D, the selection unit 60H outputs, to the phase difference acquisition unit 60I, the pupil-split picture 70 including the image 72A and the image 72B having the phase difference including the light intensity value of the light receiving unit 41 included in the selected unit region 37. Therefore, the selection unit 60H can output, to the phase difference acquisition unit 60I, the pupil-split picture 70 including the pupil-split image 72 having the phase difference in which saturation or signal insufficiency is suppressed. Note that the derivation unit 60E may be a configuration not including the selection unit 60H.

Return to FIG. 5, and description will continue. The phase difference acquisition unit 60I calculates the interval YL representing the phase difference between the set of images 72A and 72B constituting the pupil-split image 72 included in the pupil-split picture 70. In the present embodiment, the phase difference acquisition unit 60I calculates a phase difference obtained from the interval YL between the image 72A and the image 72B included in the pupil-split picture 70 received from the selection unit 60H.

In the present embodiment, the phase difference acquisition unit 60I calculates the interval between the centroid of the image 72A and the centroid of the image 72B as the interval YL between the image 72A and the image 72B.

The centroid represents the centroid of the light intensity distribution of each of the image 72A and the image 72B.

Figure 7:
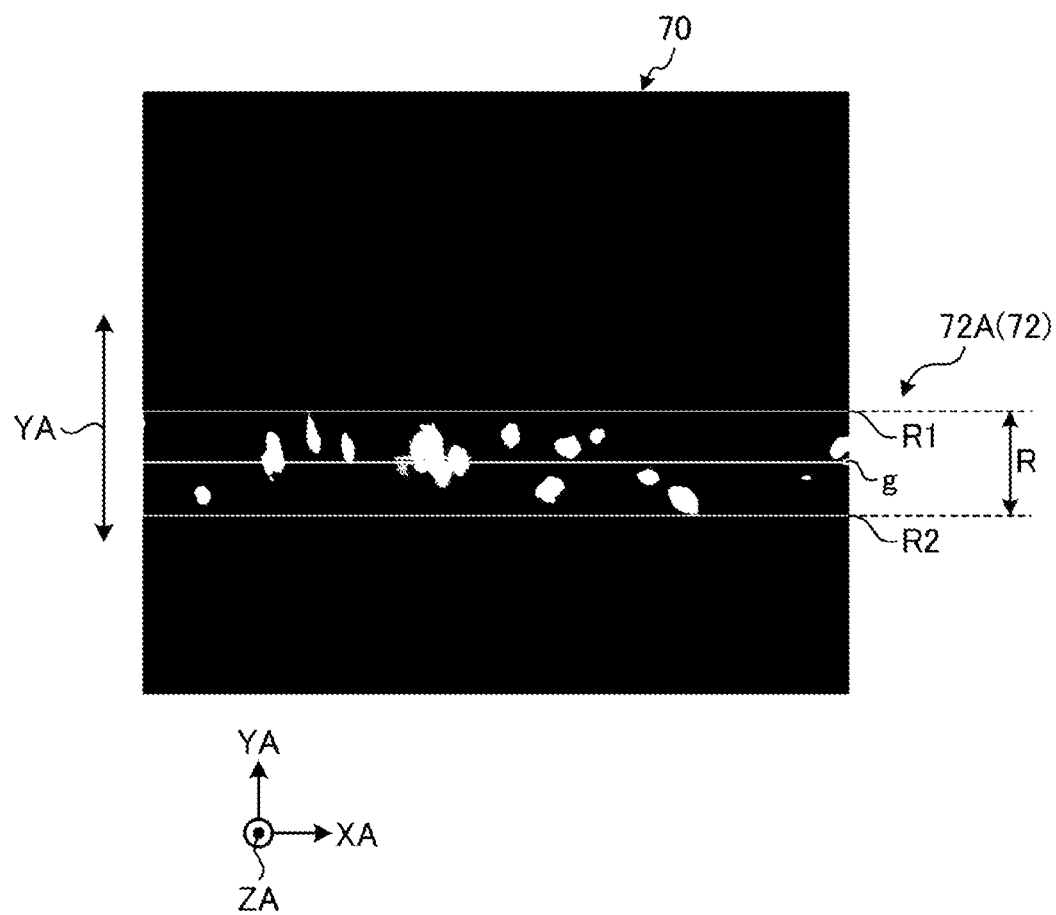
FIG. 7 is an explanatory diagram of a centroid according to the embodiment of the present disclosure.

FIG. 7 is an explanatory diagram of a centroid g. Among the image 72A and the image 72B, FIG. 7 illustrates the image 72A as an example. The centroid g means the centroid of the light intensity distribution in the YA-axis direction in the image 72A as a line long in the XA-axis direction. As described above, the image 72A is an image of line long in the XA-axis direction. Therefore, in the pupil-split picture 70, the centroid g is represented by a line running in the XA-axis direction which is an extending direction of the image 72A.

Figure 8:
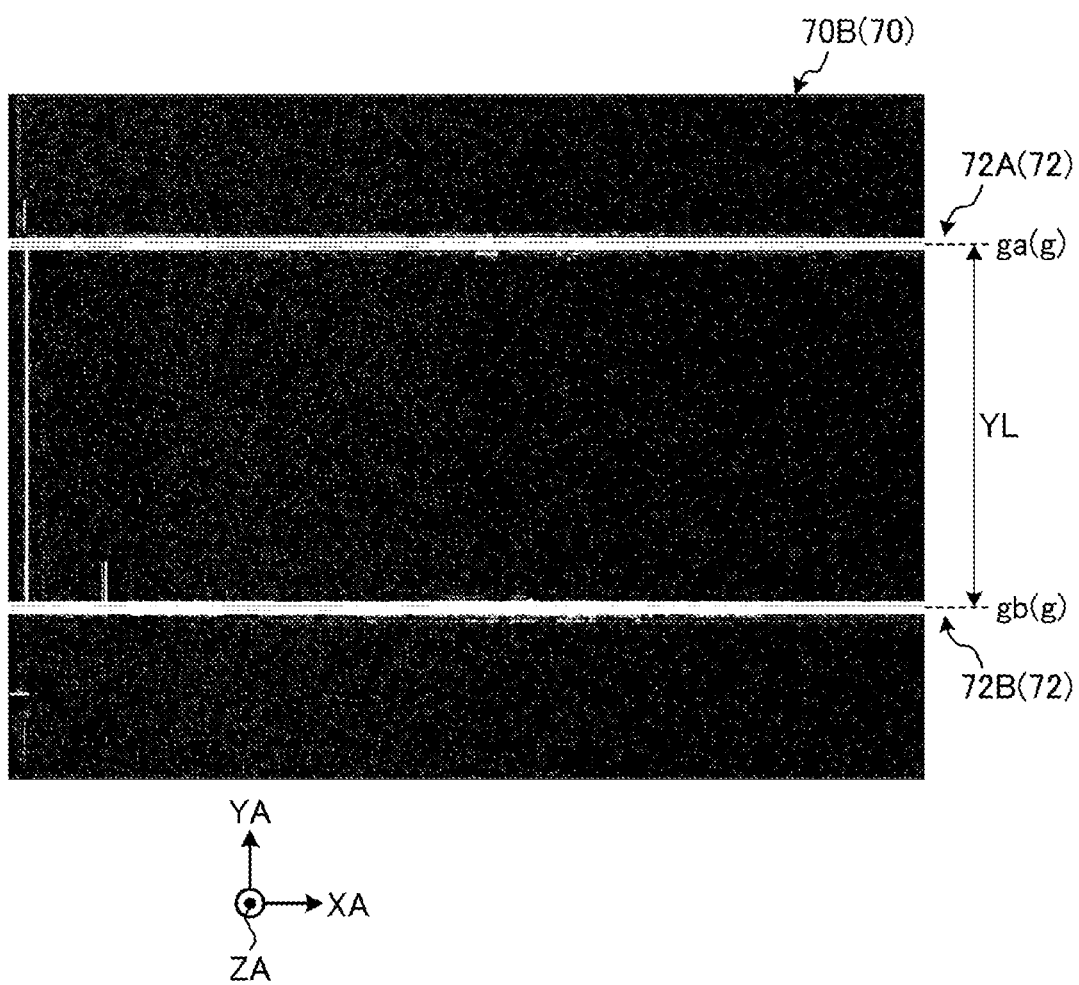
FIG. 8 is a schematic diagram illustrating an example of a pupil-split picture according to the embodiment of the present disclosure.

FIG. 8 is a schematic diagram illustrating an example of a pupil-split picture 70B. The pupil-split picture 70B is an example of the pupil-split picture 70. The phase difference acquisition unit 60I calculates the interval YL between a centroid ga which is the centroid g of the image 72A and a centroid gb which is the centroid g of the image 72B.

Specifically, for example, the phase difference acquisition unit 60I calculates the interval YL using the following Formulas (1) to (3).

$$[Y_{tt}, Y_{tb}] = y \subset \left\{ \frac{\sum_{k=1}^{W} A(x, y)}{W} > A_{black} + \frac{A_{dif}}{2} \right\} \quad \text{Formula (1)}$$

$$Y_{tc} = \frac{\sum_{y=Y_{tb}}^{Y_{tt}} \left\{ \frac{\sum_{k=1}^{W} A(x, y) - A_{black}}{W} \right\}}{\sum_{y=Y_{tb}}^{Y_{tt}} y} \quad \text{Formula (2)}$$

$$Y_{phase} = Y_{bc} - Y_{tc} \quad \text{Formula (3)}$$

In Formula (1), [Ytt, Ytb] indicates a range R in the YA-axis direction of the light intensity distribution of the image 72A (refer to FIG. 7). In Formulas (1) to (3), Ytt represents an upper end R1 of the light intensity distribution of the image 72A in the YA-axis direction (refer to FIG. 7). Ytb represents a lower end R2 in the YA-axis direction of the light intensity distribution of the image 72A (refer to FIG. 7). In Formulas (1) to (3), W represents the pixel width of the pupil-split picture 70. The pixel width indicates a width of one pixel in the X-axis direction or the Y-axis direction of the imaging range of the pupil-split picture 70 in the measurement target region 24. In the present embodiment, the description will be given assuming that the widths of the imaging range of the pupil-split picture 70 for one pixel in the X-axis direction and the Y-axis direction are the same.

In Formulas (1) to (3), $A_{black}$ is a black level average pixel value of a region other than the light receiving regions of the images 72A and 72B in the pupil-split picture 70. In Formulas (1) to (3), $A_{dif}$ is a noise level of a region other than the region of 72A and 72B in the pupil-split picture 70.

The phase difference acquisition unit 60I calculates the range R of image 72A by using the above Formula (1). In addition, the phase difference acquisition unit 60I calculates the range R of the image 72B similarly to the case of the image 72A.

Next, the phase difference acquisition unit 60I calculates centroid of image 72A by using Formula (2). In Formula (2), Ytc represents the centroid ga of the image 72A. In addition, the phase difference acquisition unit 60I calculates the centroid gb of the image 72B in the same manner as the image 72A.

Subsequently, the phase difference acquisition unit 60I calculates an interval YL between the centroid ga of the image 72A representing the phase difference and the centroid gb of the image 72B using Formula (3). In Formula (3), $Y_{phase}$ represents a phase difference, representing the interval YL between the centroid ga of the image 72A and the centroid gb of the image 72B. Ybc indicates the centroid gb of the image 72B. Ytc represents the centroid ga of the image 72A.

The phase difference acquisition unit 60I outputs the calculated interval YL to the relative distance derivation unit 60J.

As described above, the image 72A and the image 72B constituting the pupil-split picture 70 are images obtained when the specimen T is irradiated with the line illumination LA. Therefore, the image 72A and the image 72B constituting the pupil-split picture 70 are images as lines each long in a predetermined direction. As described above, the predetermined direction is a direction optically corresponding to the X-axis direction which is the longitudinal direction of the line illumination LA.

The interval YL representing the phase difference between the pair of images 72A and 72B may include positions at different intervals depending on the positions in the XA-axis direction which is the longitudinal direction of these images. In addition, the image 72A and the image 72B are not limited to the image as a perfect strain line, and may be an image as a line including partially bent regions. The width (thickness) of each of the image 72A and the image 72B as lines also varies depending on the focus shift. The width of each of the image 72A and the image 72B represents the length of each of the image 72A and the image 72B in the YA-axis direction.

Therefore, as described above, it is preferable that the phase difference acquisition unit 60I calculate, as the interval YL, the distance between the centroid ga in the XA-axis direction and the YA-axis direction of the image 72A and the centroid gb in the XA-axis direction and the YA-axis direction of the image 72B.

Additionally, the phase difference acquisition unit 60I may calculate the interval YL by the following method.

For example, after adjusting the brightness and contrast of the pupil-split picture 70 by adjusting the light intensity value of the pupil-split picture 70, the phase difference acquisition unit 60I may calculate the centroid g and the interval YL of each of the image 72A and the image 72B similarly to the method described above.

The phase difference acquisition unit 60I may calculate the centroid g and the interval YL of each of the image 72A and the image 72B in the same manner as described above.

For example, among individual positions in the XA-axis direction which is the direction optically corresponding to the longitudinal direction of the line illumination LA in each of the centroid g of the image 72A and the image 72B, the phase difference acquisition unit 60I specifies the position of the centroid g having the light intensity value being the first threshold or more and the second threshold or less. The phase difference acquisition unit 60I may then calculate an interval between the centroid g representing the phase difference of the image 72A at the specified position and the centroid g of the image 72B, as the interval YL.

The first threshold and the second threshold may be preset to values larger than the minimum value of the light intensity value that can be output by the light receiving unit 41 and smaller than the maximum value. In addition, the second threshold needs to be a value larger than the first threshold.

Furthermore, it is allowable to configure such that, for example, after adjusting the light intensity value of the pupil-split picture 70 by weighting, the phase difference acquisition unit 60I specifies the centroid g of each of the image 72A and the image 72B and calculates the interval YL.

In this case, the phase difference acquisition unit 60I corrects the light intensity value, which is the gradation value of each pixel constituting the pupil-split picture 70, such that the higher the light intensity value, the higher weighting is to be applied. Subsequently, the phase difference acquisition unit 60I calculates the centroid g for each position in the XA-axis direction, which is a direction optically corresponding to the longitudinal direction of the line illumination LA, for the image 72A and the image 72B included in the corrected pupil-split picture 70. The phase difference acquisition unit 60I may then calculate, as the interval YL, the distance between the centroid g at the position where the light intensity value is a fifth threshold or more in the XA-axis direction of the image 72A and the image 72B. The fifth threshold may be determined in advance.

In addition, for example, the phase difference acquisition unit 60I divides each of the image 72A and the image 72B into a plurality of split regions in the XA-axis direction which is a direction optically corresponding to the longitudinal direction of the line illumination LA. Subsequently, the phase difference acquisition unit 60I specifies the centroid g of each of the included images 72A and 72B for each split region. Furthermore, for each of the image 72A and the image 72B, the phase difference acquisition unit 60I specifies a position indicating an average value of the maximum light intensity values of each of the split regions. The phase difference acquisition unit 60I may then calculate the interval in the YA-axis direction between the positions in the pupil-split picture 70 as the interval YL.

Furthermore, for example, the phase difference acquisition unit 60I fits the width direction of each of the image 72A and the image 72B in the YA-axis direction to a quadratic function or a Gaussian for each pixel unit in the XA-axis direction. Subsequently, the phase difference acquisition unit 60I may calculate, as the interval YL, the distance between the modes of the peaks of the image 72A and the image 72B corresponding to the phase difference after the fitting.

Note that the phase difference acquisition unit 60I may use any of the above methods as a method of calculating the interval YL. For example, the phase difference acquisition unit 60I may specify the method of calculating the interval YL according to the type of the specimen T as a measurement target. The phase difference acquisition unit 60I may then calculate the interval YL by the specified calculation method. The method of calculating the interval YL by the phase difference acquisition unit 60I is not limited to the above method. For example, the phase difference acquisition unit 60I may calculate, as interval YL, a distance between the centers of the line widths of image 72A and image 72B formed in a region having a light intensity value being a certain threshold or more.

Return to FIG. 5, and description will continue. The relative distance derivation unit 60J calculates the relative position between the objective lens 22 and the specimen T using the interval YL received from the phase difference acquisition unit 60I. Specifically, the relative distance derivation unit 60J calculates, as the relative position, the relative movement amount and the relative movement direction according to a difference between the interval YL and a reference interval.

The reference interval is the interval YL between the image 72A and the image 72B when the objective lens 22 is focused on the specimen T. Regarding the reference interval, the present embodiment uses the interval YL between the image 72A and the image 72B when the objective lens 22 and the specimen T on the stage 26 are adjusted to the initial relative positions by the reference focus unit 60C, as the reference interval.

Here, the interval YL corresponding to the phase difference between the image 72A and the image 72B constituting the pupil-split image 72 having the phase difference is proportional to a focal length between the objective lens 22 and the specimen T. This allows the relative distance derivation unit 60J to calculate the relative position by using the difference between the interval YL and the reference interval. As described above, the relative position is the relative position of one of the objective lens 22 and the specimen T with respect to the other. The relative position is represented by the movement direction and the movement amount of at least one of the objective lens 22 and the specimen T with respect to the current position of each of the objective lens 22 and the specimen T. The movement direction and the movement amount are represented by, for example, a displacement amount $\Delta Z$ in the Z-axis direction of the focus position of the objective lens 22.

The twin-lens phase difference method is a method of calculating the displacement amount $\Delta Z$ in the Z-axis direction with respect to the reference position from the phase difference of the image. That is, the calculation of the relative position means the calculation of the phase difference of the image, which represents the calculation of the displacement amount $\Delta Z$. In the present embodiment, by calculating the displacement amount $\Delta Z$, the relative distance derivation unit 60J calculates the relative position displacement between the objective lens 22 and the specimen T.

The displacement amount $\Delta Z$ represents the relative movement amount and the relative movement direction of the objective lens 22 and the specimen T. That is, an absolute value $|\Delta Z|$ of the displacement amount $\Delta Z$ represents the relative movement amount, and a positive/negative sign of the displacement amount $\Delta Z$ represents a relative movement direction.

FIG. 9 illustrates an example in which 17 pupil-split pictures 70 acquired while changing the distance between the objective lens and the specimen by line illumination are arranged in a strip shape for comparison. It can be seen that the line interval on the right side is wider than that on the left side. In this manner, the phase change amount of the image can be acquired from the pupil-split image 72 as the relative distance change between the image 72A and the image 72B.

In the control unit 60 of the present embodiment, the initial relative position is adjusted by the reference focus unit 60C before the derivation unit 60E derives the displacement amount $\Delta Z$. Subsequently, the relative distance derivation unit 60J uses the interval between the image 72A and the image 72B when the objective lens 22 and the specimen T are adjusted to the initial relative positions by the reference focus unit 60C, as a reference interval YL'.

Figure 10:
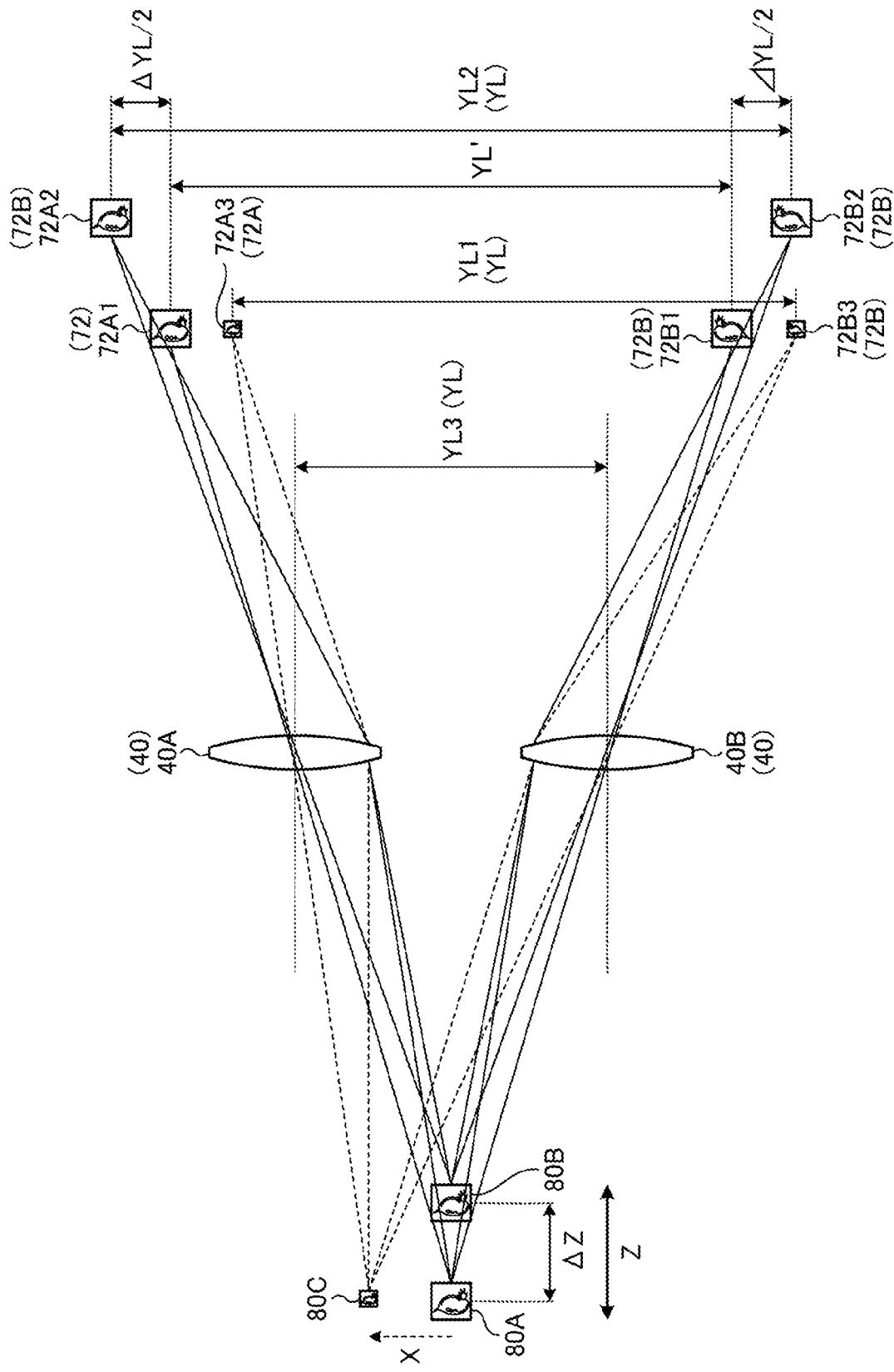
FIG. 10 is an explanatory diagram of a phase difference according to the embodiment of the present disclosure.

FIG. 10 is an explanatory diagram of a step of acquiring a phase difference. FIG. 10 illustrates the reference interval YL' as a distance between an image 72A1 and an image 72B1 when a position 80A being the position of the specimen T is in focus, that is, when the focus adjustment is achieved. The image 72A1 and image 72A2 are examples of the image 72A and the image 72B.

Here is an assumable case where, by scanning the line illumination LA in the scanning direction (Y-axis direction) after the initial relative position is adjusted by the reference focus unit 60C, the imaging region of the image capture unit 34 in the measurement target region 24 has been changed. This might cause a change in the distance between the specimen T and the objective lens 22. With this change, the focus position changes by the displacement amount $\Delta Z$ in the Z-axis direction. Due to this change in the displacement amount $\Delta Z$, the interval YL between the image 72A and the image 72B is different from the reference interval YL'.

For example, when the position of the specimen T has been changed to a position 80B shifted by the displacement amount $\Delta Z$ in the Z-axis direction from the actual position 80A of the specimen T, the interval YL is an interval YL2 different from the reference interval YL'. The interval YL2 is an example of the interval YL, and is an interval between the image 72A2 and the image 72B2. The image 72A2 and the image 72B2 are examples of the image 72A and image 72B, respectively.

In addition, in a case where there is a specimen at a position 80C shifted from the position 80A in the X-axis direction, the interval YL1 is the same as the reference interval YL'. The interval YL1 is an example of the interval YL, and is an interval between an image 72A3 and an image 72B3. The image 72A3 and the image 72B3 are examples of the image 72A and image 72B, respectively.

Therefore, the relative distance derivation unit 60J may calculate the relative position between the objective lens 22 and the specimen T by inversely calculating the displacement amount $\Delta Z$ from a difference $\Delta YL$ between the reference interval YL' and the interval YL between the image 72A and the image 72B constituting the pupil-split picture 70 acquired by the pupil-split image acquisition unit 60D.

Note that, as described above, an absolute value $|\Delta Z|$ of the displacement amount $\Delta Z$ represents the relative movement amount, and a positive/negative sign of the displacement amount $\Delta Z$ represents a relative movement direction. Accordingly, the relative distance derivation unit 60J calculates the relative movement amount $|\Delta Z|$ and the positive/ negative values of ΔZ being the relative movement direction, as the relative position according to the displacement amount ΔZ corresponding to the difference ΔYL between the interval YL and the reference interval YL'.

The following Formulas (3) and (4) are paraxial calculations for FIG. 10.

$$m' = \frac{S_i}{S_o'} = \frac{S_i}{S_o + \Delta S_o} = \frac{S_i}{\frac{S_i}{m} + \Delta S_o} \quad \text{Formula (4)}$$

$$= \frac{mS_o}{S_o + \Delta S_o}$$

$$\Delta y_i = 2(m' - m)y_o = 2\left(\frac{mS_o}{S_o + \Delta S_o} - m\right)y_o \quad \text{Formula (5)}$$

$$= -2\frac{mS_o}{S_o + \Delta S_o}y_0 \sim -2\frac{m\Delta S_o}{S_o}y_0$$

In Formulas (3) and (4), Δyi represents a difference ΔYL between the interval YL and the reference interval YL'. m is an imaging magnification of the image 72A1 and the image 72B1 when the specimen T is at the position 80A. m' is an imaging magnification of the image 72A1 and the image 72B1 when the specimen T is at the position 80B. Si is a distance in the Z direction from the image 72A1 to the separator lens 40A or from the image 72B1 to the separator lens 40B. So is a distance in the Z direction from the position 80A of the specimen T to the separator lens 40A or 40B. ΔSo is the amount of change in the Z direction of the specimen T and is equal to ΔZ in FIG. 10. In addition, Δyi represents a difference ΔYL between the interval YL and the reference interval YL'. Yo is a half of the interval YL.

As illustrated in FIG. 10, here is an assumable case where the position 80B is in focus, the position 80B being the position shifted from the position 80A of the specimen T in the Z-axis direction by the displacement amount ΔZ. In this case, the distance between the separator lens 40 and the pupil-split image capture unit 42 does not change. However, the magnification of the pupil-split image 72 having the phase difference and formed on the pupil-split image capture unit 42 changes from m to m'. At this time, the positions of the image 72A and the image 72B, which are images of the specimen T formed on the pupil-split image capture unit 42, change to positions having the interval YL2 obtained by adding ΔY to the reference interval YL' corresponding to the focal shift.

The relative distance derivation unit 60J calculates the difference ΔYL between the interval YL2 and the reference interval YL' using the two-dimensional coordinates of the light receiving surface 43 of the pupil-split image capture unit 42. Subsequently, the relative distance derivation unit 60J calculates the displacement amount ΔZ in the focus using the difference ΔYL.

As indicated in the above Formulas (3) and (4), in a range where the displacement amount ΔZ is small, a proportional relationship of the displacement amount ΔZ∝difference ΔYL is established. Therefore, the relative distance derivation unit 60J can obtain the displacement amount ΔZ from the difference ΔYL. Alternatively, the displacement amount ΔZ and the difference ΔYL have a certain correlation. Therefore, the relative distance derivation unit 60J may create in advance a function or a lookup table representing the correlation between the displacement amount ΔZ and the difference ΔYL. In this case, the relative distance derivation unit 60J can calculate the displacement amount ΔZ using the difference ΔYL between the interval YL2 and the reference interval YL' and using the function or the lookup table.

The relative distance derivation unit 60J may calculate the relative position by calculating the displacement amount ΔZ using the reference interval YL' stored in advance in the storage unit 62.

However, in the same measurement target region 24, the relationship between the optical distance and the physical distance is considered to be substantially constant. Therefore, before obtaining a captured image for use in analysis or the like of the specimen T in the microscope system 1, it is preferable to adjust the initial relative position by the reference focus unit 60C and derive the reference interval YL'.

Return to FIG. 5, and description will continue. The movement control unit 60F causes at least one of the objective lens 22 and the specimen T to move to the relative position derived by the derivation unit 60E. The movement control unit 60F controls the movement of at least one of the first drive unit 44 and the second drive unit 46 such that at least one of the objective lens 22 and the stage 26 moves in the Z-axis direction. For example, the movement control unit 60F controls the movement of the first drive unit 44 such that the stage 26 moves in a relative movement direction according to the relative movement amount |ΔZ| represented by the displacement amount ΔZ derived as the relative position and the positive/negative values of the displacement amount ΔZ. Under the control of the movement control unit 60F, the objective lens 22 and the specimen T are moved in a direction of approaching each other or a direction of separating from each other in the Z-axis direction. That is, the relative position in the Z-axis direction between the objective lens 22 and the specimen T is adjusted to be the relative position derived by the derivation unit 60E, so as to achieve a focus adjustment state in which the specimen T is in focus.

In synchronization with the movement control performed by the movement control unit 60F, the captured image acquisition unit 60B acquires a captured image of light emitted from the specimen T from the image capture unit 34.

The output control unit 60G outputs the captured image acquired by the captured image acquisition unit 60B to an external device such as the server device 10 via the communication unit 64. The output control unit 60G may store the captured image acquired by the captured image acquisition unit 60B in the storage unit 62. Furthermore, the output control unit 60G may output the captured image to a display connected to the control unit 60.

By analyzing the captured image acquired by the captured image acquisition unit 60B using the known method, the output control unit 60G may analyze the type or the like of the specimen T and output the analysis result to the server device 10 or the like.

Next, an example of a flow of information processing executed by the control device 16 according to the present embodiment will be described.

Figure 11:
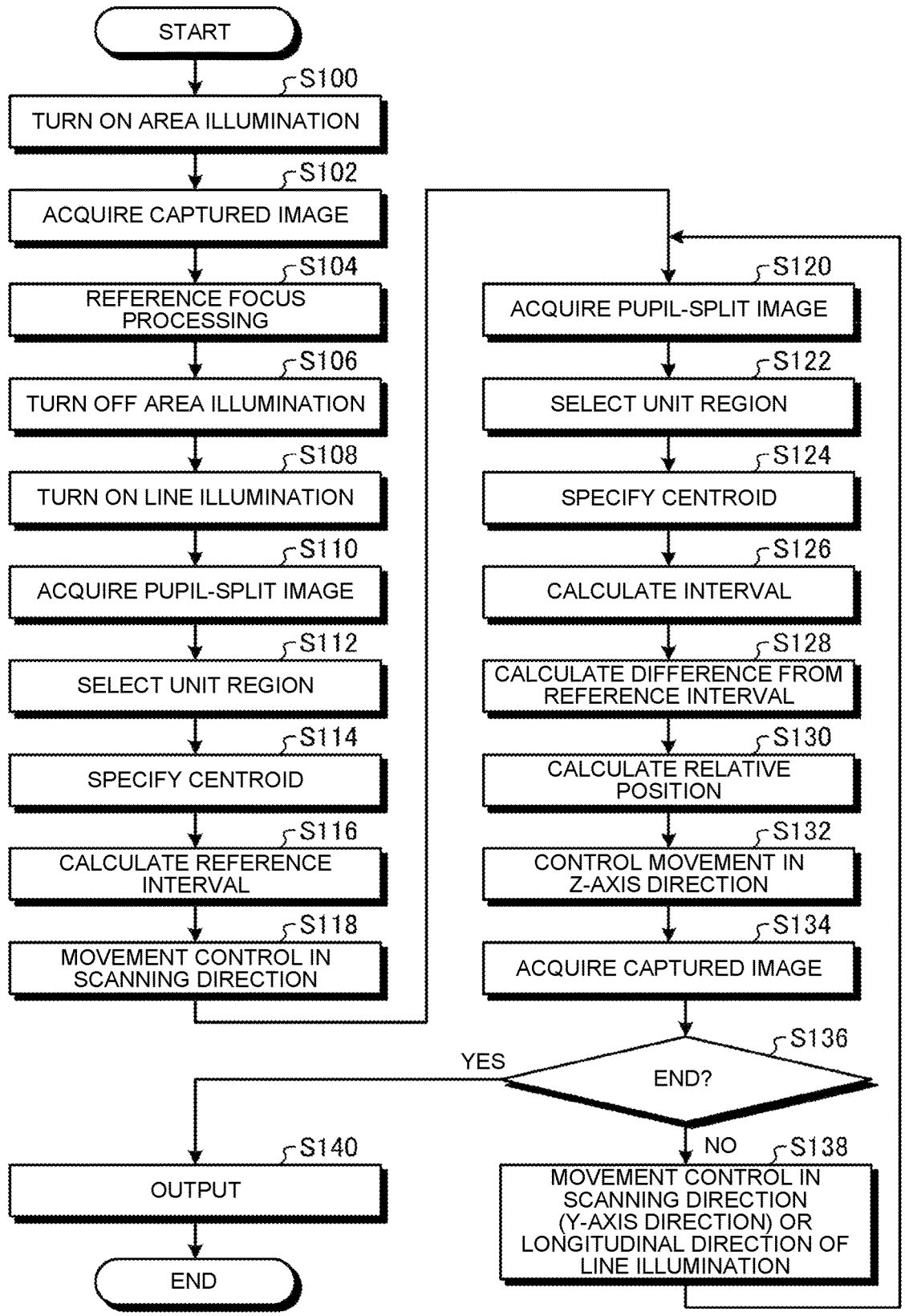
FIG. 11 is a flowchart illustrating an example of a flow of information processing according to the embodiment of the present disclosure.

FIG. 11 is a flowchart illustrating an example of a flow of information processing executed by the control device 16. It is assumed that the measurement target region 24 including the specimen T is placed on the stage 26 before the control device 16 executes the following information processing. The placement of the measurement target region 24 on the stage 26 may be performed manually or may be automatically controlled using a loader, a manipulator, or the like.

The light source control unit 60A controls the light source 18B to turn off the line illumination LA and turn on the area illumination LB (step S100). With the control in step S100, the line illumination LA is emitted from the light source 18B.

The captured image acquisition unit 60B acquires, from the image capture unit 34, the first captured image of light emitted from the specimen T irradiated with the area illumination LB (step S102).

Using the first captured image acquired in step S102, the reference focus unit 60C performs reference focus processing (step S104). In step S104, the reference focus unit 60C calculates the contrast ratio of the first captured image acquired in step S102. The reference focus unit 60C repeats the movement of the objective lens 22 in the Z-axis direction under the control of the movement control unit 60F and the calculation of the contrast ratio of the first captured image acquired from the image capture unit 34. With this repetition processing, the reference focus unit 60C adjusts the initial relative position between the objective lens 22 and the specimen T to a position where the contrast ratio is maximized.

Next, the light source control unit 60A controls the light source 18B to turn off the area illumination LB (step S106). Then, the light source control unit 60A controls the light source 18B to turn on the line illumination LA (step S108). With the control in step S108, the line illumination LA is emitted from the light source 18B.

The pupil-split image acquisition unit 60D acquires the pupil-split picture 70 from the pupil-split image capture unit 42 to acquire the pupil-split image 72 being an image of light emitted from the specimen T irradiated with the line illumination LA (step S110).

Next, the selection unit 60H selects the unit region 37 including the light receiving unit 41 set to a specific light sensitivity from among the plurality of types of unit regions 37 (step S112). The selection unit 60H selects the unit region 37 including the light receiving unit 41 that has output the light intensity value within a predetermined gradation value range (for example, the gradation value ranges of 10 or more and 250 or less) in the pupil-split picture 70 acquired in step S110. The selection unit 60H then outputs the pupil-split picture 70 including the image 72A and the image 72B having the light intensity value of the light receiving unit 41 included in the selected unit region 37 in the pupil-split picture 70 acquired in step S110 to the phase difference acquisition unit 60I.

Next, the phase difference acquisition unit 60I specifies the centroid g of each of the set of images 72A and 72B constituting the pupil-split image 72 received from the selection unit 60H (step S114). The phase difference acquisition unit 60I then calculates the interval between the specified centroids g as a reference interval YL' between the image 72A and the image 72B (step S116).

The reference focus processing is performed by the processing of steps S100 to S116, and the reference interval YL' is calculated.

Next, the movement control unit 60F controls the movement of the first drive unit 44 such that the irradiation position of the line illumination LA becomes the initial position in the scanning direction (Y-axis direction) of the measurement target region 24 (step S118).

Next, the pupil-split image acquisition unit 60D acquires the pupil-split picture 70 from the pupil-split image capture unit 42, thereby acquiring the pupil-split image 72 being the image 72A and the image 72B of the light emitted from the specimen T irradiated with the line illumination LA (step S120).

Next, similarly to step S112, the selection unit 60H selects the unit region 37 including the light receiving unit 41 set to a specific light sensitivity among the plurality of types of unit regions 37 (step S122). The selection unit 60H then outputs, to the phase difference acquisition unit 60I, the pupil-split picture 70 including the image 72A and the image 72B having the light intensity value of the light receiving unit 41 included in the selected unit region 37 in the pupil-split picture 70 acquired in step S120.

The phase difference acquisition unit 60I specifies (step S124) the centroid g of each of the set of images 72A and 72B constituting the pupil-split image 72 included in the pupil-split picture 70 received from the selection unit 60H in step S122. The phase difference acquisition unit 60I then calculates the interval between the specified centroids g as an interval YL between the image 72A and the image 72B (step S126).

Next, the relative distance derivation unit 60J calculates a difference $\Delta$YL between the interval YL calculated in step S126 and the reference interval YL' calculated in step S116 (step S128).

Next, by inversely calculating the displacement amount $\Delta$Z from the difference $\Delta$YL calculated in step S128, the relative distance derivation unit 60J calculates relative position information indicating the relative position between the objective lens 22 and the specimen T (step S130).

By controlling the movement of at least one of the first drive unit 44 and the second drive unit 46, the movement control unit 60F causes at least one of the objective lens 22 and the stage 26 to move in the Z-axis direction (step S132). Specifically, the movement control unit 60F causes at least one of the objective lens 22 and the specimen T to move in the relative movement direction according to the relative movement amount $|\Delta Z|$ represented by the displacement amount $\Delta$Z derived as the relative position in step S130 and the positive/negative values of the displacement amount $\Delta$Z. For example, the movement control unit 60F controls the movement of at least one of the first drive unit 44 and the second drive unit 46 such that at least one of the objective lens 22 and the stage 26 moves along the Z-axis direction. Specifically, the movement control unit 60F controls the movement of the first drive unit 44 such that the stage 26 moves in a relative movement direction according to the relative movement amount $|\Delta Z|$ represented by the displacement amount $\Delta$Z derived as the relative position and the positive/negative values of the displacement amount $\Delta$Z.

With the control of step S132, the objective lens 22 and the specimen T are moved in a direction of approaching each other or a direction of separating from each other in the Z-axis direction. That is, the relative position in the Z-axis direction between the objective lens 22 and the specimen T is adjusted to be the relative position calculated in step S130, so as to achieve a focus adjustment state in which the specimen T is in focus.

Next, the captured image acquisition unit 60B acquires the second captured image 74 of the light emitted from the specimen T from the image capture unit 34 (step S134). The second captured image 74 acquired in step S134 is a captured image at a position in the scanning direction (Y-axis direction) of the measurement target region 24.

The control unit 60 determines whether to end the acquisition of the second captured image 74 (step S136). The control unit 60 discerns whether the line illumination LA has been scanned from one end to the other end in the scanning direction in the measurement target region 24, thereby making the determination in step S136. When a negative determination is made in step S136 (step S136: No), the processing proceeds to step S138.

In step S138, the movement control unit 60F controls the movement of the first drive unit 44 so as to move the stage 26 in the scanning direction (Y-axis direction) by the width of the line illumination LA (step S138). With the processing in step S138, the irradiation position of the line illumination LA in the scanning direction (Y-axis direction) of the measurement target region 24 is moved in the scanning direction by the width of the line illumination LA. Subsequently, the processing returns to step S120 described above.

In step S136, the control unit 60 may discern whether the line illumination LA has been scanned from one end to the other end in the scanning direction in the measurement target region 24 and whether the line illumination LA has been scanned from one end side to the other end side in the X-axis direction in the measurement target region 24 to make the determination in step S136. In this case, in step S138, the movement control unit 60F may shift the irradiation position of the line illumination LA in the X-axis direction every time the scanning of the line illumination LA is completed from one end to the other end in the scanning direction of the measurement target region 24, and may then return to step S120.

Furthermore, the irradiation of the line illumination LA may be turned off during the movement of the stage 26 by the processing of step S138. It is also allowable to configure such that, when the movement of the stage 26 is stopped, the line illumination LA will be turned on again, the processing will be executed after returning to step S120.

In contrast, when an affirmative determination is made in step S136 (step S136: Yes), the processing proceeds to step S140. In step S140, the output control unit 60G stores the second captured image 74 from one end to the other end in the scanning direction of the measurement target region 24 in the storage unit 62 as a captured image of the specimen T included in the measurement target region 24 (step S140). This completes the present routine.

As described above, the microscope system 1 of the present embodiment includes the irradiation unit 18, the stage 26, the pupil-split image acquisition unit 60D, the objective lens 22, the derivation unit 60E, and the movement control unit 60F. The irradiation unit 18 emits the line illumination LA parallel to the first direction. The stage 26 supports the specimen T and is movable in a second direction perpendicular to the first direction. The pupil-split image acquisition unit 60D acquires the phase difference of the image of the light emitted from the specimen T by being irradiated with the line illumination LA. The objective lens 22 condenses the line illumination LA on the specimen T. The derivation unit 60E derives relative position information between the objective lens 22 and the specimen T based on the phase difference (for example, phase difference increase/decrease information and the like). Based on the relative position information, the movement control unit 60F causes at least one of the objective lens 22 and the stage 26 to move in a third direction vertical to the first direction and the second direction.

Here, there is a technique, disclosed as a conventional technique, of performing focus adjustment to bring a specimen T in focus by a contrast method of changing a focus to maximize the contrast ratio of a captured image of the entire region including the specimen T.

The contrast method, however, is a method using a hill-climbing method that performs repetition control accompanied with physical movement such as movement of the objective lens 22, acquisition of a captured image, and acquisition and comparison of a plurality of captured images before and after the focus position. For this reason, the conventional technique takes time to adjust the focus in some cases.

In addition, there is a technique, disclosed as a conventional technique, of performing focus adjustment on a specimen T using a set of subject images included in a pupil-split picture of the entire region including the specimen T. In this technique, however, each of the set of subject images is a subject image of the entire region including the specimen T. Because of this, the conventional technique has had a need to further specify some feature points from within the specimen T in the subject image and to perform focus adjustment using these specified regions. Therefore, in order to extract some feature points from the pupil-split two-dimensional image of the specimen T, it may take additional time for the focus adjustment by the extraction time in the conventional technique.

Furthermore, there is a technique, disclosed as a conventional technique, having a configuration in which focusing image sensors are arranged in front and rear of the focus position. In this conventional technique, focus adjustment is performed by analyzing captured images obtained by the plurality of image sensors. Although the use of this method is considered to be able to achieve high-speed focus adjustment, it is necessary to align the positions of the two independent image sensors with high accuracy, making it difficult to achieve high-accuracy focus adjustment.

Compared to these techniques, the microscope system 1 of the present embodiment irradiates the specimen T with the line illumination LA, and acquires the phase difference of the image of the light emitted from the specimen T irradiated with the line illumination LA. In addition, the microscope system 1 derives relative position information between the objective lens 22 and the specimen T based on the light intensity information regarding the image 72A and the image 72B, and causes at least one of the objective lens 22 and the stage 26 to move in the third direction.

In this manner, the microscope system 1 of the present embodiment derives the relative position information between the objective lens 22 and the stage 26 based on the light intensity distribution of the pupil-split image 72 obtained by the irradiation of the line illumination LA. Therefore, since the relative position information represented by the displacement amount $\Delta Z$ can be derived without searching for the focus position, the focus can be adjusted to the specimen T at high speed.

In addition, in the microscope system 1 of the present embodiment, the specimen T is irradiated with the line illumination LA, and the focus adjustment is performed using the pupil-split image 72 of the light emitted from the specimen T irradiated with the line illumination LA. Therefore, in the microscope system 1 of the present embodiment, focus adjustment can be performed without specifying a plurality of feature points from the specimen T included in the pupil-split image 72. This makes it possible for the microscope system 1 of the present embodiment to perform focus adjustment at high speed regardless of the size of the specimen T, the number of tissues of the specimen T, and the like. In addition, as compared with a case where focus adjustment is performed using the pupil-split image 72 of light emitted from the specimen T irradiated with the area illumination LB, the microscope system 1 of the present embodiment only needs to process data of a data amount smaller by one digit or more, leading to achievement of high-speed focus adjustment of the specimen T.

Therefore, the microscope system 1 of the present embodiment can achieve high-speed and highly accurate focus adjustment.

In addition, the microscope system 1 of the present embodiment performs focus adjustment using the pupil-split image 72 of light emitted from the specimen T irradiated with the line illumination LA. Therefore, the microscope system 1 of the present embodiment can achieve robust and stable focus adjustment with a simple configuration in addition to the above effects.

In addition, in the microscope system 1 of the present embodiment, the line illumination LA is used as illumination to be emitted at acquisition of the pupil-split image 72. This makes it possible to shorten the light irradiation time with respect to the specimen T as compared with the case without the use of the line illumination. Therefore, the microscope system 1 of the present embodiment can suppress fading of the specimen T in addition to the above effects.

The present embodiment has described, as an example, a mode in which the specimen T is irradiated with the line illumination LA at acquisition of the pupil-split image 72 and the specimen T is also irradiated with the line illumination LA at acquisition of the second captured image 74. However, at acquisition of the second captured image 74, the specimen T may be irradiated with the area illumination LB. In this case, for example, it is also allowable to use, as the area illumination LB, light in a wavelength region different from that of the line illumination LA. In addition, it is allowable to use a configuration including, in the half mirror 28, a filter that selectively reflects the light emitted from the specimen T by the irradiation of the line illumination LA to the phase difference detection optical unit 36 and transmits the light emitted from the specimen T by the irradiation of the area illumination LB to the imaging optical unit 30.

Furthermore, the optical axis of the image capture unit 34 and the optical axis of the pupil-split image capture unit 42 may be in alignment or non-alignment with each other. Still, it is preferable to adjust the arrangement of the pupil-split image capture unit 42 and the pupil-split image capture unit 34 such that the incidence of light on the pupil-split image capture unit 34 precedes the incidence of light on the pupil-split image capture unit 42 in the scanning direction (Y-axis direction) of the line illumination LA.

Furthermore, in the present embodiment, the case where the phase difference detection optical unit 36 is an optical unit for obtaining a twin-lens pupil-split image has been described as an example. However, the phase difference detection optical unit 36 only needs to be an optical unit for obtaining the phase difference of the pupil-split image 72, and may be an optical unit for obtaining the pupil-split image 72 of triple lenses or more as described above. Furthermore, the phase difference detection optical unit 36 may be an off-axis optical system offset from the optical axis. The off-axis optical system is an optical system using one or more lenses off the optical axis. In this case, the control unit 60 may derive the relative position information by calculating the difference ΔYL from the optical system using the off-axis lens.

(First Modification)

The above-described embodiment has described a mode in which the microscope system 1 acquires the second captured image 74 every time at least one of the objective lens 22 and the specimen T is caused to move to the relative position represented by the displacement amount ΔZ derived by the derivation unit 60E. That is, the embodiment described above has described a mode in which the second captured image 74 is acquired every time the focus is adjusted onto the specimen T at each position in the scanning direction of the measurement target region 24.

Alternatively, the microscope system 1 may acquire the Z-stack image as the second captured image 74 at each position in the scanning direction of the measurement target region 24.

In this case, the control unit 60 may execute the following processing every time at least one of the objective lens 22 and the specimen T is caused to move to the relative position represented by the displacement amount ΔZ derived by the derivation unit 60E.

For example, the position, in the Z-axis direction, of the objective lens 22 and the specimen T located at the relative position derived by the derivation unit 60E is defined as a position where the displacement amount ΔZ is "0". Here is an assumable case where nine Z-stack images are acquired at intervals of 0.5 μm in the range of ±2 μm in the Z-axis direction with respect to the specimen T. In this case, the control unit 60 may execute the following control.

Specifically, it is assumed that the value of the difference ΔYL at which the displacement amount ΔZ is 0.5 um is a difference ΔYL0. The movement control unit 60F causes the objective lens 22 to move stepwise in the Z-axis direction so that the difference ΔYL is as follows.

$$\Delta YL=4\Delta YL0, 3\Delta YL0, 2\Delta YL0, 1\Delta YL0, 0, -\Delta YL0, -2\Delta YL0, -3\Delta YL0, -4\Delta YL0$$

Subsequently, the captured image acquisition unit 60B acquires the second captured image 74 for each movement of the objective lens 22 in the Z-axis direction, thereby acquiring nine Z-stack images.

Through these steps of processing, the control unit 60 can acquire nine Z-stack images as the second captured image 74 every time at least one of the objective lens 22 and the specimen T is caused to move to the relative position represented by the displacement amount ΔZ derived by the derivation unit 60E. The number of Z-stack images is not limited to nine.

Figure 12A:
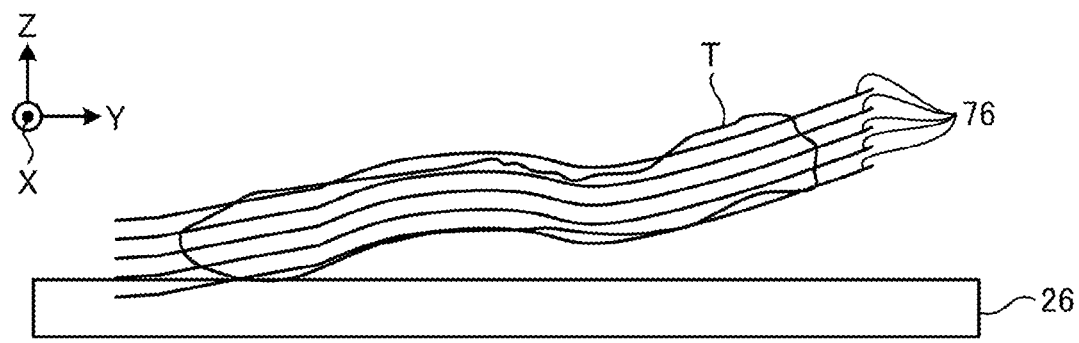
FIG. 12A is an explanatory diagram of a Z-stack image according to a modification of the present disclosure.
Figure 12B:
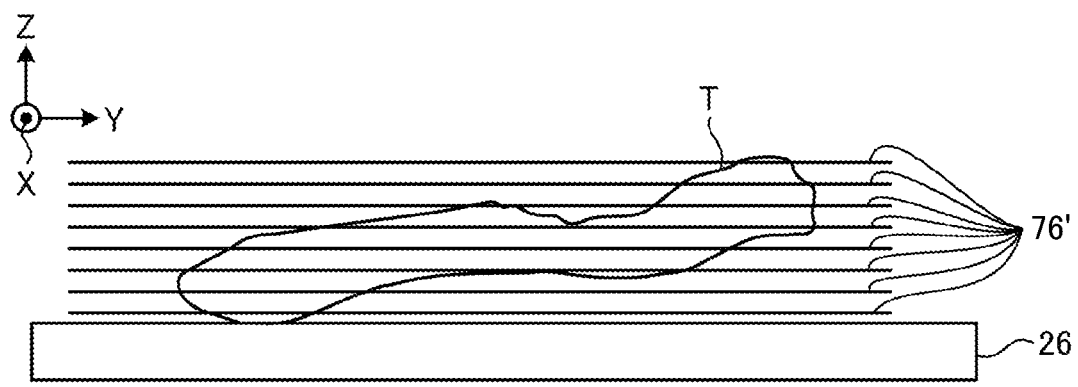
FIG. 12B is an explanatory diagram of a conventional Z-stack image.

FIG. 12A is an explanatory diagram of a Z-stack image obtained by the processing of the present modification. FIG. 12B is an explanatory diagram of a conventional Z-stack image.

As illustrated in FIG. 12B, in the conventional technique, a Z-stack image 76' has been acquired in parallel to the two-dimensional plane of the stage 26. On the other hand, in the present modification, as illustrated in FIG. 12A, even when the specimen T is placed on the stage 26 so as to be inclined with respect to the two-dimensional plane, a Z-stack image 76 at each position before and after the displacement amount ΔZ can be acquired from the surface of the specimen T, the bottom surface of the specimen T, the surface between the surface and the bottom surface, and the like.

(Second Modification)

The above-described embodiment has described, as an example, a mode in which the microscope system 1 executes real-time focusing of performing focus adjustment based on the interval YL between the image 72A and the image 72B constituting the pupil-split image 72 included in the pupil-split picture 70 every time the pupil-split picture 70 is acquired.

However, the microscope system 1 may create a focus map for adjusting the focus to each position of the specimen T and may adjust the focus to each position of the specimen T according to the focus map. In addition, it is also allowable to use the microscope system 1 to acquire, instead of a focus map, a three-dimensional surface conformational structure including also the Z-axis direction of the specimen T.

In the case of acquiring the focus map, the control unit 60 may execute the following processing. In addition, also in the case of acquiring the three-dimensional surface conformational structure, the processing is the same.

Similarly to the above-described embodiment, the phase difference acquisition unit 60I calculates the interval YL being an inter-image interval between a set of images 72A and 72B constituting the pupil-split image 72. At this time, the phase difference acquisition unit 60I calculates the interval YL for each position in the extending direction (X-axis direction) between the set of images 72A and 72B constituting the pupil-split image 72. Regarding the calculation of the interval YL, it is sufficient to calculate the interval YL between the centroid ga of the image 72A and the centroid gb of the image 72B for each position in the X-axis direction.

By calculating the displacement amount $\Delta Z$ for each position in the X-axis direction using the interval YL received from the phase difference acquisition unit 60I, the relative distance derivation unit 60J may preferably calculate the relative position between the objective lens 22 and the specimen T.

The phase difference acquisition unit 60I and the relative distance derivation unit 60J repeatedly execute the above processing each time the irradiation position of the line illumination LA in the measurement target region 24 is changed in the scanning direction (Y-axis direction) or the X-axis direction. Through these steps of processing, the derivation unit 60E can calculate the displacement amount $\Delta Z$ at each position over the two-dimensional plane defined by two axes in the X-axis direction and the Y-axis direction of the measurement target region 24.

Thereafter, the derivation unit 60E only needs to register the position coordinates of each position on the two-dimensional plane defined from two axes in the X-axis direction and the Y-axis direction of the measurement target region 24 and the calculated displacement amount $\Delta Z$ to the focus map in association with each other. Note that the derivation unit 60E only needs to register, to the focus map, at least one of the displacement amount $\Delta Z$ and the relative position represented by the displacement amount $\Delta Z$.

At the acquisition of the second captured image 74 by the image capture unit 34, the derivation unit 60E specifies, from the focus map, the displacement amount $\Delta Z$ corresponding to the position of the imaging region of the second captured image 74 in the measurement target region 24. Thereafter, the control unit 60 only needs to adjust the relative position between the objective lens 22 and the specimen T to the relative position represented by the specified displacement amount $\Delta Z$ so as to acquire the second captured image 74.

Figure 13:
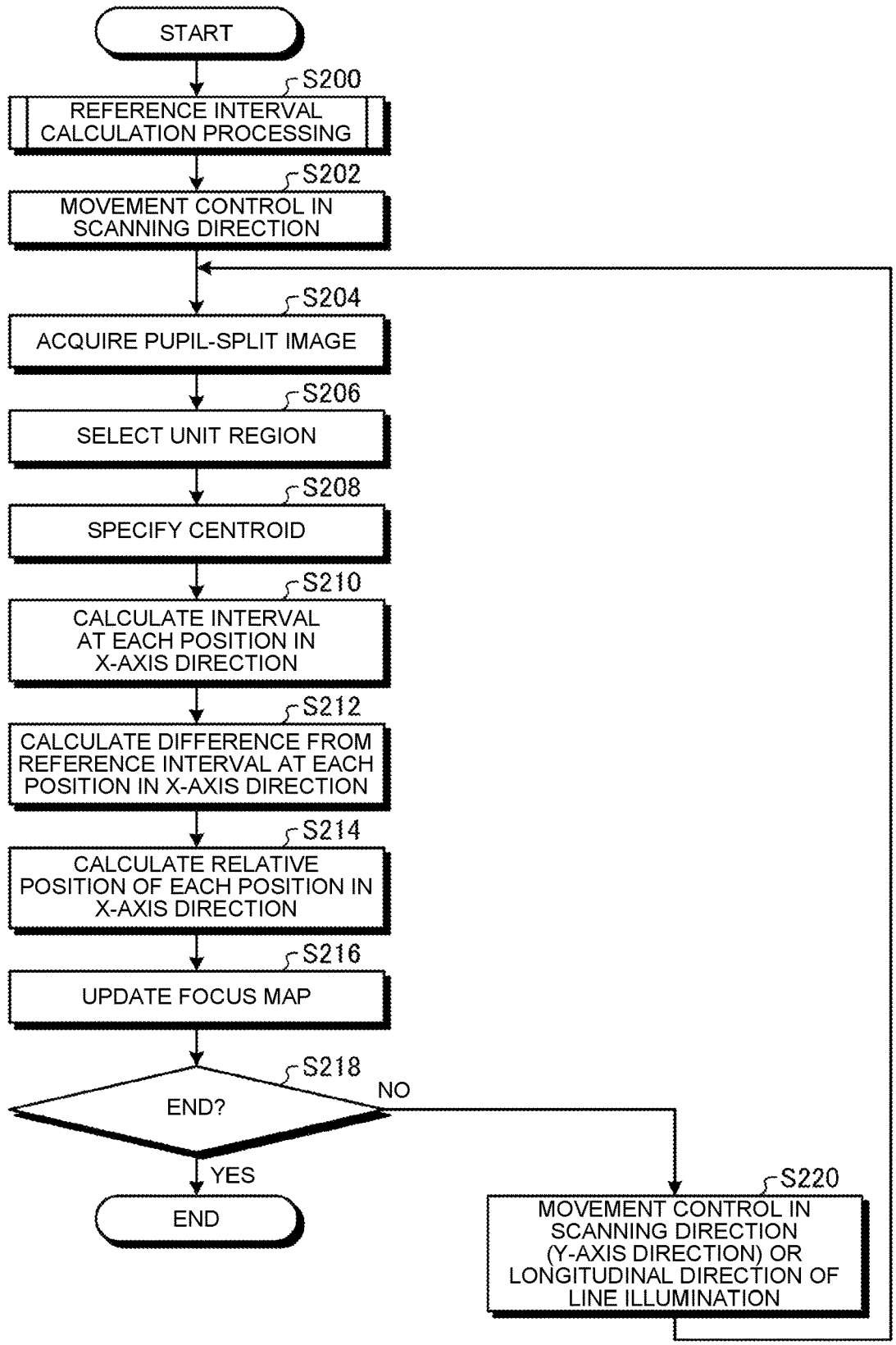
FIG. 13 is a flowchart illustrating an example of a flow of focus map creation processing according to the modification of the present disclosure.

FIG. 13 is a flowchart illustrating an example of a flow of focus map creation processing.

First, the reference focus unit 60C executes reference interval YL' calculation processing (step S200). The processing of step S200 is similar to steps S100 to S116 described with reference to FIG. 11.

Next, the movement control unit 60F controls the movement of the first drive unit 44 such that the irradiation position of the line illumination LA becomes the initial position in the scanning direction (Y-axis direction) of the measurement target region 24 (step S202).

Next, the pupil-split image acquisition unit 60D acquires the pupil-split picture 70 from the pupil-split image capture unit 42, thereby acquiring the image 72A and the image 72B of the light emitted from the specimen T irradiated with the line illumination LA (step S204).

Next, similarly to step S112, the selection unit 60H selects the unit region 37 including the light receiving unit 41 to which the specific light sensitivity is set, from among the plurality of types of unit regions 37 (step S206). The selection unit 60H then outputs the pupil-split picture 70 including the image 72A and the image 72B having the light intensity value of the light receiving unit 41 included in the selected unit region 37 in the pupil-split picture 70 acquired in step S204 to the phase difference acquisition unit 60I.

The phase difference acquisition unit 60I specifies (step S208) the centroid g of each of the set of images 72A and 72B included in the pupil-split picture 70 received from the selection unit 60H in step S206. At this time, the phase difference acquisition unit 60I specifies centroid g at each position of each of the image 72A and the image 72B in the X-axis direction.

Subsequently, the phase difference acquisition unit 60I calculates an interval between the centroids g of each position in the X-axis direction of the image 72A and the image 72B as an interval YL between the each position (step S210).

Next, the relative distance derivation unit 60J calculates the difference $\Delta YL$ between the interval YL calculated in step S210 and the reference interval YL' calculated in step S200 for each position in the X-axis direction between the image 72A and the image 72B (step S212).

Next, the relative distance derivation unit 60J inversely calculates the displacement amount $\Delta Z$ from the difference $\Delta YL$ calculated in step S212. With this processing, the relative distance derivation unit 60J calculates the displacement amount $\Delta Z$ for each position in the X-axis direction at the current irradiation position of the line illumination LA in the scanning direction (Y-axis direction), and calculates the relative position between the objective lens 22 and the specimen T for each position (step S214).

Subsequently, the relative distance derivation unit 60J registers the displacement amount $\Delta Z$ calculated in step S214 and the relative position to the focus map in association with the position coordinates of each corresponding position in the measurement target region 24. With this processing, the relative distance derivation unit 60J updates the focus map (step S216).

The control unit 60 determines whether to end the focus map update processing (step S218). For example, the control unit 60 discerns whether the line illumination LA has been scanned from one end to the other end in the scanning direction in the measurement target region 24, thereby making the determination in step S218. When a negative determination is made in step S218 (step S218: No), the processing proceeds to step S220.

In step S220, the movement control unit 60F controls the movement of the first drive unit 44 to move the stage 26 in the scanning direction (Y-axis direction) by the width of the line illumination LA (step S220). With the processing in step S220, the irradiation position of the line illumination LA in the scanning direction (Y-axis direction) of the measurement target region 24 is moved in the scanning direction by the width of the line illumination LA. The processing returns to step S204 described above.

The determination of step S218 may be performed by the discernment made by the control unit 60 as to whether the line illumination LA has been scanned from one end portion to the other end portion in the scanning direction in the measurement target region 24 and whether the line illumination LA has been scanned from one end side to the other end side in the X-axis direction in the measurement target region 24 in step S218. In this case, processing can proceed such that, when the scanning of the line illumination LA is completed from one end to the other end in the scanning direction of the measurement target region 24, the movement control unit 60F shifts the irradiation position of the line illumination LA in the X-axis direction in step S220, and then returns to step S204.

When an affirmative determination is made in step S218 (step S218: Yes), the present routine is ended. The processing of steps S200 to S218 creates the focus map for the specimen T.

As described above, the microscope system 1 may create a focus map in advance and adjust the focus to each position of the specimen T according to the focus map.

As described above, creation of the focus map uses the light intensity distributions of the image 72A and the image 72B of the light emitted from the specimen T irradiated with the line illumination LA.

This makes it possible for the microscope system 1 of the present modification to create a high-speed and highly accurate focus map, similarly to the above-described embodiment.

(Third Modification)

The embodiment described above is a case where the line illumination LA having one wavelength is emitted, and the relative position information is derived based on the light intensity distributions of the image 72A and the image 72B of the light emitted from the specimen T irradiated with the line illumination LA.

Alternatively, the microscope system 1 may derive the relative position information for each of a plurality of line illuminations LA.

In this case, the light source unit 18A of the irradiation unit 18 can be preferably configured to emit the line illumination LA, which is a plurality of non-coaxial line illuminations LA having different wavelengths and parallel to the first direction (X-axis direction). The light source control unit 60A can control the light source unit 18A such that the light source unit 18A emits the plurality of line illuminations LA.

Figure 14A:
FIG. 14A is a schematic diagram of an emission surface of line illumination of a light source according to the modification of the present disclosure.

FIG. 14A is a schematic diagram of an emission surface of the line illumination LA of the light source 18B. For example, the light source 18B includes a light source 18B-R, a light source 18B-Y, a light source 18B-G, and a light source 18B-B. The light source 18B-R, the light source 18B-Y, the light source 18B-G, and the light source 18B-B each produce the line illumination LA as lines long in the X-axis direction and at least some wavelength regions of which do not overlap each other. The light source 18B-R, the light source 18B-Y, the light source 18B-G, and the light source 18B-B are arranged in parallel at different positions in the Y-axis direction.

The light source 18B-R emits a line illumination LA in a wavelength region that excites the specimen T labeled with a fluorescent dye that emits red fluorescence, for example. The light source 18B-Y emits a line illumination LA in a wavelength region that excites the specimen T labeled with a fluorescent dye that emits yellow fluorescence, for example. The light source 18B-G emits a line illumination LA in a wavelength region that excites the specimen T labeled with a fluorescent dye that emits green fluorescence, for example. The light source 18B-B emits a line illumination LA in a wavelength region that excites the specimen T labeled with a fluorescent dye that emits blue fluorescence, for example.

FIG. 14B is a schematic diagram illustrating an example of a pupil-split picture 70F. The pupil-split picture 70F is an example of the pupil-split picture 70. The pupil-split picture 70 is the pupil-split picture 70F of light emitted from the specimen T by being irradiated with the line illumination LA from each of the light source 18B-R, the light source 18B-Y, the light source 18B-G, and the light source 18B-B.

As illustrated in FIG. 14B, the pupil-split picture 70F includes an image 72A and an image 72B corresponding to each of the plurality of line illuminations LA.

Specifically, the pupil-split picture 70F includes an image 72A-R and an image 72B-R. The image 72A-R and the image 72B-R are a set of images corresponding to the line illumination LA emitted from the light source 18B-R. The pupil-split picture 70F further includes an image 72A-Y and an image 72B-Y The image 72A-Y and the image 72B-Y are a set of images corresponding to the line illumination LA emitted from the light source 18B-Y.

The pupil-split picture 70F further includes an image 72A-G and an image 72B-G. The image 72A-G and the image 72B-G are a set of images corresponding to the line illumination LA emitted from the light source 18B-G. The pupil-split picture 70F further includes an image 72A-B and an image 72B-B. The image 72A-B and the image 72B-B are a set of images corresponding to the line illumination LA emitted from the light source 18B-B.

The derivation unit 60E may derive the relative position information corresponding to each of the plurality of line illuminations LA based on the light intensity distribution of each of the pupil-split images 72 (image 72A-R and image 72B-R', the image 72A-Y and the image 72B-Y, the image 72A-G and the image 72B-G, the image 72A-B and the image 72B-B), which are images having a plurality of types of phase differences each corresponding to each of the plurality of line illuminations LA, similarly to the above-described embodiment. The movement control unit 60F may perform focusing for each of the plurality of line illuminations LA similarly to the above embodiment.

In this manner, the microscope system 1 may derive the relative position information for each of the plurality of line illuminations LA. In this case, in addition to the effects of the above embodiment, the microscope system 1 can perform focus adjustment with higher accuracy according to the type of the specimen T.

Note that the light source 18B may selectively emit the line illumination LA from each of the light source 18B-R, the light source 18B-Y, the light source 18B-G, and the light source 18B-B. In this case, the control unit 60 may derive the relative position information from the pupil-split image 72 every time the line illumination LA having the wavelength region in which at least a part does not overlap is emitted from the light source 18B.

(Fourth Modification)

In the above embodiment, regarding the issue of the difference in the fluorescence intensity between a region in which the cellular tissue is present (hereinafter, also referred to as a tissue part) and a region in which the cellular tissue is not present (hereinafter, also referred to as a non-tissue part or a sealing part) in an imaging range of the specimen T, in order to prevent a state of pixel value saturation in the pixel included in the region in which the tissue part is imaged in the pupil-split image 72 and/or a state of noise becoming dominant in the region in which the non-tissue part is imaged, the sensor region (refer to FIG. 2) of the pupil-split image capture unit 42 is split into a plurality of types of unit regions 37A and 37B having mutually different exposure setting values, and the phase difference is calculated from the interval YL of the centroids g of the images 72A and 72B captured in the unit region 37A in which the exposure setting value with high light sensitivity is set for the non-tissue part, and the phase difference is calculated from the interval YL of the centroids g of the images 72A and 72B captured in the unit region 37B in which the exposure setting value with low photosensitivity is set for the tissue part.

However, in a case where, as in the above embodiment, a plurality of simultaneously emitted line illuminations (for example, line illuminations LA and LB) shares one objective lens 22, and when the height is different between the tissue part where the cellular tissue of the specimen T exists and the non-tissue part where the cellular tissue does not exist (for example, the sealing part using a sealant), there would be a situation in which the tissue part is not in focus while the non-tissue part is focused, leading to blurring in a part of the captured image of the specimen T.

To handle this, an example as a fourth modification will be given as a case of enabling acquisition of a captured image of a focused specimen T (hereinafter, also referred to as a tissue image or a fluorescence image) even when the non-tissue part and the tissue part are different in height.

In normal imaging of tissue cells, a reference interval YL' between the image 72A and the image 72B is determined in the tissue part, and the position of the objective lens 22 in the height direction (Z direction) is adjusted based on the determined reference interval YL'. Therefore, for example, when the tissue part and the non-tissue part are different in height, there may be a case where the interval YL between the image 72A and the image 72B is different in the non-tissue part even they are in a same place. In this case, when the tissue part and the non-tissue part are in the same field of view, while it is possible, by controlling the objective lens 22 based on the reference interval YL', to acquire a focused tissue image in the tissue part, there may be a case where an out-of-focus tissue image is acquired in the non-tissue part by controlling the objective lens 22 based on the reference interval YL'. This is caused, for example, in a case where the height of the focus position of the non-tissue part is different from the height of the focus position of the tissue part. For example, the height of the focus position of the non-tissue part may be higher or lower than the height of the focus position of the tissue part.

Figure 15B:
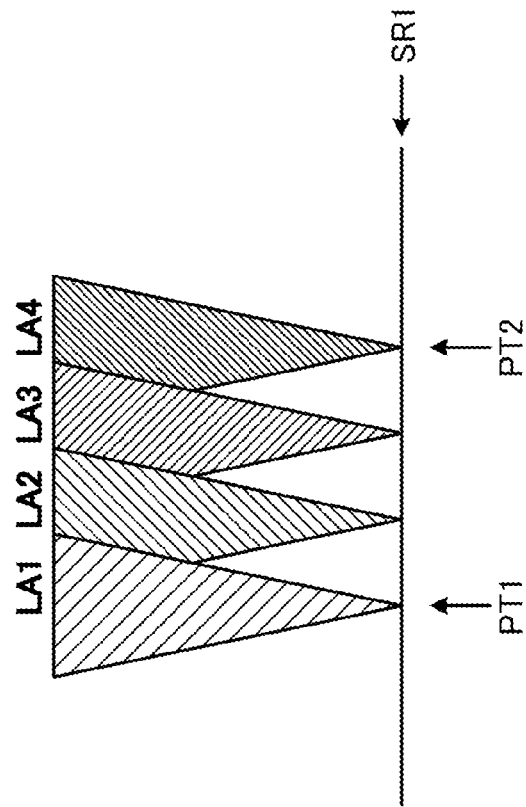
FIGS. 15A and 15B are diagrams illustrating an example of a mechanism of imaging using phase difference AF according to the modification of the present disclosure.
Figure 15A:
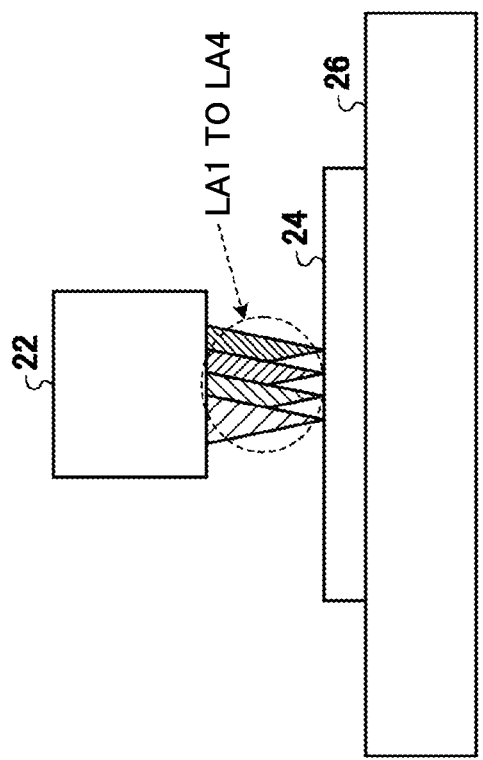

FIGS. 15A and 15B are diagrams illustrating an example of a mechanism of imaging using phase difference AF according to the fourth modification. In the present description, the configuration of the microscope system 1 and the basic operation thereof may be similar to those of the above-described embodiment or its modifications.

As illustrated in FIG. 15A, the fourth modification generates a captured image of the specimen T by simultaneously using four types of line illumination, namely, line illuminations LA1 to LA4. The line illuminations LA1 to LA4 may be, for example, laser beams of 638 nm, 532 nm, 488 nm, and 405 nm. The spots of lines formed by the line illuminations LA1 to LA4 may be, for example, parallel to each other and arranged in a direction perpendicular to the longitudinal direction of each spot.

In the acquisition of the captured image, by movement of the stage 26 in a predetermined direction (for example, the arrangement direction of the spots individually formed by the line illuminations LA1 to LA4) with respect to the objective lens 22, the specimen T in the measurement target region 24 placed on the stage 26 is sequentially scanned by each of the line illuminations LA1 to LA4. This leads to acquisition of a captured image of the specimen T in the image capture unit 34 (refer to FIG. 1).

FIG. 15B is a schematic diagram when the stage 26 and the objective lens 22 are viewed in the X-axis direction. Although FIG. 15B uses dots to illustrate images of the line illuminations LA1 to LA4 condensed on a focus plane SR1, the images in practice may be images of lines extending in a depth direction (x-axis direction) perpendicular to the surface of the page. A position PT1 on the focus plane SR1 indicates a position at which the line illumination LA1 positioned at the head in the Y direction is condensed, and a position PT2 indicates a position at which the line illumination LA4 positioned at the tail end in the Y direction is condensed. In the case of the reciprocating scanning, the Y direction and the −Y direction may be alternated as the scanning direction. When the scanning direction is the Y direction, the line illumination LA1 is positioned at the head in the scanning direction, and when the scanning direction is the −Y direction, the line illumination LA1 is positioned at the tail end in the scanning direction.

FIGS. 15A and 15B are cases where all of the line illuminations LA1 to LA4 irradiate the specimen through the common objective lens 22, making it difficult to obtain the focus in each of the line illuminations LA1 to LA4. Still, since the line illuminations LA1 to LA4 are arranged close to each other so as to fall within one field of view of the objective lens 22, even when the position of the objective lens 22 is determined to bring one of the line illuminations LA1 to LA4 into focus, the focus of the other line illuminations is not considered to be greatly shifted. In view of this, the fourth modification will exemplify a case where focusing is performed using the line illumination LA4. Note that one of the other line illuminations LA1 to LA3 may be used, not limited to the line illumination LA4.

Here, in general, in the scanning of the specimen T, the operation is started from a sealing part (that is, a non-tissue part) outside the tissue of the specimen T. Therefore, when the objective lens 22 is focused using the line illumination LA4 positioned at the tail end when the scanning direction is the Y direction, the line illumination LA1 to LA3 ahead of the line illumination LA1 maintain a state in which the non-tissue part is focused until the tissue part is focused by the line illumination LA4 even though the scanning of the tissue part is started before the line illumination LA4. This might result in an occurrence of a problem of blur in an image of a tissue part in a region adjacent to the non-tissue part (hereinafter, also referred to as a boundary region) in a captured image obtained by the irradiation with each of the line illuminations LA1 to LA3 (hereinafter, also referred to as a captured images with the line illuminations LA1 to LA3)

Figures 16A, 16B, 16C:
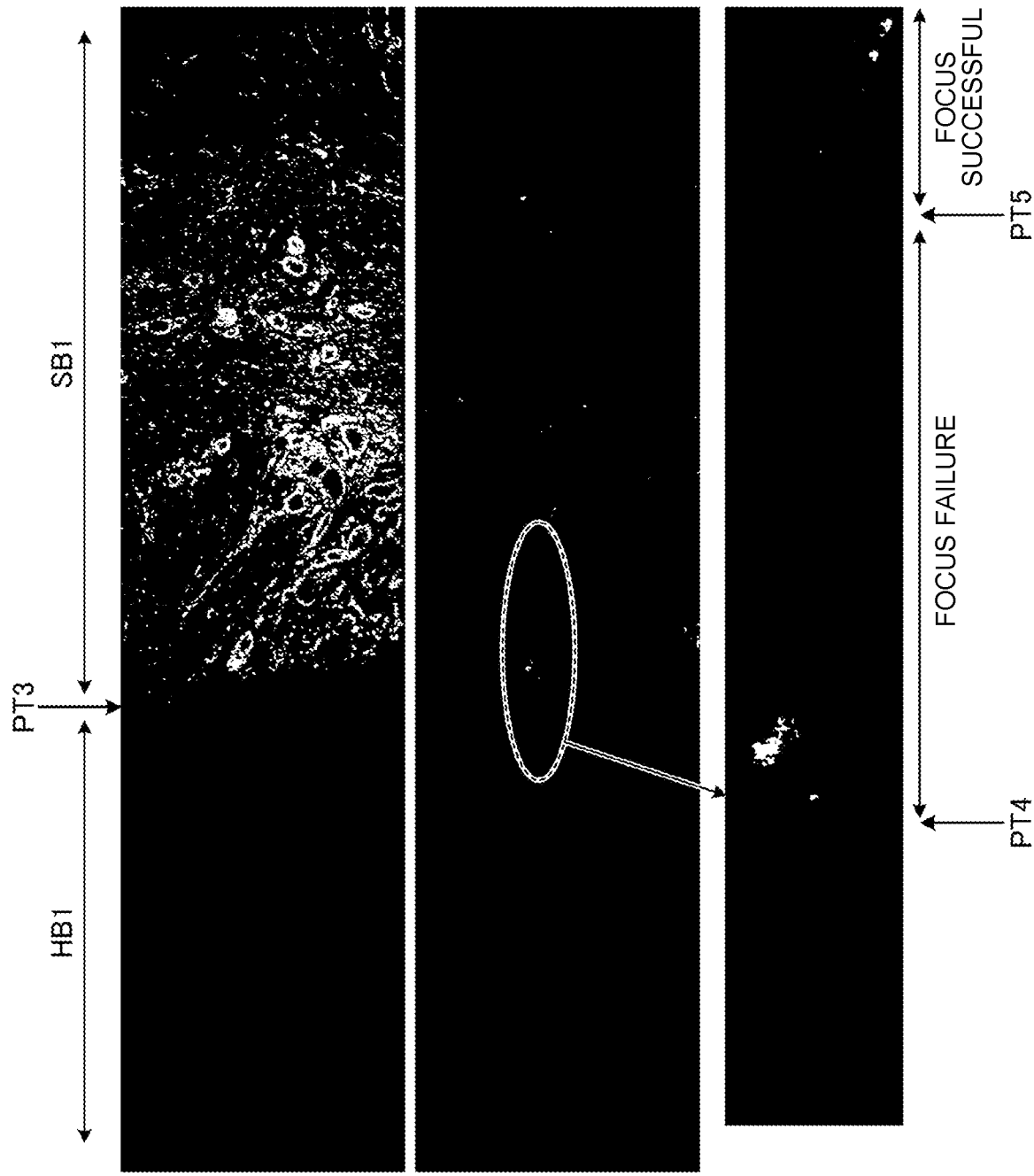
FIGS. 16A, 16B, and 16C are explanatory diagrams for describing a difference in focus between a non-tissue part and a tissue part.

FIGS. 16A, 16B, and 16C are explanatory diagrams for describing a difference in focus between the non-tissue part and the tissue part, and is a diagram for describing blur that occurs in a boundary region of a captured image captured by another line illumination (in the present example, the line illumination LA2) when focusing is performed using the line illumination LA4 located at the tail end. FIG. 16A illustrates an image captured with the line illumination LA4. FIG. 16B illustrates a captured image captured with the line illumination LA2. FIG. 16C illustrates an image obtained by enlarging a region of a dotted line portion including a boundary region in the captured image captured with the line illumination LA2. In FIGS. 16A, 16B, and 16C, a position PT3 indicates a position at which imaging of the line illumination LA4 is switched from a non-tissue part HB1 to a tissue part SB1. Since the line illumination LA2 starts imaging the tissue part SB1 before the line illumination LA4, the position of switching from the non-tissue part HB1 to the tissue part SB1 in FIG. 16B is on the left side of the position PT3.

In addition, as illustrated in FIGS. 16B and 16C, in the tissue part SB1 in the range (boundary region) from the position PT4 to the position PT5 before the imaging of the line illumination LA4 is switched to the tissue part SB1, the captured image obtained with the line illumination LA2 is out of focus and blurred. In addition, in the tissue part SB1 after the position PT5 after the imaging of the line illumination LA4 is switched to the tissue part SB1, the captured image obtained with the line illumination LA2 is in focus. In this manner, there may be a case where the image of the boundary region of the tissue part SB1 captured with the line illuminations LA1 to LA3 ahead of the line illumination LA4 is out of focus.

To handle this, in the present modification, when the line illumination being used for focusing is scanning the non-tissue part (hereinafter, it is also referred to as a case of focusing on the non-tissue part), the position obtained by adding an offset to the position actually in focus is set as a target focus position. At that time, the target focus position may be, for example, a position at the same height as the tissue part. With this setting, even when focusing is performed on the non-tissue part, the focus position of the objective lens 22 can be adjusted to the height of the tissue part, making it possible to suppress blurring of the image of the boundary region of the tissue part in the captured image obtained with each of the line illuminations LA1 to LA4.

Note that the offset may be added to the difference ΔYL between the interval YL between the image 72A and the image 72B constituting the pupil-split picture 70 acquired by the pupil-split image acquisition unit 60D and the reference interval YL', or may be added to the displacement amount ΔZ inversely calculated from the difference ΔYL, for example. In either case, the position of the objective lens 22 after focusing can be adjusted by the offset. Offset assignment is not limited thereto, and the offset may be assigned to various parameters as long as the focus position of the target can be adjusted to a position at the same height as the tissue part.

Figure 17:
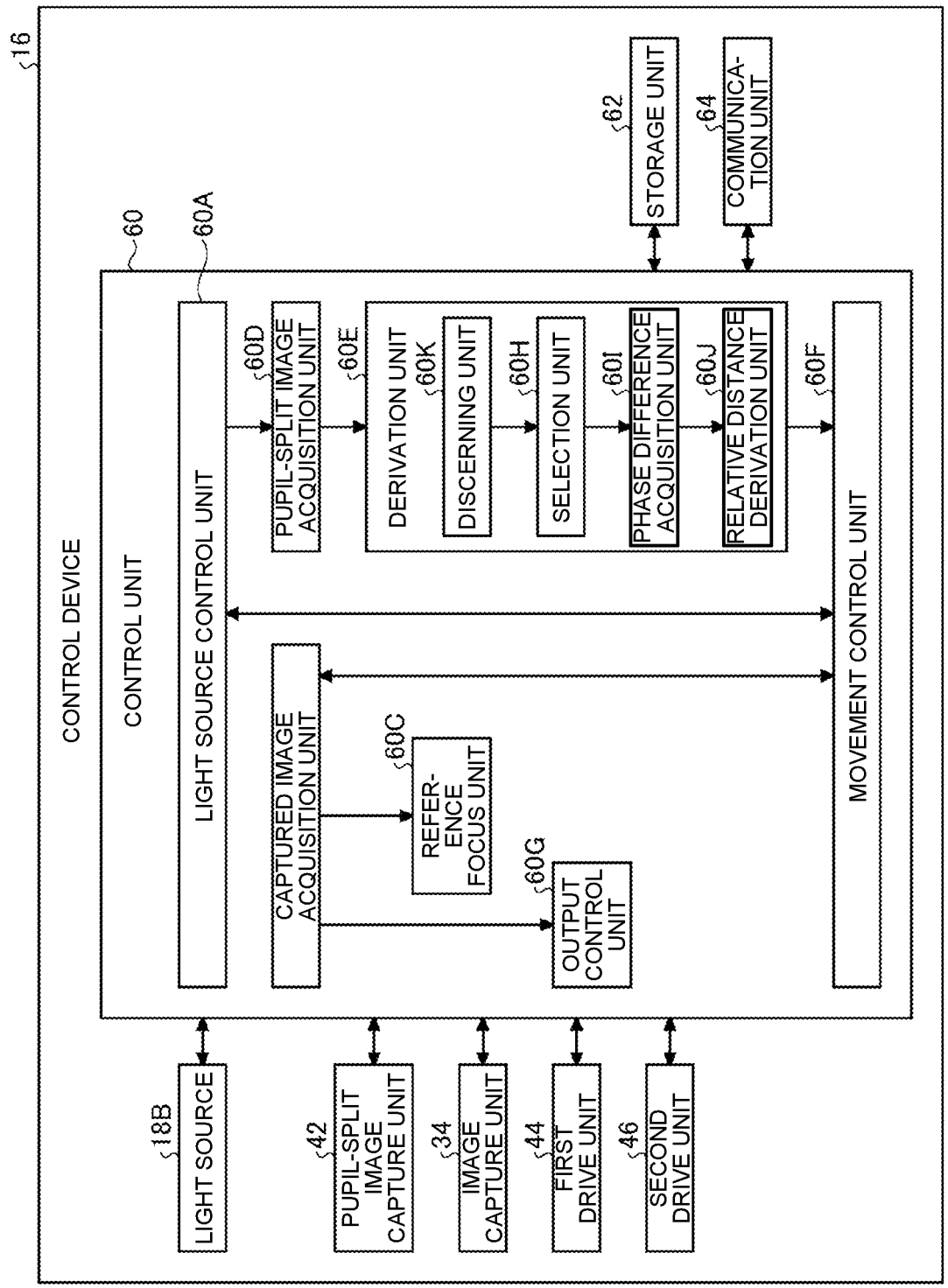
FIG. 17 is a diagram illustrating an example of a functional configuration of a control device 16 according to the modification of the present disclosure.

FIG. 17 is a diagram illustrating an example of a functional configuration of a control device 16 according to the present modification. As illustrated in FIG. 17, in the control device 16 according to the present modification, the derivation unit 60E further includes a discerning unit 60K in a configuration similar to the functional configuration described with reference to FIG. 5 in the above embodiment.

The discerning unit 60K discerns whether the line illumination (in the present example, the line illumination LA4) used for focusing is scanning the tissue part SB1 or the non-tissue part HB1. When having discerned that the non-tissue part HB1 is being scanned, the discerning unit 60K adds an offset to the focus position.

Specifically, for example, the discerning unit 60K inputs the pupil-split picture 70 acquired by the pupil-split image acquisition unit 60D, and discerns whether the part the line illumination LA4 is scanning is the tissue part SB1 or the non-tissue part HB1 based on the input pupil-split picture 70. For example, normally, the amount of fluorescence emitted by the irradiation from the line illumination LA4 is larger in the tissue part SB1 than in the non-tissue part HB1. Therefore, the discerning unit 60K may discern that the line illumination LA4 is scanning the tissue part SB1 in a case where the luminance value of the pupil-split picture 70 in the pupil-split picture 70 is higher than a threshold set in advance, and may discern that the line illumination LA4 is scanning the non-tissue part HB1 in a case where the luminance value is lower than the threshold. The discerning method is not limited thereto and may be flexibly varied, that is, the discerning unit 60K may, for example, discern whether the line illumination LA4 is scanning the tissue part SB1 or scanning the non-tissue part HB1 based on the captured image captured by the area illumination LB among the captured images acquired by the captured image acquisition unit 60B.

In the addition of the offset to the focus position, for example, the discerning unit 60K may input to the relative distance derivation unit 60J the offset amount to be added to the difference ΔYL or the displacement amount ΔZ calculated by the relative distance derivation unit 60J, or may instruct the relative distance derivation unit 60J to add the offset amount held in advance by the relative distance derivation unit 60J to the difference ΔYL or the displacement amount ΔZ.

Figure 18:
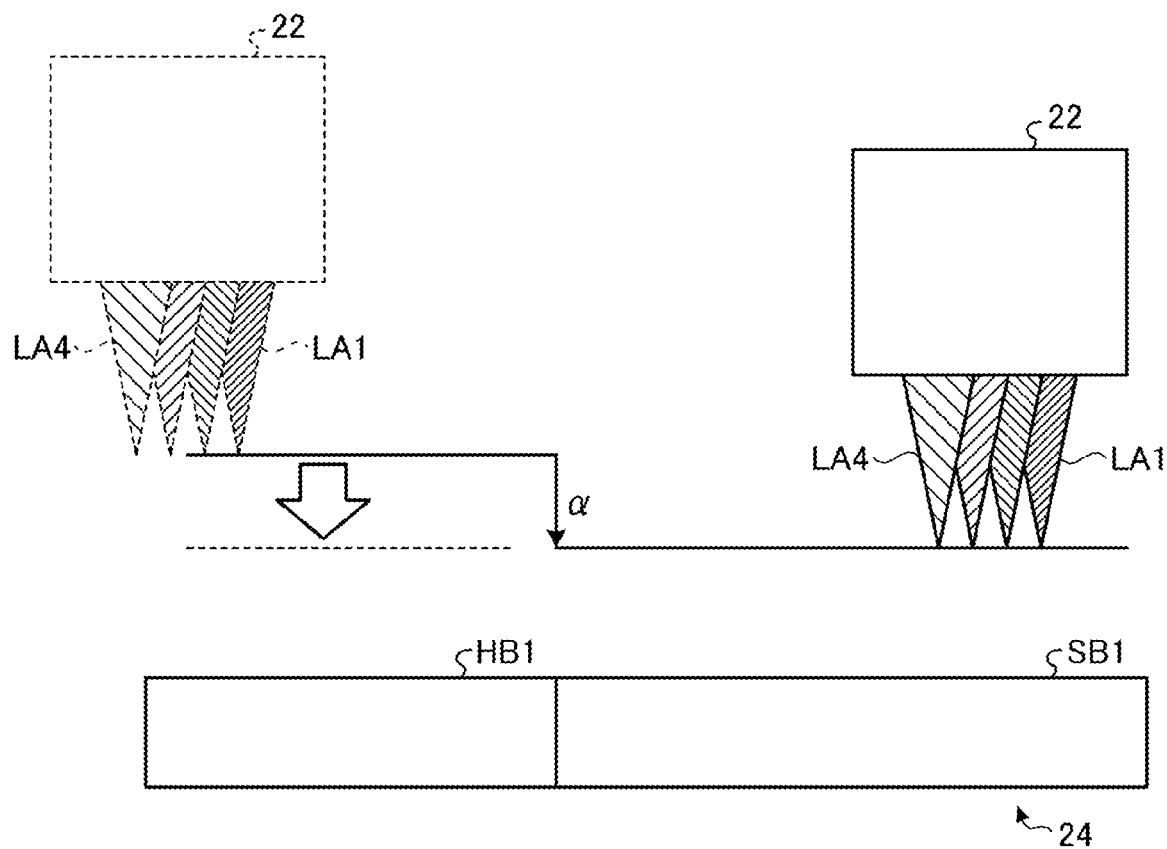
FIG. 18 is an explanatory diagram for describing processing of adding an offset to a focus position in the non-tissue part.

FIG. 18 is an explanatory diagram for describing processing of adding an offset to a focus position in the non-tissue part. In FIG. 18, the focus position of the non-tissue part HB1 is higher than the focus position of the tissue part SB1. FIG. 18 illustrates a case where the measurement target region 24 moves from right to left, that is, the objective lens 22 scans from left to right. As illustrated in FIG. 18, when it is discerned that the non-tissue part HB1 is being focused, the discerning unit 60K gives an offset to the focus position (for example, the difference ΔYL or the displacement amount ΔZ) so as to bring the tissue part SB1 in focus. In the example illustrated in FIG. 18, an offset is given so that the focus position in the case of focusing in the non-tissue part HB1 becomes lower by the height of a. The height a may be a difference in height between the assumed non-tissue part HB1 and the tissue part SB1.

When having discerned that the scanning position of the line illumination LA4 used for focusing has been switched from the non-tissue part HB1 to the tissue part SB1, the discerning unit 60K may cancel assignment of the offset. Alternatively, when having discerned that the scanning position has been switched from the non-tissue part HB1 to the tissue part SB1, the discerning unit 60K may assign an offset different from that in a case where the scanning position has been discerned to be the non-tissue part HB1.

Although FIG. 18 illustrates a case where the discerning unit 60K assigns an offset to the focus position in the non-tissue part HB1 and adjusts the focus position to the tissue part SB1, the focus position adjustment is not limited to this example. For example, the microscope system 1 may provide an offset to the focus position in the tissue part SB1 to adjust the focus position to the non-tissue part HB1.

Here, as described above, the non-tissue part HB1 and the tissue part SB1 may be discerned based on the luminance information regarding the light emitted from the specimen, for example, the luminance information regarding each pixel in the pupil-split picture 70 or the captured image. This is because, although the fluorescence intensity of the non-tissue part HB1 is weak, the fluorescence intensity tends to be strong in the tissue part SB1 because autofluorescence is also present in addition to fluorescence attributed to the fluorescent dye.

In addition, the discerning unit 60K may discern whether the tissue part SB1 is irradiated with at least a part of the line illumination LA4 used for focusing. When having discerned that at least a part of the line illumination LA4 is applied to the tissue part SB1, the discerning unit 60K may instruct, for example, the selection unit 60H (phase difference acquisition unit 60I and/or relative distance derivation unit 60J as necessary) to perform focusing using the pupil-split picture 70 or the captured image of the region irradiated with the line illumination LA4 in the tissue part SB1.

Note that the discerning unit 60K may discern whether at least a part of the line illumination LA4 is applied to the tissue part SB1 based on not only the luminance information but also various types of information as long as the non-tissue part HB1 and the tissue part SB1 can be discerned from each other. For example, the discerning unit 60K may determine whether there is a structure from the pattern of the pixel values of the captured image, and determine that at least a part of the line illumination LA4 is emitted to the tissue part SB1 in a case where there is a structure. In addition, for example, the discerning unit 60K may determine whether at least a part of the region irradiated with the current line illumination LA4 is the tissue part SB1 based on a low resolution image (For example, thumbnail images) obtained by imaging the entire specimen T.

Figure 19B:
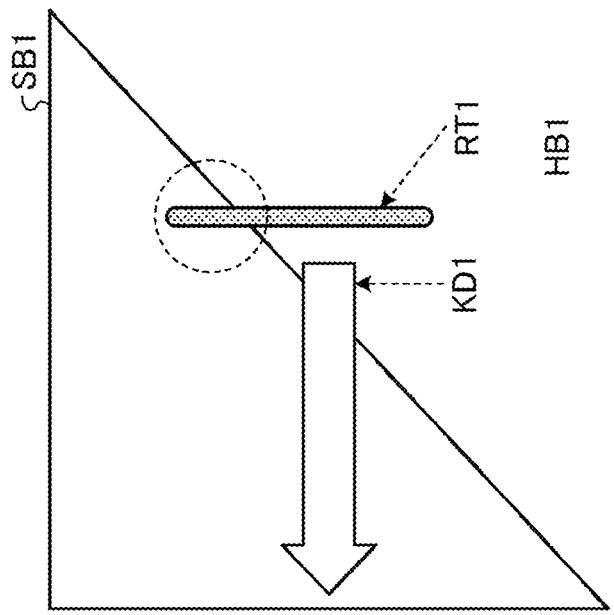
FIGS. 19A and 19B are explanatory diagrams for describing processing of focusing by preferentially selecting fluorescence of the tissue part.
Figure 19A:
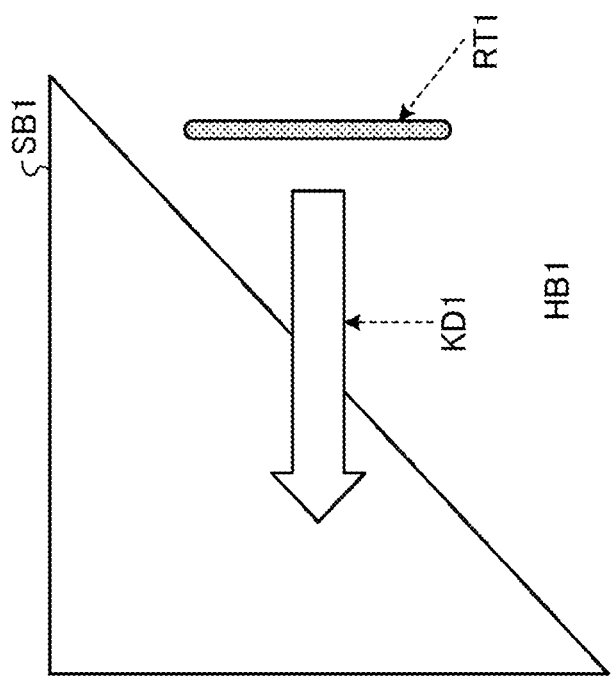

FIGS. 19A and 19B are explanatory diagrams for describing the processing of focusing based on fluorescence from the tissue part SB1 when at least a part of the line illumination LA4 is being applied to the tissue part SB1. RT1 indicates the range of the line irradiated with the laser. FIG. 19A illustrates a case where RT1 is moved in a direction KD1 to approach the tissue part SB1. FIG. 19B illustrates a case where the movement of RT1 in the direction KD1 allows a part of RT1 to be included in the tissue part SB1. In this manner, the switching of the line irradiation of RT1 from the non-tissue part HB1 to the tissue part SB1 may be performed as gradual switching instead of simultaneous switching of the line irradiation to the tissue part SB1.

In FIG. 19B, a part of RT1 is included in the tissue part SB1, and the other part of RT1 is included in the non-tissue part HB1. In such a case, the discerning unit 60K may instruct the selection unit 60H (phase difference acquisition unit 60I and/or relative distance derivation unit 60J as necessary) to execute processing of preferentially selecting the fluorescence of the tissue part SB1 in execution of focusing. In FIG. 19B, by further moving RT1 in the direction KD1, RT1 is completely included in the tissue part SB1.

In addition, the discerning unit 60K may determine whether to focus based on the fluorescence from the tissue part SB1 according to the ratio of the tissue part SB1 to the irradiation region of the line illumination LA4. For example, when having discerned that the proportion occupied by the tissue part SB1 is high such that 80% in the irradiation region is the tissue part SB1 and the remaining 20% is the non-tissue part HB1, the discerning unit 60K may discern the execution of the focusing processing based on the fluorescence from the tissue part SB1, specifically, based on the region of the tissue part SB1 in the irradiation region of the line illumination LA4 in the pupil-split picture 70 or the captured image. Furthermore, for example, in a case where it is determined that the proportion occupied by the tissue part SB1 is low such that 10% in the irradiation region is the tissue part SB1 and the remaining 90% is the non-tissue part, the discerning unit 60K may determine to execute the focusing processing based on the fluorescence from the non-tissue part HB1, specifically, based on the non-tissue part HB1 in the irradiation region of the line illumination LA4 in the pupil-split picture 70 or the captured image.

In this manner, the discerning unit 60K may discern whether to use the fluorescence of the tissue part SB1 or the fluorescence of the non-tissue part HB1 for focusing according to the ratio of each of the irradiation regions of the line illumination LA4.

FIG. 18 illustrates a case where focusing processing is performed by assigning an offset to the focus position in the non-tissue part. Furthermore, FIGS. 19A and 19B illustrate a case where focusing processing is performed by preferentially selecting fluorescence of a tissue part. Here, the discerning unit 60K may perform focusing processing by using the processing of FIG. 18 and the processing of FIGS. 19A and 19B in combination. Hereinafter, processing in a case where the discerning unit 60K uses two types of processing in combination will be described.

Figure 20:
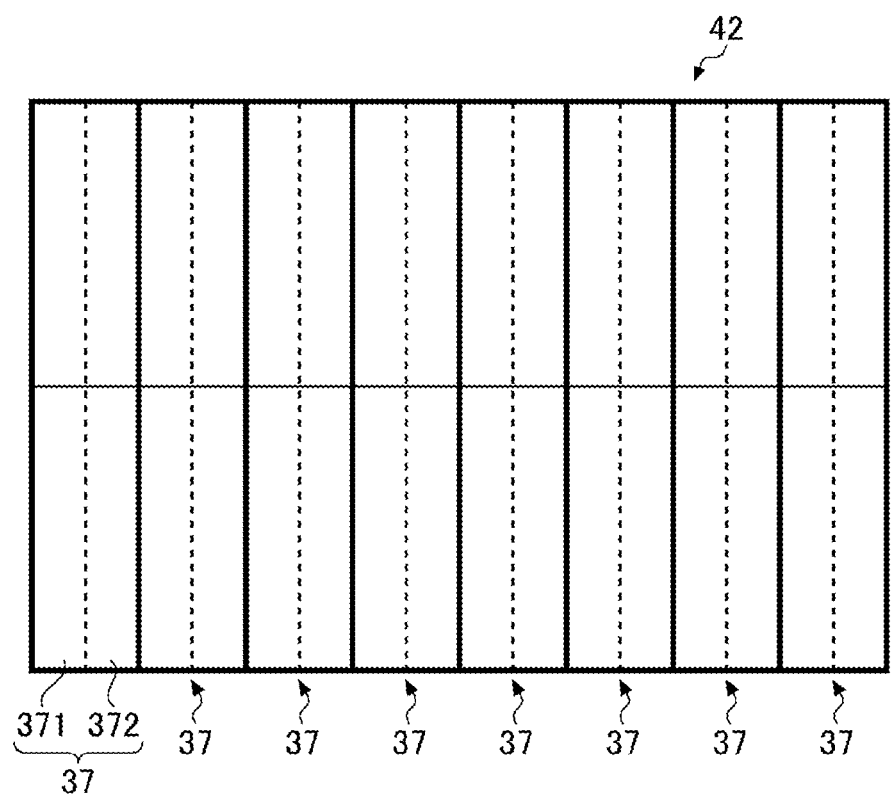
FIG. 20 is a diagram illustrating an example of a sensor region according to the modification of the present disclosure.

FIG. 20 is a diagram illustrating an example of a sensor region of the pupil-split image capture unit 42 according to the fourth modification. As illustrated in FIG. 20, the fourth modification uses a configuration in which each unit region 37 in the sensor region of the pupil-split image capture unit 42 is further split into two regions 371 and 372 in a direction (X direction) perpendicular to the scanning direction (Y direction). In the present modification, there is no distinction between the unit region 37A and the unit region 37B. Furthermore, in each unit region 37 in the present modification, the region 371 is a region in which an exposure setting value for high light sensitivity is set, while the region 372 is a region in which an exposure setting value for low light sensitivity is set.

For the unit region 37 discerned to be the region corresponding to the tissue part SB1 by the discerning unit 60K, the relative distance derivation unit 60J in the derivation unit 60E calculates the displacement amount $\Delta Z$ based on the difference $\Delta YL$ between the interval YL calculated by the phase difference acquisition unit 60I from the pupil-split image 72 acquired in the region 371 in which the exposure setting value representing high light sensitivity is set and the reference interval YL'; for the unit region 37 discerned to be the region corresponding to the non-tissue part HB1 by the discerning unit 60K, the relative distance derivation unit 60J either calculates the displacement amount $\Delta Z$ based on a value obtained by adding an offset to the difference $\Delta YL$ between the interval YL calculated by the phase difference acquisition unit 60I and the reference interval YL' from the pupil-split image 72 acquired in the region 372 in which the exposure setting value representing low light sensitivity is set, or assigns an offset to the displacement amount $\Delta Z$ calculated based on the difference $\Delta YL$. The displacement amount $\Delta Z$ given from the derivation unit 60E to the movement control unit 60F may be, for example, an average value of the displacement amount $\Delta Z$ calculated from the tissue part SB1 and the displacement amount $\Delta Z$ (including offset) calculated from the non-tissue part HB1. At this time, each displacement amount $\Delta Z$ may be weighted based on the ratio of each of the tissue part SB1 and the non-tissue part HB1 in the irradiation region of the line illumination LA4. For example, when the ratio of the tissue part SB1 is 20% and the ratio of the non-tissue part HB1 is 80%, the sum of the value obtained by multiplying the displacement amount $\Delta Z$ calculated from the tissue part SB1 by 0.2 and a value obtained by multiplying the displacement amount $\Delta Z$ (including the offset) calculated from the non-tissue part HB1 by 0.8 may be set as the displacement amount $\Delta Z$ to be input to the movement control unit 60F.

Alternatively, the relative distance derivation unit 60J may calculate the displacement amount $\Delta Z$ only based on the unit region 37 discerned to be the region corresponding to the tissue part SB1 by the discerning unit 60K. In this case, the phase difference acquisition unit 60I may calculate the interval YL between the centroids g of the image 72A and the image 72B using the pupil-split image 72 acquired in the region 371 in the unit region 37 corresponding to the tissue part SB1. In that case, even when the fluorescence intensity in the non-tissue part HB1 is very weak and noise is dominant in the pupil-split image 72 of the non-tissue part HB1, it is still possible to suppress degradation in focusing accuracy.

(Fifth Modification)

The above-described embodiment is the case where the phase difference acquisition unit 60I calculates the phase difference (interval YL) based on the distance between the centroids g of the image 72A and the image 72B. However, excessively bright line illumination would cause saturation in the pixels (that is, the pixel value of each pixel in the pupil-split picture 70) of the pupil-split image capture unit 42, leading to a failure in appropriately specifying the position of the centroid g of each of the images 72A and 72B. On the other hand, excessively dark line illumination would make noise dominant in the pupil-split picture 70, leading to a failure in appropriately specifying the position of the centroid g of the line illumination.

In view of this, it is allowable, in a fifth modification, to discern whether the signal (corresponding to the pixel value; hereinafter also referred to as luminance) read from each light receiving unit 41 (corresponding to a pixel) in each unit region 37 of the pupil-split image capture unit 42 is in an appropriate range, and to perform focusing based on the pupil-split image 72 acquired in the unit region 37 in which luminance of all pixels has been discerned to be within an appropriate range.

Note that the functional configuration of the control device 16 according to the present modification may be similar to the configuration example described with reference to FIG. 17 in the fourth modification, and thus, the description will be given with reference to FIG. 17. Also in the present modification, the discerning unit 60K may execute the operation exemplified in the fourth modification.

FIGS. 21A, 21B, and 21C are diagrams illustrating focusing operation according to the present modification. FIG. 21A is a diagram illustrating a relationship between a signal level (x-axis) and a signal frequency (y-axis), and FIG. 21B is a diagram illustrating an example of a pupil-split image 72 (one of an image 72A and an image 72B) obtained in each unit region 37. In FIG. 21A, HG1 represents the signal distribution of the background (corresponding to the black portion in FIG. 21B), and HG2 represents the signal distribution of the image 72A or 72B (corresponding to the gray to white portion in FIG. 21B). A first threshold HF1 indicates a lower limit threshold for discerning whether the luminance is within an appropriate range, and a second threshold HF2 indicates an upper limit threshold for discerning whether the luminance is within an appropriate range.

In the present modification, for example, in each unit region 37, when the peak of the distribution of the pixel value (luminance) of the light receiving unit 41 as a constituent is lower than the first threshold HF1, the pixel value in the pupil-split picture 70 is not dominant with respect to the noise level, deteriorating the SN ratio. This makes it difficult, as a result, to accurately calculate the position of the centroids g of the images 72A and 72B in the focusing, leading to degradation of the focusing accuracy. On the other hand, for example, in each unit region 37, when at least one pixel value (luminance) of the light receiving unit 41 constituting each unit region is higher than the second threshold HF2, this causes blown-out highlight in the pixel in the pupil-split picture 70, making it difficult to specify the accurate position of the centroids g of the images 72A and 72B, leading to degradation of focusing accuracy.

Therefore, in the present modification, for example, the discerning unit 60K may specify a region acquired in the unit region 37 in which the peak of the distribution of the pixel values is the first threshold HF1 or more and all the pixel values are the second threshold HF2 or less, among the plurality of unit regions 37 constituting the pupil-split image capture unit 42 in the input pupil-split picture 70, and may instruct the selection unit 60H (phase difference acquisition unit 60I and/or relative distance derivation unit 60J as necessary) to perform focusing using the specified region, for example.

Specifically, as illustrated in FIG. 21C, when there is a unit region 37 in which the peak of the distribution of the pixel values has been judged to be larger than the first threshold HF1 or at least one pixel value has been judged to be larger than the second threshold HF2, the discerning unit 60K instructs the selection unit 60H to perform focusing in a region other than a region corresponding to an unit region 27 in the pupil-split picture 70.

The operation to perform when there is the unit region 37 in which the peak of the distribution of the pixel values has been judged to be larger than the first threshold HF1 or at least one pixel value has been judged to be larger than the second threshold HF2 is not limited to the above operation, and for example, it is also allowable to perform processing of stopping scanning and re-imaging or processing of stopping scanning and outputting a warning (alert).

(Sixth Modification)

Furthermore, in the above-described embodiment or the modification thereof, a sudden change in the height (height in the Z direction) of the objective lens 22 at the time of controlling the focus position would cause, in the acquired captured image and the pupil-split picture 70, a sudden change in the brightness of the image before and after the change of the height of the objective lens 22. To handle this, the present modification uses a gentle change of speed when changing the height of the objective lens 22. FIGS. 22A, 22B, and 22C are diagrams illustrating the moving speed of the objective lens 22 according to the present modification. FIG. 22A illustrates an example of a captured image acquired when the height of the objective lens 22 is suddenly changed, FIG. 22B illustrates a case where the height of the objective lens 22 is suddenly changed, and FIG. 22C illustrates a case where the height of the objective lens 22 is gently changed.

As illustrated in FIG. 22B, when the moving speed of the objective lens 22 is too high, as illustrated in FIG. 22A, there is a case with an occurrence of differences in brightness HJ1 to HJ3 that appear as switching of images in a captured image.

Therefore, in the present modification, as illustrated in FIG. 22B, the objective lens 22 is controlled to move slowly. Specifically, for example, the movement control unit 60F performs control such that the movement amount of the objective lens 22 in the height direction (Z direction) while an imaging line travels by one step in the scanning direction (Y direction) is the movement amount corresponding to the focal depth of the objective lens 22 or less. Note that the imaging line may be a band-shaped range irradiated with the line illumination LA or LB during each imaging cycle (also referred to as a frame rate) of the image capture unit 34 or the pupil-split image capture unit 42.

In this manner, by setting the movement amount in the height direction in which the objective lens 22 moves in one imaging cycle to the amount corresponding to the focal depth of the objective lens 22, it is possible to sufficiently reduce the difference in brightness between the captured images (or the pupil-split picture 70) acquired in consecutive imaging cycles. This makes it possible to improve the accuracy of analysis using the captured image, the accuracy of focusing using the pupil-split picture 70, and the like.

(Seventh Modification)

The above-described embodiment and the modifications thereof have illustrated an exemplary case where the exposure installation values of the unit regions 37A and 37B (or the regions 371 and 372) are set values determined in advance, determination of the value is not limited thereto. For example, the high exposure setting value assuming the non-tissue part HB1 and the low exposure setting value assuming the tissue part SB1 may be determined based on a low-resolution image such as a thumbnail image obtained by imaging the specimen T in advance. For example, the light source control unit 60A may determine a high exposure setting value assuming the non-tissue part HB1 based on luminance information regarding the non-tissue part HB1 in a low-resolution image acquired in advance, and may determine a low exposure setting value assuming the tissue part SB1 based on luminance information regarding the tissue part SB1. This makes it possible to perform scanning based on appropriate gain setting, leading to acquisition of the pupil-split picture 70 with a better focus state.

(Eighth Modification)

In addition, the technique according to the above-described embodiment and the modifications thereof can also be applied to a system referred to as a non-coaxial excitation scanner type microscope system that irradiates a pathological specimen (corresponding to the specimen T) with a plurality of line illuminations having different wavelengths and non-coaxially arranged in parallel.

Figure 23:
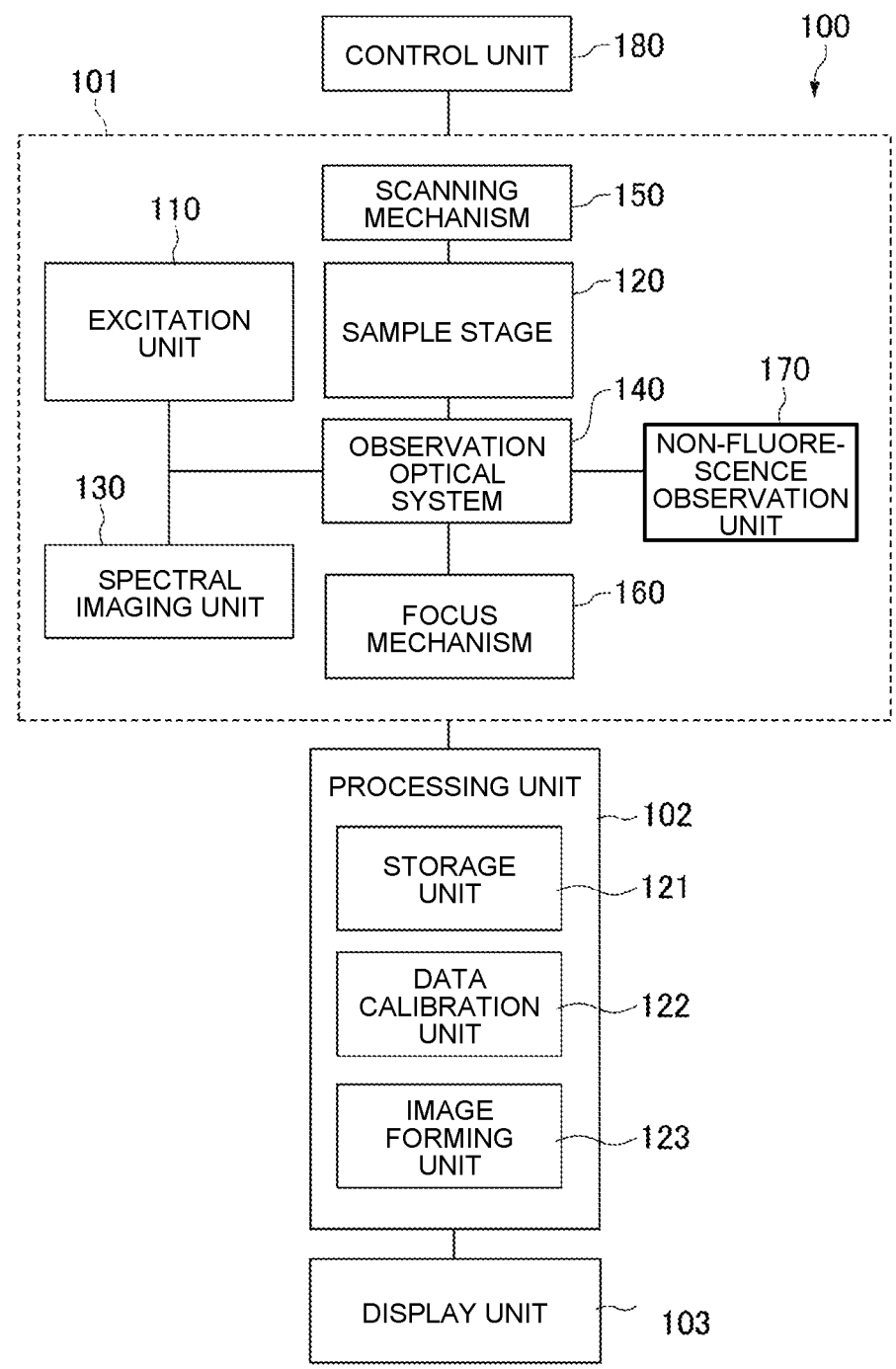
FIG. 23 is a schematic block diagram of a microscope system according to an eighth modification of the present disclosure.
Figure 24:
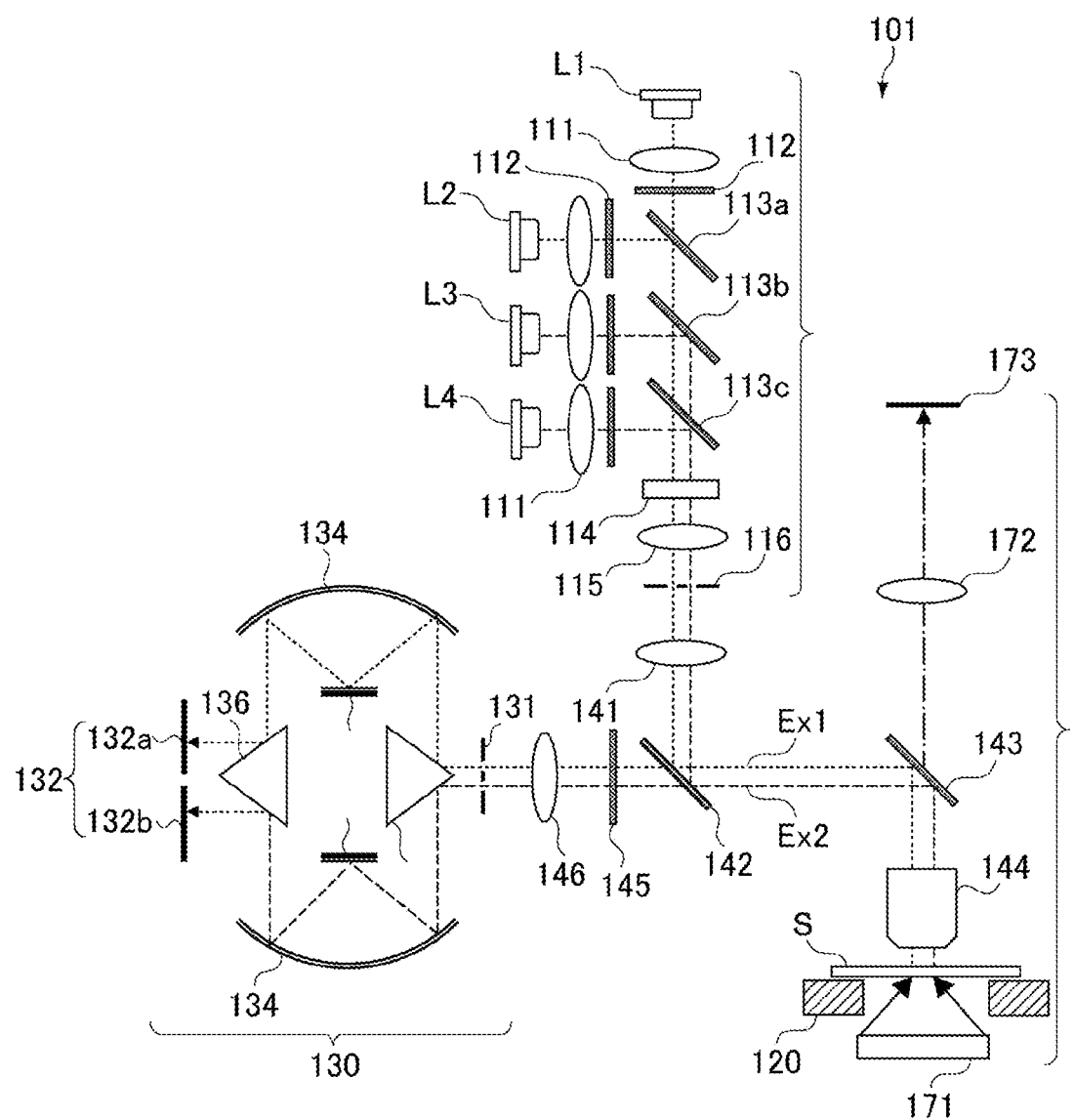
FIG. 24 is a view illustrating an example of an optical system in the microscope system according to the present disclosure.

FIG. 23 is a schematic block diagram of a microscope system according to an eighth modification, and FIG. 24 is a diagram illustrating an example of an optical system in the microscope system.

[Overall Configuration]

As illustrated in FIG. 23, a microscope system 100 according to the eighth modification includes an observation unit 101. The observation unit 101 includes: an excitation unit 110 that irradiates a pathological specimen (pathological sample) with a plurality of line illuminations having different wavelengths and non-coaxially arranged in parallel; a stage 120 that supports the pathological specimen; and a spectral imaging unit 130 that acquires a fluorescence spectrum (spectral data) of the pathological specimen excited as a line.

Here, non-axial arrangement in parallel indicates the state including a plurality of line illuminations arranged non-axially in parallel. The state of non-axial means that the illuminations are not coaxial, with a distance between the axes not particularly limited. The term "parallel" is not limited to parallel in a strict sense, and includes a state of being substantially parallel. For example, the term permits distortion due to an optical system such as a lens or deviation from a parallel state due to manufacturing tolerance, and the cases of these are also regarded as parallel.

The microscope system 100 further includes a processing unit 102. Based on the fluorescence spectrum of the pathological specimen (hereinafter, it is also referred to as a sample S) acquired by the observation unit 101, the processing unit 102 typically forms an image of the pathological specimen or outputs a distribution of the fluorescence spectrum. The image referred to herein refers to an image converted into red, green, and blue (RGB) colors from a constituent ratio or a waveform regarding dyes constituting the spectrum or autofluorescence originated from the sample, or refers to a luminance distribution in a specific wavelength band, and the like.

The excitation unit 110 and the spectral imaging unit 130 are connected to the stage 120 via an observation optical system 140 such as an objective lens 144. The observation optical system 140 has a function of optimum focus tracking by using a focus mechanism 160. The observation optical system 140 may be connected to a non-fluorescence observation unit 170 for dark field observation, bright field observation, or the like.

The microscope system 100 may be connected to a control unit 180 that controls an excitation unit (LD/shutter control), an XY stage which is a scanning mechanism, a spectral imaging unit (camera), a focus mechanism (a detector and a Z stage), a non-fluorescence observation unit (camera), and the like.

The excitation unit 110 includes a plurality of excitation light sources L1, L2, . . . that can output light of a plurality of excitation wavelengths Ex1, Ex2, . . . . The plurality of excitation light sources is typically configured with a light emitting diode (LED), a laser diode (LD), a mercury lamp, and the like, and light from each device is emitted as line illumination and applied to the sample S of the stage 120.

The sample S (corresponding to the specimen T) is typically composed of a slide including an observation target such as a tissue section, but it is needless to say that the sample S may be composed of others. The sample S (observation target) is stained with a plurality of fluorescent dyes. The observation unit 101 magnifies and observes the sample S at a desired magnification. The excitation unit 110 has arranged a plurality of line illuminations (for example, line illuminations LA and LB), and the imaging area of the spectral imaging unit 130 is arranged so as to overlap with each illumination area. The two line illuminations LA and LB are individually parallel to the Z-axis direction, and are disposed away from each other by a predetermined distance ($\Delta y$) in the Y-axis direction.

The imaging area corresponds to each slit part of an observation slit 131 (FIG. 24) in the spectral imaging unit 130. That is, the number of slit parts arranged in the spectral imaging unit 130 is the same as the number of line illuminations. Regarding the magnitude relationship between the line width and the slit width of the illumination, either may be larger. When the line width of the illumination is larger than the slit width, it is possible to increase an alignment margin of the excitation unit 110 with respect to the spectral imaging unit 130.

The wavelength forming a first line illumination Ex1 and the wavelength forming a second line illumination Ex2 are different from each other. The line of fluorescence excited by the line illuminations Ex1 and Ex2 is observed in the spectral imaging unit 130 via the observation optical system 140.

The spectral imaging unit 130 includes: an observation slit 131 having a plurality of slit parts that allows the passage of the fluorescence excited by a plurality of line illuminations; and at least one imaging element 132 capable of individually receiving the fluorescence passing through the observation slit 131. The imaging element 132 can be implemented by employing a two-dimensional imager such as a CCD or a CMOS. With the observation slit 131 disposed on the optical path, the fluorescence spectra excited in the respective lines can be detected without overlapping.

The spectral imaging unit 130 acquires, from each of the line illuminations Ex1 and Ex2, spectral data (x, $\lambda$) of fluorescence using a pixel array in one direction (for example, a vertical direction) of the imaging element 132 as a channel of a wavelength. The obtained spectral data (x, λ) is recorded in the processing unit 102 in a state where the spectral data is associated with excitation wavelength as origination of the spectral data.

The processing unit 102 can be implemented by hardware elements used in a computer, such as a CPU, RAM, and ROM, and necessary software. Instead of or in addition to the CPU, a programmable logic device (PLD) such as a field programmable gate array (FPGA), a digital signal processor (DSP), an application specific integrated circuit (ASIC), or the like may be used.

The processing unit 102 includes a storage unit 121 that stores spectral data indicating the correlation between the wavelengths of the plurality of line illuminations Ex1 and Ex2 and the fluorescence received by the imaging element 132. The storage unit 121 uses a storage device such as nonvolatile semiconductor memory or a hard disk drive, and stores in advance a standard spectrum of autofluorescence related to the sample S and a standard spectrum of a single dye staining the sample S. The spectral data (x, λ) received by the imaging element 132 is stored in the storage unit 121. In the present modification, the storage unit that stores the autofluorescence of the sample S and the standard spectrum of the single dye and the storage unit that stores the spectral data (measurement spectrum) of the sample S acquired by the imaging element 132 are actualized by the same storage unit 121. The storage unit is not limited thereto, and may be actualized by separate storage units.

As illustrated in FIG. 24, a dichroic mirror 142 and a band pass filter 145 are inserted in the middle of the optical path so as to prevent the excitation light (Ex1 and Ex2) from reaching the imaging element 132. In this case, a non-continuous portion occurs in the fluorescence spectrum formed on the imaging element 132. By excluding such non-continuous portions from a reading region, the frame rate can be further improved.

As illustrated in FIG. 24, the imaging element 132 may include a plurality of imaging elements 132a and 132b capable of receiving fluorescence that has passed through the observation slit 131, individually. In this case, the fluorescence spectra excited by the line illuminations Ex1 and Ex2 are acquired on the imaging elements 132a and 132b and stored in the storage unit 121 in association with the excitation light.

The line illuminations Ex1 and Ex2 are not limited to the configuration with a single wavelength, and each may have a configuration with a plurality of wavelengths. When each of the line illuminations Ex1 and Ex2 includes a plurality of wavelengths, the fluorescence excited by each of the line illuminations Ex1 and Ex2 also includes a plurality of spectra. In this case, the spectral imaging unit 130 includes a wavelength distribution element for separating the fluorescence into a spectrum originated from the excitation wavelength. The wavelength distribution element includes a diffraction grating, a prism, or the like, and is typically disposed on an optical path between the observation slit 131 and the imaging element 132.

The observation unit 101 further includes a scanning mechanism 150 that scans the stage 120 with the plurality of line illuminations Ex1 and Ex2 in the Y-axis direction, that is, in the arrangement direction of the line illuminations Ex1 and Ex2. With the scanning mechanism 150, dye species (fluorescence spectra) spatially separated by Δy and excited at different excitation wavelengths on the sample S (observation target) can be continuously recorded in the Y-axis direction. In this case, for example, the imaging region is split into a plurality of parts in the X-axis direction, and an operation of scanning the sample S in the Y-axis direction, then moving in the X-axis direction, and further performing scanning in the Y-axis direction is repeated. With a single scan, a spectral image based on the sample excited by several excitation wavelengths can be obtained.

In the scanning mechanism 150, the stage 120 is typically scanned in the Y-axis direction. Alternatively, scanning may be performed in the Y-axis direction with a plurality of line illuminations Ex1 and Ex2 by a galvanometer mirror disposed in the middle of the optical system. Finally, three-dimensional data of (X, Y, X) is acquired for each of the plurality of line illuminations Ex1 and Ex2. The three-dimensional data originated from each of the line illuminations Ex1 and Ex2 is data whose coordinates are shifted by Δy with respect to the Y-axis, and thus is corrected and output based on a value Δy recorded in advance or a value Δy calculated from the output of the imaging element 132.

Although the above example uses two line illuminations as the excitation light beam, the number of line illuminations as the excitation light beam may be three, four, or five or more, not limited to two. In addition, each line illumination may include a plurality of excitation wavelengths selected to suppress degradation of color separation performance as much as possible. In addition, even with one line illumination, by using the excitation light source formed with a plurality of excitation wavelengths and recording the individual excitation wavelengths in association with Row data obtained by the imaging element, it is still possible to obtain a polychromatic spectrum although it is not possible to obtain separability equal to the case using non-axial parallel beams.

[Observation Unit]

Next, details of the observation unit 101 will be described with reference to FIG. 24. Here, an example in which the observation unit 101 is configured with the configuration example 2 in FIG. 10 will be described.

The excitation unit 110 includes a plurality of (four in the present example) excitation light sources L1, L2, L3, and L4. Each of the excitation light sources L1 to L4 includes a laser light source that outputs laser light having a wavelength of 405 nm, 488 nm, 561 nm, and 645 nm, respectively.

The excitation unit 110 further includes: a plurality of collimator lenses 111 and a plurality of laser line filters 112 each of which corresponding to the respective excitation light sources L1 to L4; dichroic mirrors 113a, 113b, and 113c; a homogenizer 114; a condenser lens 115; and an incident slit 116.

The laser light emitted from the excitation light source L1 and the laser light emitted from the excitation light source L3 are collimated by the collimator lens 111, transmitted through the laser line filter 112 for cutting out-of-band components of each wavelength band, and is formed into a coaxial beam by the dichroic mirror 113a. The two coaxial laser beams undergoes further beam-shaping by the homogenizer 114 such as a fly-eye lens and the condenser lens 115 so as to be the line illumination Ex1.

Similarly, the laser light emitted from the excitation light source L2 and the laser light emitted from the excitation light source L4 are formed into a coaxial beam by the dichroic mirrors 113b and 113c so as to be the line illumination, namely, the line illumination Ex2 which is non-coaxial to the line illumination Ex1. The line illuminations Ex1 and Ex2 form non-coaxial line illumination (primary image) separated by Δy in the incident slit 116 (slit conjugate) having a plurality of slit parts each permitting the passage of each of the line illumination Ex1 and Ex2.

The sample S on the stage 120 is irradiated with the primary image through the observation optical system 140. The observation optical system 140 includes a condenser lens 141, dichroic mirrors 142 and 143, an objective lens 144, a band pass filter 145, and a condenser lens 146. The line illuminations Ex1 and Ex2 are collimated by the condenser lens 141 paired with the objective lens 144, reflected by the dichroic mirrors 142 and 143, transmitted through the objective lens 144, and applied to the sample S.

The fluorescence excited on the surface of the sample S is condensed by the objective lens 144, reflected by the dichroic mirror 143, transmitted through the dichroic mirror 142 and the band pass filter 145 that cuts off the excitation light, condensed again by the condenser lens 146, and incident on the spectral imaging unit 130.

The spectral imaging unit 130 includes an observation slit 131, imaging elements 132 (132a and 132b), a first prism 133, a mirror 134, a diffraction grating 135 (wavelength distribution element), and a second prism 136.

The observation slit 131 is disposed at the focal point of the condenser lens 146 and has the same number of slit parts as the number of excitation lines. The fluorescence spectra based on the two excitation lines that have passed through the observation slit 131 are separated by the first prism 133 and reflected by the grating surface of the diffraction grating 135 via the mirror 134, so as to be further separated into fluorescence spectra of individual excitation wavelengths. The four fluorescence spectra thus separated are incident on the imaging elements 132a and 132b via the mirror 134 and the second prism 136, and developed into (x, λ) information as spectral data.

The pixel size (nm/Pixel) of the imaging elements 132a and 132b is not particularly limited, and is set to 2 nm or more and 20 nm or less, for example. This variance value may be achieved optically or by setting a pitch of the diffraction grating 135, or may be achieved by using hardware binning of the imaging elements 132a and 132b.

The stage 120 and the scanning mechanism 150 constitute an X-Y stage, and cause the sample S to move in the X-axis direction and the Y-axis direction in order to acquire a fluorescence image of the sample S. In whole slide imaging (WSI), an operation of scanning the sample S in the Y-axis direction, then moving the sample S in the X-axis direction, and further performing scanning in the Y-axis direction is repeated.

The non-fluorescence observation unit 170 includes a light source 71, a dichroic mirror 143, an objective lens 144, a condenser lens 172, an imaging element 173, and the like. In the non-fluorescence observation system, FIG. 24 illustrates an observation system by dark field illumination.

The light source 71 is disposed below the stage 120, and irradiates the sample S on the stage 120 with illumination light from the side opposite to the line illuminations Ex1 and Ex2. In the case of dark field illumination, an excitation light source 171 illuminates from the outside of the numerical aperture (NA) of the objective lens 144, and the light (dark field image) diffracted by the sample S is imaged by the imaging element 173 via the objective lens 144, the dichroic mirror 143, and the condenser lens 172. By using dark field illumination, even an apparently transparent sample such as a fluorescently-stained sample can be observed with contrast.

Note that this dark field image may be observed simultaneously with fluorescence and used for real-time focusing. In this case, the illumination wavelength can be determined by selecting a wavelength that would not affect fluorescence observation. Not limited to the observation system that acquires the dark field image, the non-fluorescence observation unit 170 may include an observation system that can acquire a non-fluorescence image such as a bright field image, a phase difference image, a phase image, and an in-line hologram image. For example, examples of an applicable method of acquiring a non-fluorescence image include various observation methods such as a Schlieren method, a phase difference contrast method, a polarization observation method, and an epi-illumination method. The illumination light source need not be located below the stage, and may be located above the stage or around the objective lens. Furthermore, not only a method of performing focus control in real time, but also another method such as a prefocus map method of recording focus coordinates (Z coordinates) in advance may be adopted.

In the above configuration, the control unit 180 in FIG. 23 can correspond to the control unit 60 according to the above-described embodiment or its modifications. In addition, the excitation unit 110 can correspond to the light source 18B, the spectral imaging unit 130 can correspond to the image capture unit 34 and the pupil-split image capture unit 42, the scanning mechanism 150 can correspond to the first drive unit 44, the focus mechanism 160 can correspond to the second drive unit 46, the sample stage 120 can correspond to the stage 26, and the observation optical system 140 can correspond to the optical system including the objective lens 22.

(Hardware Configuration)

Figure 25:
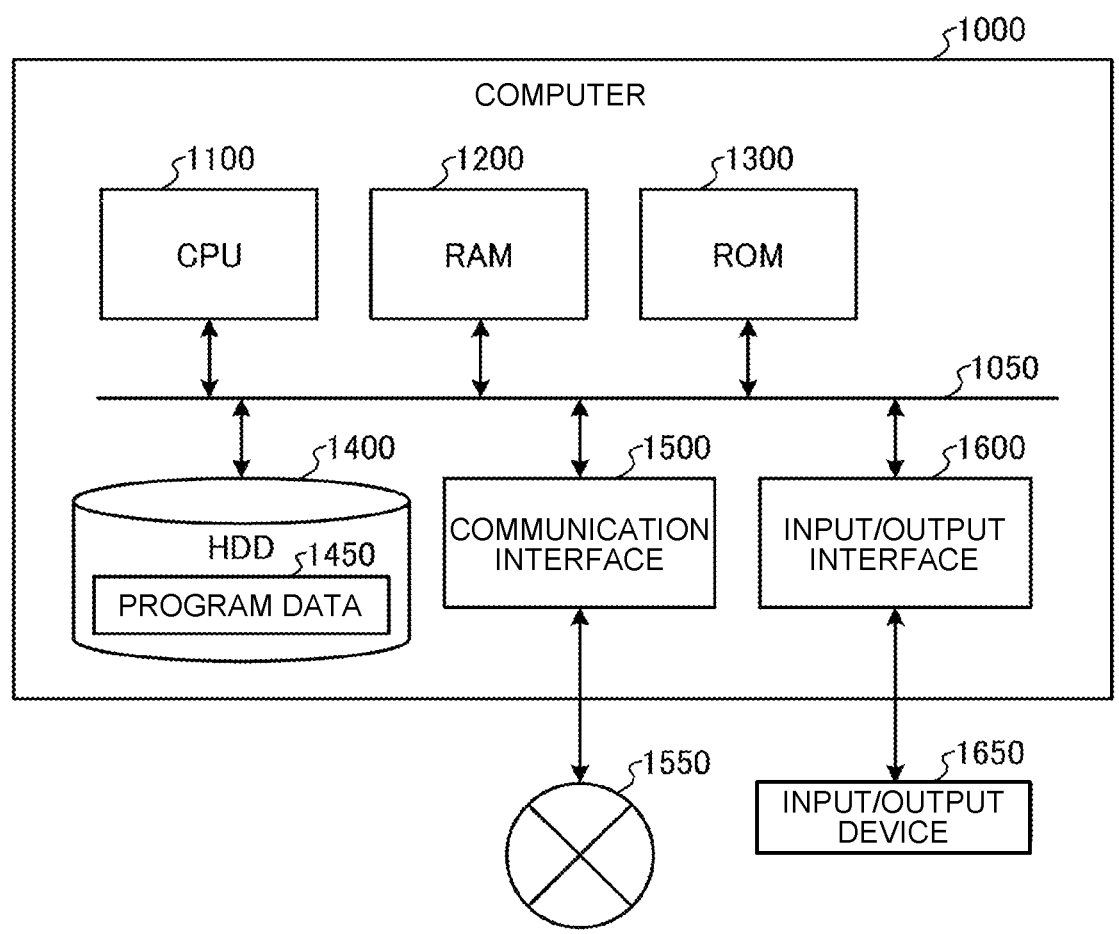
FIG. 25 is a hardware configuration diagram according to the embodiment and the modification of the present disclosure.

FIG. 25 is a hardware configuration diagram illustrating an example of a computer 1000 that implements the functions of the control device 16 according to the embodiment and its modifications.

The computer 1000 includes a CPU 1100, RAM 1200, read only memory (ROM) 1300, a hard disk drive (HDD) 1400, a communication interface 1500, and an input/output interface 1600. Individual components of the computer 1000 are interconnected by a bus 1050.

The CPU 1100 operates based on a program stored in the ROM 1300 or the HDD 1400 so as to control each of components. For example, the CPU 1100 develops the program stored in the ROM 1300 or the HDD 1400 into the RAM 1200 and executes processing corresponding to the programs.

The ROM 1300 stores a boot program such as a basic input output system (BIOS) executed by the CPU 1100 when the computer 1000 starts up, a program dependent on hardware of the computer 1000, or the like.

The HDD 1400 is a non-transitory computer-readable recording medium that records a program executed by the CPU 1100, data used by the program, or the like. Specifically, the HDD 1400 is a recording medium that records a focus adjustment program according to the present disclosure, which is an example of program data 1450.

The communication interface 1500 is an interface for connecting the computer 1000 to an external network 1550 (for example, the Internet). For example, the CPU 1100 receives data from other devices or transmits data generated by the CPU 1100 to other devices via the communication interface 1500.

The input/output interface 1600 is an interface for connecting between an input/output device 1650 and the computer 1000. For example, the CPU 1100 receives data from an input device such as a keyboard or a mouse via the input/output interface 1600. In addition, the CPU 1100 transmits data to an output device such as a display, a speaker, or a printer via the input/output interface 1600. Furthermore, the input/output interface 1600 may function as a media interface for reading a program or the like recorded on predetermined recording media. Examples of the media include optical recording media such as a digital versatile disc (DVD) or a phase change rewritable disk (PD), a magneto-optical recording medium such as a magneto-optical disk (MO), a tape medium, a magnetic recording medium, and semiconductor memory.

For example, when the computer 1000 functions as the control device 16 according to the above-described embodiment, the CPU 1100 of the computer 1000 executes the program loaded on the RAM 1200 to implement the functions of the light source control unit 60A, the captured image acquisition unit 60B, the reference focus unit 60C, the pupil-split image acquisition unit 60D, the derivation unit 60E, the movement control unit 60F, the output control unit 60G, the selection unit 60H, the phase difference acquisition unit 60I, the relative distance derivation unit 60J, and the like. The HDD 1400 stores the program and the data according to the present disclosure. While the CPU 1100 executes program data 1450 read from the HDD 1400, the CPU 1100 may acquire these programs from another device via the external network 1550, as another example.

Note that the present technique can also have the following configurations.

(1)

A microscope system including:

an irradiation unit that emits line illumination parallel to a first direction;

a stage that supports a specimen and is movable in a second direction perpendicular to the first direction;

a phase difference acquisition unit that acquires phase difference information regarding an image of light emitted from the specimen by being irradiated with the line illumination;

an objective lens that focuses the line illumination on the specimen;

a derivation unit that derives relative position information between the objective lens and the specimen based on the phase difference information; and a movement control unit that causes at least one of the objective lens and the stage to move in a third direction vertical to each of the first direction and the second direction based on the relative position information.

(2)

The microscope system according to (1), wherein a plurality of the line illuminations is a plurality of the line illuminations parallel to the first direction and coaxially arranged with mutually different wavelengths.

(3)

The microscope system according to (1) or (2), wherein the phase difference acquisition unit includes a plurality of lenses and acquires a pupil-split image of light emitted from the specimen as the phase difference information.

(4)

The microscope system according to any one of (1) to (3), wherein the phase difference acquisition unit acquires the phase difference information based on a light intensity distribution of a pupil-split image of light emitted from the specimen.

(5)

The microscope system according to (4), wherein the phase difference acquisition unit calculates centroid positions of the light intensity distribution and acquires the phase difference information by comparing the centroid positions.

(6)

The microscope system according to any one of (3) to (5), wherein the derivation unit includes:

a first calculation unit that calculates an interval of the pupil-split image; and a second calculation unit that calculates a relative movement amount and a relative movement direction according to a difference between the interval and a reference interval, as the relative position information.

(7)

The microscope system according to any one of (3) to (6), wherein the derivation unit derives the relative position information for each position of the specimen based on an interval between positions in an extending direction of the image between the pupil-split images.

(8)

The microscope system according to any one of (1) to (7), wherein the movement control unit performs focusing for each of a plurality of line illuminations parallel to the first direction and coaxially arranged with mutually different wavelengths.

(9)

The microscope system according to any one of (3) to (7), wherein the phase difference acquisition unit acquires the pupil-split image from an image capture unit, the image capture unit including a plurality of light receiving units that receive light and having a configuration in which a plurality of types of unit regions having exposure setting values of the light receiving units included being different from each other is arranged along a light receiving surface, and the derivation unit includes a selection unit that selects the unit region including the light receiving unit having a specific exposure setting value among the plurality of types of unit regions, and measures a phase difference based on a light intensity distribution of the pupil-split image received by the light receiving unit included in the selected unit region and derives the relative position information.

(10)

The microscope system according to (9), wherein the exposure setting value includes at least one of a gain and an exposure time of the light receiving unit.

(11)

An imaging method executed by a computer for controlling a measurement unit including an irradiation unit that emits line illumination parallel to a first direction, a stage that supports a specimen and is movable in a second direction perpendicular to the first direction, and an objective lens that focuses the line illumination on the specimen, the imaging method including:

a step of acquiring phase difference information regarding an image of light emitted from the specimen by being irradiated with the line illumination;

a step of deriving relative position information between the objective lens and the specimen based on the phase difference information; and a step of causing at least one of the objective lens and the stage to move in a third direction vertical to each of the first direction and the second direction based on the relative position information.

(12)

An imaging apparatus including: a measurement unit; and software used to control an operation of the measurement unit,
wherein the software is installed in an imaging apparatus,
the measurement unit includes:
an irradiation unit that emits line illumination parallel to a first direction;
a stage that supports a specimen and is movable in a second direction perpendicular to the first direction; and
an objective lens that focuses the line illumination on the specimen, and
the software
acquires phase difference information regarding an image of light emitted from the specimen by being irradiated with the line illumination,
derives relative position information between the objective lens and the specimen based on the phase difference information, and
causes at least one of the objective lens and the stage to move in a third direction vertical to each of the first direction and the second direction based on the relative position information.

(13)

A microscope system including:
an irradiation unit that emits line illumination parallel to a first direction;
a stage that supports a specimen and is movable in a second direction perpendicular to the first direction;
a phase difference acquisition unit that acquires phase difference information regarding an image of light emitted from the specimen by being irradiated with the line illumination;
an objective lens that focuses the line illumination on the specimen; and
a derivation unit that derives relative position information between the objective lens and the specimen based on the phase difference information, and registers, based on the relative position information, each position in the first direction and the second direction to a focus map in association with a displacement amount of a focus position of the objective lens in a third direction vertical to each of the first direction and the second direction.

(14)

The microscope system according to any one of (1) to (10) and (13), further including
a discerning unit that discerns whether at least a part of a region irradiated with the line illumination is a tissue region in which tissue of the specimen exists or a non-tissue region in which the tissue does not exist based on luminance information regarding the light emitted from the specimen.

(15)

The microscope system according to (14),
wherein the non-tissue region is a region in which a sealant is disposed.

(16)

The microscope system according to (14) or (15),
wherein the discerning unit discerns a ratio of the tissue region in the region irradiated with the line illumination.

(17)

The microscope system according to any one of (14) to (16),
wherein the discerning unit discerns whether at least a part of the region irradiated with the line illumination is the tissue region or the non-tissue region based on an image obtained by capturing an entire image of the specimen.

(18)

The microscope system according to any one of (14) to (17),
wherein the discerning unit discerns whether at least a part of the region irradiated with the line illumination is the tissue region or the non-tissue region based on luminance information regarding fluorescence emitted from the specimen.

(19)

The microscope system according to any one of (14) to (18),
wherein the discerning unit discerns whether the region irradiated with the line illumination is the tissue region or the non-tissue region for each of a plurality of types of unit regions having mutually different exposure setting values of a plurality of light receiving units that receive light.

(20)

The microscope system according to any one of (14) to (19),
wherein the discerning unit discerns whether at least a part of the region irradiated with the line illumination is the tissue region or the non-tissue region based on a level of luminance obtained from luminance information regarding the light emitted from the specimen.

(21)

The microscope system according to any one of (14) to (20),
wherein the phase difference acquisition unit acquires the phase difference information based on the image of the light originated from the tissue region discerned by the discerning unit.

(22)

The microscope system according to any one of (14) to (20),
wherein the phase difference acquisition unit acquires a phase difference of the image of the light based on the image of the light originated from the non-tissue region discerned by the discerning unit, and acquires the phase difference information by correcting the acquired phase difference.

(23)

The microscope system according to (21) or (22),
wherein the derivation unit derives relative position information between the objective lens and the specimen based on the phase difference information acquired by the phase difference acquisition unit, and generates the relative position information by correcting the derived position information.

(24)

The microscope system according to any one of (14) to (20),
wherein the derivation unit derives the relative position information between the objective lens and the specimen based on the phase difference information originated from the tissue region discerned by the discerning unit.

(25)

The microscope system according to any one of (14) to (20),
  wherein the derivation unit derives relative position information between the objective lens and the specimen based on the phase difference information originated from the non-tissue region discerned by the discerning unit, and generates the relative position information by correcting the derived position information.

(26)

The microscope system according to any one of (14) to (20),
  wherein the derivation unit either derives relative position information between the objective lens and the specimen based on the phase difference information originated from the tissue region and originated from the non-tissue region according to a ratio of the tissue region in the region irradiated with the line illumination discerned by the discerning unit and generates the relative position information by correcting the derived position information, or derives relative position information between the objective lens and the specimen based on the phase difference information originated from the tissue region and generates the relative position information by correcting the derived position information.

(27)

The microscope system according to (20),
  wherein the discerning unit controls to stop derivation of the relative position information performed by the derivation unit when it is discerned that either the level of the luminance is lower than a preset threshold or the luminance is saturated.

(28)

The microscope system according to any one of (1) to (10) and (13) to (27),
  wherein the derivation unit controls such that a distance by which the objective lens moves perpendicularly to a measurement surface of the specimen while the objective lens moves parallel to the measurement surface of the specimen by a predetermined distance is a focal depth of the objective lens or less.

REFERENCE SIGNS LIST

1 MICROSCOPE SYSTEM
12 IMAGING APPARATUS
14 MEASUREMENT UNIT
18 IRRADIATION UNIT
22 OBJECTIVE LENS
34 IMAGE CAPTURE UNIT
37 UNIT REGION
41 LIGHT RECEIVING UNIT
42 PUPIL-SPLIT IMAGE CAPTURE UNIT
44 FIRST DRIVE UNIT
46 SECOND DRIVE UNIT
60B CAPTURED IMAGE ACQUISITION UNIT
60D PUPIL-SPLIT IMAGE ACQUISITION UNIT
60E DERIVATION UNIT
60H SELECTION UNIT
60I PHASE DIFFERENCE ACQUISITION UNIT
60J RELATIVE DISTANCE DERIVATION UNIT
60K DISCERNING UNIT
70 PUPIL-SPLIT PICTURE
72A, 72B IMAGE
371, 372 REGION
T SPECIMEN

The invention claimed is:

1. A microscope system, including:
  an irradiation unit configured to emit line illumination parallel to a first direction;
  a stage configured to support a specimen and is movable in a second direction perpendicular to the first direction;
  a phase difference acquisition unit configured to acquire phase difference information regarding an image of light emitted from the specimen by being irradiated with the line illumination;
  an objective lens configured to focus the line illumination on the specimen;
  a derivation unit configured to derive relative position information between the objective lens and the specimen based on the phase difference information; and
  a movement control unit configured to cause at least one of the objective lens or the stage to move in a third direction vertical to each of the first direction and the second direction based on the relative position information.

2. The microscope system according to claim 1,
  wherein a plurality of line illuminations is parallel to the first direction and coaxially arranged with mutually different wavelengths.

3. The microscope system according to claim 1,
  wherein the phase difference acquisition unit includes a plurality of lenses and is further configured to acquire a pupil-split image of light emitted from the specimen as the phase difference information.

4. The microscope system according to claim 1,
  wherein the phase difference acquisition unit is further configured to acquire the phase difference information based on a light intensity distribution of a pupil-split image of light emitted from the specimen.

5. The microscope system according to claim 4,
  wherein the phase difference acquisition unit is further configured to: calculate centroid positions of the light intensity distribution; and acquire the phase difference information by comparison of the centroid positions.

6. The microscope system according to claim 3,
  wherein the derivation unit includes:
  a first calculation unit that is configured to calculate an interval of the pupil-split image; and
  a second calculation unit that is configured to calculate a relative movement amount and a relative movement direction according to a difference between the interval and a reference interval, as the relative position information.

7. The microscope system according to claim 3,
  wherein the derivation unit is further configured to derive the relative position information for each position of the specimen based on an interval between positions in an extending direction of the image between a plurality of pupil-split images.

8. The microscope system according to claim 1,
  wherein the movement control unit is further configured to perform focus for each of a plurality of line illuminations parallel to the first direction and coaxially arranged with mutually different wavelengths.

9. The microscope system according to claim 3,
  wherein the phase difference acquisition unit is further configured to acquire the pupil-split image from an image capture unit, the image capture unit including a plurality of light receiving units that receive light and having a configuration in which a plurality of types of unit regions having exposure setting values of the light receiving units included being different from each other is arranged along a light receiving surface, and the derivation unit includes a selection unit configured to select a unit region including a light receiving unit having a specific exposure setting value among the plurality of types of unit regions, and measure a phase difference based on a light intensity distribution of the pupil-split image received by the light receiving unit included in the selected unit region and derive the relative position information.

10. The microscope system according to claim 9,
wherein the specific exposure setting value includes at least one of a gain or an exposure time of the light receiving unit.

11. An imaging method executed by a computer for controlling a measurement unit including an irradiation unit that emits line illumination parallel to a first direction, a stage that supports a specimen and is movable in a second direction perpendicular to the first direction, and an objective lens that focuses the line illumination on the specimen, the imaging method including:
acquiring phase difference information regarding an image of light emitted from the specimen by being irradiated with the line illumination;
deriving relative position information between the objective lens and the specimen based on the phase difference information; and
causing at least one of the objective lens or the stage to move in a third direction vertical to each of the first direction and the second direction based on the relative position information.

12. An imaging apparatus, including: a measurement unit; and a software to control an operation of the measurement unit,
wherein the software is installed in the imaging apparatus, the measurement unit includes:
an irradiation unit configured to emit line illumination parallel to a first direction;
a stage configured to support a specimen and is movable in a second direction perpendicular to the first direction; and
an objective lens configured to focus the line illumination on the specimen, and
the software is configured to:
acquire phase difference information regarding an image of light emitted from the specimen by being irradiated with the line illumination;
derive relative position information between the objective lens and the specimen based on the phase difference information; and
cause at least one of the objective lens or the stage to move in a third direction vertical to each of the first direction and the second direction based on the relative position information.

13. A microscope system including:
an irradiation unit configured to emit line illumination parallel to a first direction;
a stage configured to support a specimen and is movable in a second direction perpendicular to the first direction;
a phase difference acquisition unit configured to acquire phase difference information regarding an image of light emitted from the specimen by being irradiated with the line illumination;
an objective lens configured to focus the line illumination on the specimen; and a derivation unit configured to derive relative position information between the objective lens and the specimen based on the phase difference information, and register, based on the relative position information, each position in the first direction and the second direction to a focus map in association with a displacement amount of a focus position of the objective lens in a third direction vertical to each of the first direction and the second direction.

14. The microscope system according to claim 1, further including
a discerning unit configured to discern at least a part of a region irradiated with the line illumination is a tissue region in which tissue of the specimen exists or a non-tissue region in which the tissue does not exist based on luminance information regarding the light emitted from the specimen.

15. The microscope system according to claim 14,
wherein the non-tissue region is a region in which a sealant is disposed.

16. The microscope system according to claim 14,
wherein the discerning unit is further configured to discern a ratio of the tissue region in the region irradiated with the line illumination.

17. The microscope system according to claim 14,
wherein the discerning unit is further configured to discern the at least the part of the region irradiated with the line illumination is the tissue region or the non-tissue region based on an image obtained by capture of an entire image of the specimen.

18. The microscope system according to claim 14,
wherein the discerning unit is further configured to discern the at least the part of the region irradiated with the line illumination is the tissue region or the non-tissue region based on luminance information regarding fluorescence emitted from the specimen.

19. The microscope system according to claim 14,
wherein the discerning unit is further configured to discern the region irradiated with the line illumination is the tissue region or the non-tissue region for each of a plurality of types of unit regions having mutually different exposure setting values of a plurality of light receiving units that receive light.

20. The microscope system according to claim 14,
wherein the discerning unit is further configured to discern the at least the part of the region irradiated with the line illumination is the tissue region or the non-tissue region based on a level of luminance obtained from luminance information regarding the light emitted from the specimen.

21. The microscope system according to claim 14,
wherein the phase difference acquisition unit is further configured to acquire the phase difference information based on the image of the light originated from the tissue region discerned by the discerning unit.

22. The microscope system according to claim 14,
wherein the phase difference acquisition unit is further configured to acquire a phase difference of the image of the light based on the image of the light originated from the non-tissue region discerned by the discerning unit, and acquire the phase difference information by correction of the acquired phase difference.

23. The microscope system according to claim 21,
wherein the derivation unit is further configured to derive the relative position information between the objective lens and the specimen based on the phase difference information acquired by the phase difference acquisition unit, and generate the relative position information by correction of the derived relative position information.

24. The microscope system according to claim 14, wherein the derivation unit is further configured to derive the relative position information between the objective lens and the specimen based on the phase difference information originated from the tissue region discerned by the discerning unit.

25. The microscope system according to claim 14, wherein the derivation unit is further configured to derive the relative position information between the objective lens and the specimen based on the phase difference information originated from the non-tissue region discerned by the discerning unit, and generate the relative position information by correction of the derived relative position information.

26. The microscope system according to claim 14, wherein the derivation unit is further configured to one of derive the relative position information between the objective lens and the specimen based on the phase difference information originated from the tissue region and originated from the non-tissue region according to a ratio of the tissue region in the region irradiated with the line illumination discerned by the discerning unit and generate the relative position information by correction of the derived relative position information, or derive the relative position information between the objective lens and the specimen based on the phase difference information originated from the tissue region and generate the relative position information by the correction of the derived relative position information.

27. The microscope system according to claim 20, wherein the discerning unit is further configured to control to stop derivation of the relative position information performed by the derivation unit when it is discerned that one of the level of the luminance is lower than a preset threshold or the luminance is saturated.

28. The microscope system according to claim 1, wherein the derivation unit is further configured to control such that a distance by which the objective lens moves perpendicularly to a measurement surface of the specimen while the objective lens moves parallel to the measurement surface of the specimen by a specific distance is a focal depth of the objective lens or less.

* * * * *